(12) United States Patent
Mizobuchi et al.

(10) Patent No.: US 9,740,550 B2
(45) Date of Patent: Aug. 22, 2017

(54) EVALUATION METHOD AND EVALUATION APPARATUS

(71) Applicant: FUJITSU LIMITED, Kawasaki-shi, Kanagawa (JP)

(72) Inventors: Yuji Mizobuchi, Kawasaki (JP); Kuniharu Takayama, Tama (JP); Satoshi Munakata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 41 days.

(21) Appl. No.: 14/737,914

(22) Filed: Jun. 12, 2015

(65) Prior Publication Data
US 2015/0363249 A1    Dec. 17, 2015

(30) Foreign Application Priority Data

Jun. 13, 2014 (JP) .................................. 2014-122314
Oct. 7, 2014 (JP) .................................. 2014-206195

(51) Int. Cl.
| | |
|---|---|
| G06F 11/00 | (2006.01) |
| G06F 11/07 | (2006.01) |
| H04L 12/26 | (2006.01) |
| G06F 11/34 | (2006.01) |
| G06F 11/22 | (2006.01) |
| H04L 12/24 | (2006.01) |

(52) U.S. Cl.
CPC ........ *G06F 11/076* (2013.01); *G06F 11/0709* (2013.01); *G06F 11/0793* (2013.01); *G06F 11/2257* (2013.01); *G06F 11/3452* (2013.01); *H04L 41/00* (2013.01); *H04L 43/06* (2013.01)

(58) Field of Classification Search
CPC .............. G06F 11/0709; G06F 11/079; G06F 11/2257; G06F 11/3452
See application file for complete search history.

(56) References Cited

U.S. PATENT DOCUMENTS

2010/0274833 A1    10/2010   Hirohata et al.
2011/0016355 A1    1/2011    Watanabe et al.
(Continued)

FOREIGN PATENT DOCUMENTS

JP    2001-289485    10/2001
JP    2004-261525    9/2004
(Continued)

OTHER PUBLICATIONS

Oono et al., "Service-oriented policy refinement method on autonomous system management", The Institution of Electronics, Information and Communication Engineers, IEICE Technical Report, vol. 105 No. 227, pp. 13-18, Aug. 2005 Abstract.
(Continued)

*Primary Examiner* — Charles Ehne
(74) *Attorney, Agent, or Firm* — Staas & Halsey LLP

(57) ABSTRACT

A calculation unit calculates, for each of a plurality of systems in which a countermeasure is taken, a maturity index of the system, indicating the degree of operational stability of the system, based on a value related to a non-functional requirement of the system. An evaluation unit evaluates usefulness of the countermeasure for a particular system based on similarity of configuration between the particular system and the system, timing that the countermeasure is taken, effects of the countermeasure, and the calculated maturity index.

11 Claims, 39 Drawing Sheets

(56) References Cited

U.S. PATENT DOCUMENTS

| | | | |
|---|---|---|---|
| 2011/0246837 A1 | 10/2011 | Kato | |
| 2012/0017127 A1* | 1/2012 | Nagai et al. | G06F 11/0727 714/57 |
| 2014/0019795 A1* | 1/2014 | Sonoda et al. | G06F 11/0751 714/2 |
| 2014/0115400 A1* | 4/2014 | Moon et al. | H04L 41/0631 714/37 |

FOREIGN PATENT DOCUMENTS

| | | |
|---|---|---|
| JP | 2006-53728 | 2/2006 |
| JP | 2008-168185 | 7/2008 |
| JP | 2010-211597 | 9/2010 |
| JP | 2010-257227 | 11/2010 |
| JP | 2012-22641 | 2/2012 |
| JP | 2013-11987 | 1/2013 |
| JP | 2013-229064 | 11/2013 |
| WO | WO 2009/122525 A1 | 10/2009 |
| WO | WO 2014/103071 A1 | 7/2014 |

OTHER PUBLICATIONS

Patent Abstracts of Japan, Publication No. 2013-11987, published Jan. 17, 2013.
Patent Abstracts of Japan, Publication No. 2013-229064, published Nov. 7, 2013.
Patent Abstracts of Japan, Publication No. 2010-257227, published Nov. 11, 2010.
Patent Abstracts of Japan, Publication No. 2010-211597, published Sep. 24, 2010.
Patent Abstracts of Japan, Publication No. 2006-53728, published Feb. 23, 2006.
Patent Abstracts of Japan, Publication No. 2008-168185, published Jul. 24, 2008.
Patent Abstracts of Japan, Publication No. 2012-22641, published Feb. 2, 2012.
Patent Abstracts of Japan, Publication No. 2001-289485, published Oct. 19, 2001.
Patent Abstracts of Japan, Publication No. 2004-261525, published Sep. 24, 2004.

* cited by examiner

FIG. 9

110 SYSTEM CONFIGURATION INFORMATION STORAGE UNIT

111 CONFIGURATION MANAGEMENT TABLE

| TENANT ID | SYSTEM PRODUCTION DATE/TIME | SYSTEM CONFIGURATION | | | | | | ACCESS PATTERN (AVERAGE NUMBER OF REQUESTS) | | | ACCESS PATTERN (VARIANCE OF NUMBER OF REQUESTS) | | |
|---|---|---|---|---|---|---|---|---|---|---|---|---|---|
| | | LB | AP1 | AP2 | AP3 | DB | CACHE | SMALL –150 | MEDIUM 150–300 | LARGE 300– | SMALL | MEDIUM | LARGE |
| TENANT1 | 2010/10/01 | 1 | 1 | 0 | 0 | 1 | 0 | 0 | 1 | 0 | 0 | 1 | 0 |
| TENANT2 | 2010/12/01 | 1 | 1 | 1 | 0 | 1 | 0 | 0 | 0 | 1 | 0 | 0 | 1 |
| TENANT3 | 2011/2/01 | 1 | 1 | 0 | 0 | 1 | 1 | 0 | 0 | 1 | 0 | 0 | 1 |
| TENANT4 | 2011/4/01 | 1 | 1 | 0 | 0 | 1 | 1 | 0 | 1 | 0 | 0 | 1 | 0 |
| TENANT5 | 2011/6/01 | 1 | 1 | 0 | 0 | 1 | 1 | 0 | 1 | 0 | 0 | 1 | 0 |
| TENANT6 | 2011/8/01 | 1 | 1 | 0 | 0 | 1 | 1 | 0 | 1 | 0 | 0 | 1 | 0 |
| ... | | | | | | | | | | | | | |

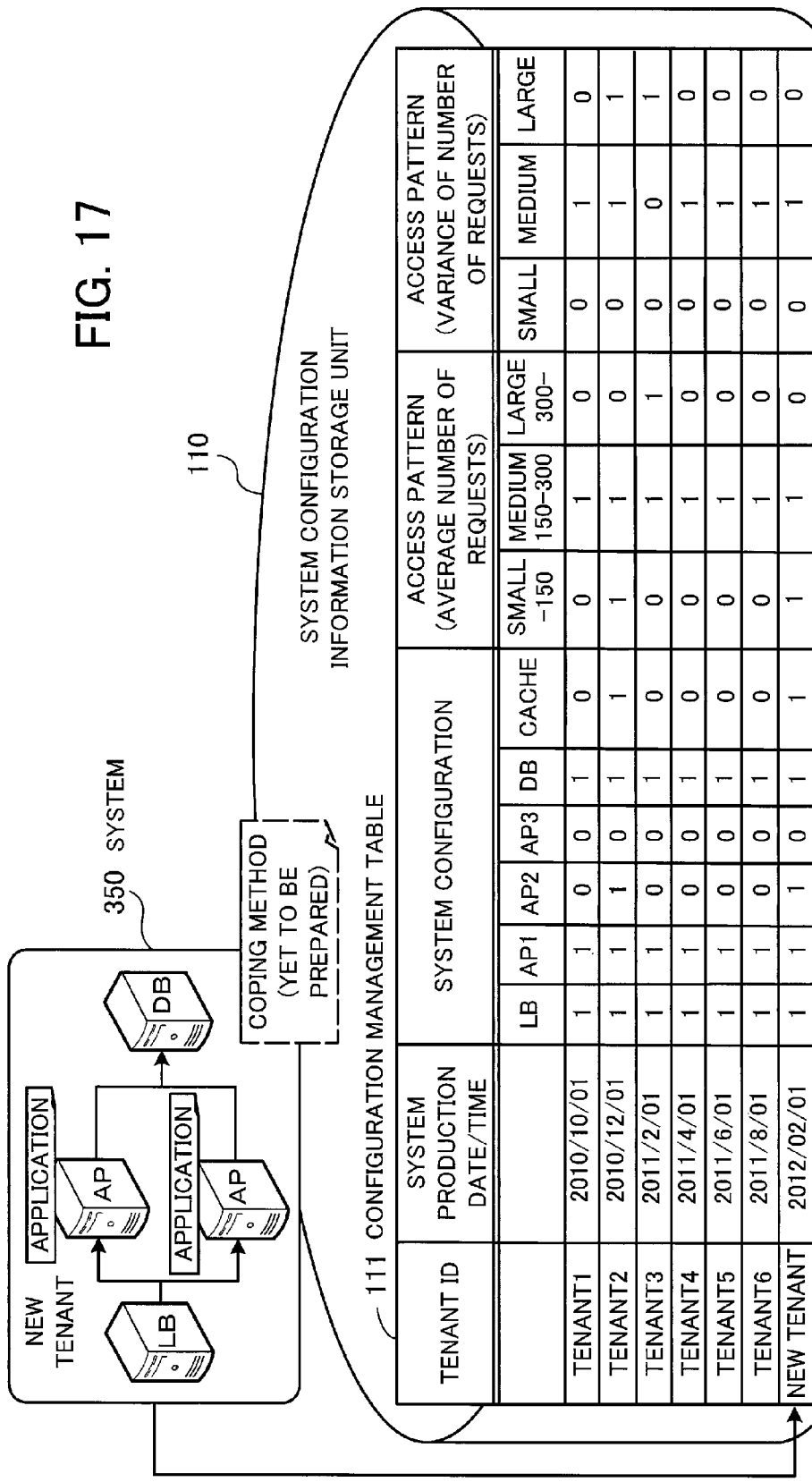

FIG. 18

111 CONFIGURATION MANAGEMENT TABLE $$\text{Usefulness} = \sum_{n=1}^{N} \boxed{\text{Similarity}(S_0, S_n)} \times \text{Timing}(t) \times \text{Result}$$

| TENANT ID | SYSTEM PRODUCTION DATE/TIME | SYSTEM CONFIGURATION | | | | | | | ACCESS PATTERN (AVERAGE NUMBER OF REQUESTS) | | | ACCESS PATTERN (VARIANCE OF NUMBER OF REQUESTS) | | |
|---|---|---|---|---|---|---|---|---|---|---|---|---|---|---|
| | | LB | AP1 | AP2 | AP3 | DB | CACHE | | SMALL -150 | MEDIUM 150–300 | LARGE 300– | SMALL | MEDIUM | LARGE |
| TENANT1 | 2010/10/01 | 1 | 1 | 0 | 0 | 1 | 0 | | 0 | 1 | 0 | 0 | 1 | 0 |
| TENANT2 | 2010/12/01 | 1 | 1 | 1 | 0 | 1 | 1 | | 1 | 1 | 0 | 0 | 1 | 1 |
| TENANT3 | 2011/2/01 | 1 | 1 | 0 | 0 | 1 | 0 | | 0 | 1 | 1 | 0 | 0 | 1 |
| TENANT4 | 2011/4/01 | 1 | 1 | 0 | 0 | 1 | 0 | | 0 | 1 | 0 | 0 | 1 | 0 |
| TENANT5 | 2011/6/01 | 1 | 1 | 0 | 0 | 1 | 0 | | 0 | 1 | 0 | 0 | 1 | 0 |
| TENANT6 | 2011/8/01 | 1 | 1 | 1 | 0 | 1 | 0 | | 1 | 0 | 0 | 0 | 1 | 0 |
| NEW TENANT | 2012/02/01 | 1 | 1 | 0 | 0 | 1 | 1 | | 1 | 1 | 0 | 0 | 1 | 0 |

$$\text{Similarity (NEW TENANT, TENANT1)} = \frac{\overrightarrow{\text{NEW TENANT}} \cdot \overrightarrow{\text{TENANT 1}}}{|\overrightarrow{\text{NEW TENANT}}| \cdot |\overrightarrow{\text{TENANT 1}}|} = \cos \alpha = \frac{5}{\sqrt{5}\sqrt{8}} = \sqrt{\frac{5}{8}}$$

$$\text{Similarity (NEW TENANT, TENANT2)} = \frac{\overrightarrow{\text{NEW TENANT}} \cdot \overrightarrow{\text{TENANT 2}}}{|\overrightarrow{\text{NEW TENANT}}| \cdot |\overrightarrow{\text{TENANT 2}}|} = \cos \alpha = \frac{8}{\sqrt{9}\sqrt{8}} = \sqrt{\frac{8}{9}}$$

FIG. 19

131 FAILURE HISTORY MANAGEMENT TABLE

| TENANT ID | FAILURE RECORD | DATE OF COUNTERMEASURE |
|---|---|---|
| TENANT 1 | Incident1 | 2011/10/01 |
| | Incident2 | 2011/10/01 |
| | Incident3 | 2011/10/01 |
| | Incident4 | 2011/10/02 |
| | Incident5 | 2011/10/02 |
| | Incident6 | 2011/10/03 |
| | Incident7 | 2011/10/3 |
| | Incident8 | 2011/10/7 |
| | Incident9 | 2011/10/7 |
| | Incident10 | 2011/10/15 |
| | Incident11 | 2011/10/25 |
| TENANT 2 | Incident1 | 2011/10/01 |
| ... | | |

| DATE | NUMBER OF DAYS ELAPSED | ACCUMULATED NUMBER OF OCCURRENCES | MATURITY INDEX |
|---|---|---|---|
| 2011/10/1 | 1 | 3 | 0.272727 |
| 2011/10/2 | 2 | 5 | 0.454545 |
| 2011/10/3 | 3 | 7 | 0.636364 |
| 2011/10/7 | 7 | 9 | 0.818182 |
| 2011/10/15 | 15 | 10 | 0.909091 |
| 2011/10/25 | 25 | 11 | 1 |

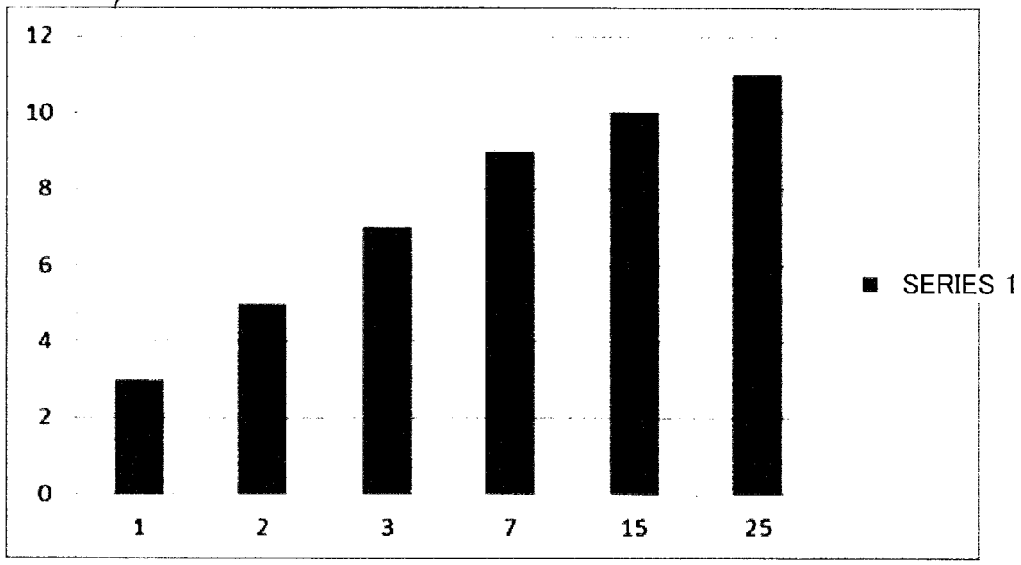

51 ACCUMULATED FAILURE FREQUENCY DISTRIBUTION

FIG. 21

$$\text{Usefulness} = \sum_{n=1}^{N} \text{Similarity}(S_0, S_n) \times \text{Timing}(t) \times \text{Result}$$

$t = 12/16$
$M = 0.032 \times 12 \times 30 \times 0.2 = 11.72$
$\text{Timing}(t) = \frac{1}{2}\left(e^{11.72(t-1)} + \frac{1}{e^{11.72 \times t}}\right)$
$= \frac{1}{2}\left(e^{11.72\left(\frac{12}{16}-1\right)} + \frac{1}{e^{11.72 \times \frac{12}{16}}}\right) \approx 0.05430892$ $t = 10/14$
$M = 0.032 \times 10 \times 30 + 0.2 = 9.8$
$\text{Timing}(t) = \frac{1}{2}\left(e^{9.8(t-1)} + \frac{1}{e^{9.8 \times t}}\right)$
$= \frac{1}{2}\left(e^{11.7\left(\frac{12}{14}-1\right)} + e^{-11.7 \times \frac{12}{14}}\right) \approx 0.094$

211 COUNTERMEASURE HISTORY MANAGEMENT TABLE

| TENANT ID | COUNTERMEASURE HISTORY | COUNTER-MEASURE | DATE OF COUNTERMEASURE | RESULT OF COUNTER-MEASURE |
|---|---|---|---|---|
| TENANT 1 | Tenant1_Record1 | Op1 | 2011/10/01 | ○ |
|  | Tenant1_Record2 | Op2 | 2011/11/01 | ○ |
|  | Tenant1_Record3 | Op3 | 2011/12/01 | ○ |
| TENANT 2 | Tenant2_Record1 | Op1 | 2011/10/01 | ○ |
|  | Tenant2_Record2 | Op2 | 2011/11/01 | × |
| TENANT 3 | Tenant3_Record1 | Op1 | 2011/10/01 | ○ |
|  | Tenant3_Record2 | Op2 | 2011/11/01 | ○ |
| TENANT 4 | Tenant4_Record1 | Op1 | 2011/10/01 | × |
|  | Tenant4_Record2 | Op2 | 2011/11/01 | ○ |
| TENANT 5 | Tenant5_Record1 | Op1 | 2011/10/01 | × |
| ... |  |  |  |  |

111 CONFIGURATION MANAGEMENT TABLE

| TENANT ID | SYSTEM PRODUCTION DATE/TIME | SYSTEM CONFIGURATION | | | | | | ACCESS PATTERN (AVERAGE NUMBER OF REQUESTS) | | | ACCESS PATTERN (VARIANCE OF NUMBER OF REQUESTS) | | |
|---|---|---|---|---|---|---|---|---|---|---|---|---|---|
| | | LB | AP1 | AP2 | AP3 | DB | CACHE | SMALL -150 | MEDIUM 150-300 | LARGE 300- | SMALL | MEDIUM | LARGE |
| TENANT1 | 2010/10/01 | 1 | 1 | 0 | 0 | 1 | 0 | 0 | 1 | 0 | 0 | 1 | 0 |
| TENANT2 | 2010/12/01 | 1 | 1 | 1 | 0 | 1 | 1 | 1 | 1 | 0 | 0 | 1 | 1 |
| TENANT3 | 2011/2/01 | 1 | 1 | 0 | 0 | 1 | 0 | 0 | 1 | 1 | 0 | 0 | 1 |
| TENANT4 | 2011/4/01 | 1 | 1 | 0 | 0 | 1 | 0 | 0 | 1 | 0 | 0 | 1 | 0 |
| TENANT5 | 2011/6/01 | 1 | 1 | 0 | 0 | 1 | 0 | 0 | 1 | 0 | 0 | 1 | 0 |
| TENANT6 | 2011/8/01 | 1 | 1 | 1 | 0 | 1 | 1 | 1 | 1 | 0 | 0 | 1 | 0 |
| NEW TENANT | 2012/02/01 | 1 | 1 | 1 | 0 | 1 | 1 | 1 | 1 | 0 | 0 | 1 | 0 |

$$\text{Usefulness} = \sum_{n=1}^{N} \text{Similarity}(S_0, S_n) \times \text{Timing}(t) \times \text{Result}$$

211 COUNTERMEASURE HISTORY MANAGEMENT TABLE

| TENANT ID | COUNTERMEASURE HISTORY | COUNTER-MEASURE | DATE OF COUNTERMEASURE | RESULT OF COUNTERMEASURE |
|---|---|---|---|---|
| TENANT 1 | Tenant1_Record1 | Op1 | 2011/10/01 | ◯ → Result=1 |
|  | Tenant1_Record2 | Op2 | 2011/11/01 | ◯ |
|  | Tenant1_Record3 | Op3 | 2011/12/01 | ◯ |
| TENANT 2 | Tenant2_Record1 | Op1 | 2011/10/01 | ◯ → Result=1 |
|  | Tenant2_Record2 | Op2 | 2011/11/01 | × |
| TENANT 3 | Tenant3_Record1 | Op2 | 2011/10/01 | ◯ |
|  | Tenant3_Record2 | Op2 | 2011/11/01 | × |
| TENANT 4 | Tenant4_Record1 | Op1 | 2011/10/01 | ◯ |
|  | Tenant4_Record2 | Op2 | 2011/11/01 | × |
| TENANT 5 | Tenant5_Record1 | Op1 | 2011/10/01 | × |
| ... |  |  |  |  |

FIG. 22

FIG. 25
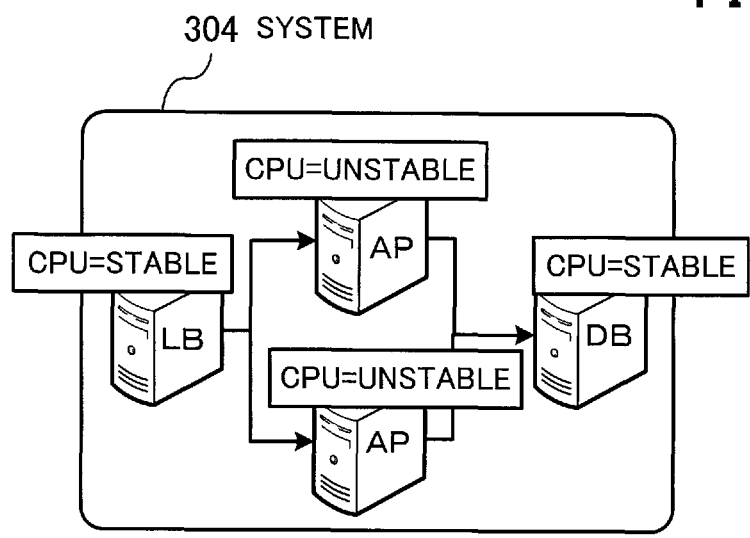
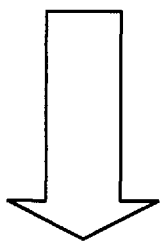
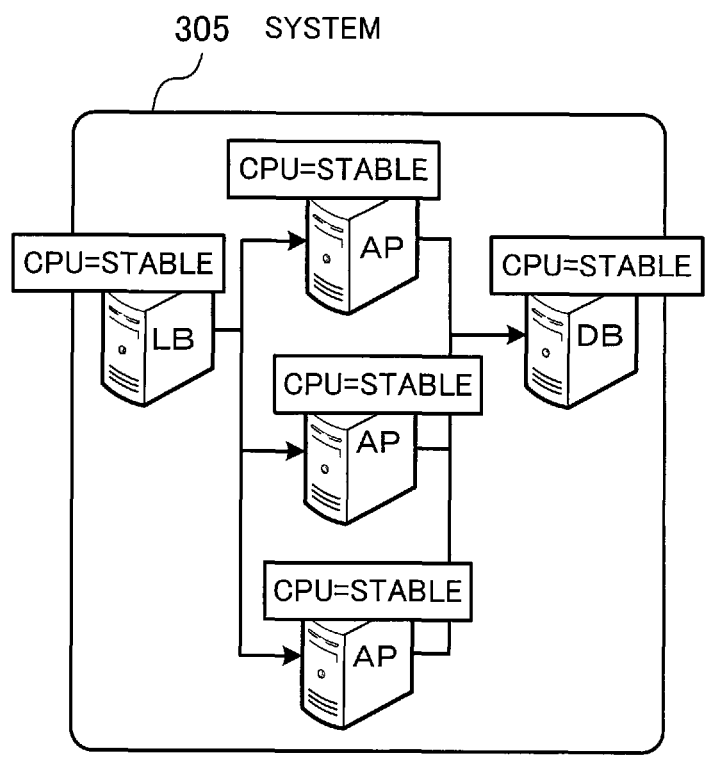

FIG. 29
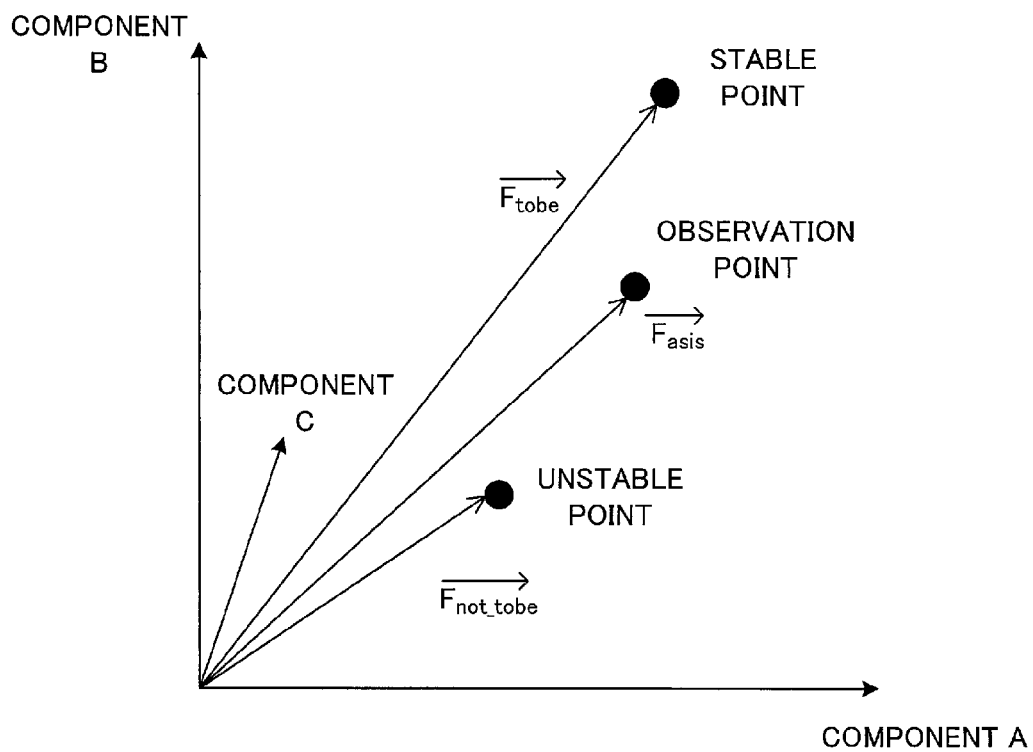
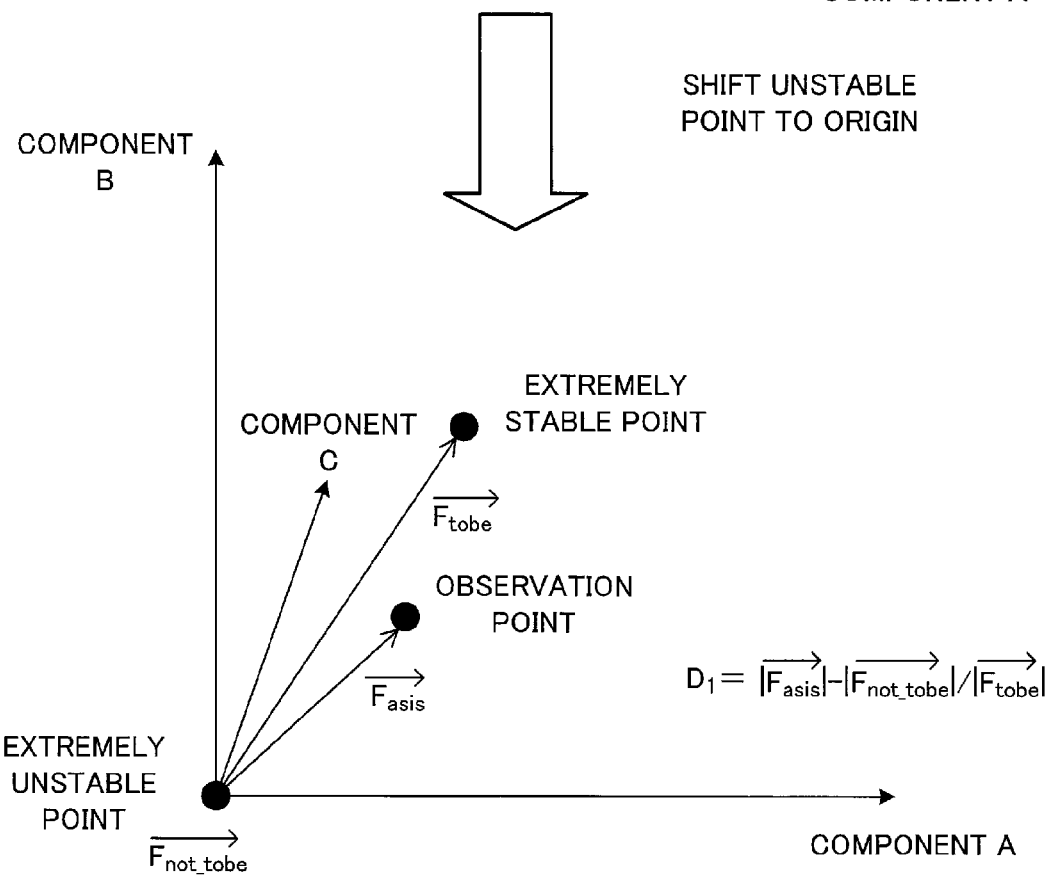

| HISTORY | TIME | INTERNAL STATE | | EXTERNAL STATE |
|---|---|---|---|---|
| | | AP_CPU | DB_CPU | |
| HISTORY 1 | 14:00 | 40% | 40% | STABLE |
| HISTORY 2 | 15:00 | 20% | 30% | STABLE |
| HISTORY 3 | 16:00 | 40% | 30% | STABLE |
| HISTORY 4 | 17:00 | 80% | 30% | UNSTABLE |
| HISTORY 5 | 18:00 | 20% | 90% | UNSTABLE |
| HISTORY 6 | 19:00 | 45% | 40% | STABLE |
| ⋮ | ⋮ | ⋮ | ⋮ | ⋮ |

FIG. 35

| DATE | 12/1 | 12/2 | 12/3 | 12/4 | 12/5 | 12/6 | 12/7 | 12/8 | 12/9 |
|---|---|---|---|---|---|---|---|---|---|
| $\Pi D_n$ | 1 | 1 | $1/\sqrt{2}$ | $1/\sqrt{2}$ | $1/\sqrt{2}$ | $1/\sqrt{2}$ | $1/\sqrt{2}$ | 1 | 0 |

DERIVE STABILITY ($\varepsilon_0 = 3/4$)

| DATE | 12/1 | 12/2 | 12/3 | 12/4 | 12/5 | 12/6 | 12/7 | 12/8 | 12/9 |
|---|---|---|---|---|---|---|---|---|---|
| STABILITY $S_t$ | 1 | 1 | −1 | −1 | −1 | −1 | −1 | 1 | RESET |

LENGTH OF STABLE PERIOD p AS OF DECEMBER 5

$$p = \sum_{t=12/1}^{t=12/5} S_t = -1$$

| DATE | 12/1 | 12/2 | 12/3 | 12/4 | 12/5 | 12/6 | 12/7 | 12/8 | 12/9 |
|---|---|---|---|---|---|---|---|---|---|
| STABILITY | 1 | 1 | -1 | -1 | -1 | -1 | -1 | 1 | RESET |

| DATE | 12/5 (PERIOD 12/1~12/5) | 12/6 (PERIOD 12/2~12/6) | 12/7 (PERIOD 12/3~12/7) | 12/8 (PERIOD 12/4~12/8) | 12/9 (PERIOD 12/5~12/9) |
|---|---|---|---|---|---|
| LENGTH OF MATURATION PERIOD p | -1 | -3 | -5 | -3 | RESET |
| MATURITY INDEX M | 4.30 | 0.76 | 0.29 | 1.9 | 0 |

FIG. 39

$$\text{Usefulness} = \sum_{n=1}^{N} \text{Similarity}(S_0, S_n) \times \text{Timing}(t) \times \text{Result}$$

211 COUNTERMEASURE HISTORY MANAGEMENT TABLE

| TENANT ID | COUNTERMEASURE HISTORY | COUNTER-MEASURE | DATE OF COUNTERMEASURE | RESULT OF COUNTER-MEASURE |
|---|---|---|---|---|
| TENANT 1 | Tenant1_Record1 | Op1 | 2011/10/05 | ○ |
| | Tenant1_Record2 | Op2 | 2012/2/01 | ○ |
| | Tenant1_Record3 | Op3 | 2012/1/01 | ○ |
| TENANT 2 | Tenant2_Record1 | Op1 | 2011/12/10 | ○ |
| | Tenant2_Record2 | Op2 | 2012/2/01 | × |
| TENANT 3 | Tenant3_Record1 | Op1 | 2012/10/01 | ○ |
| | Tenant3_Record2 | Op2 | 2011/11/01 | ○ |
| TENANT 4 | Tenant4_Record1 | Op1 | 2011/10/01 | ○ |
| | Tenant4_Record2 | Op2 | 2011/11/01 | ○ |
| TENANT 5 | Tenant5_Record1 | Op1 | 2011/10/01 | × |
| ... | | | | |

$M = 4.3$ $\text{Timing}(t) = \frac{1}{2}\left(e^{4.3(t-1)} + \frac{1}{e^{4.3 \times t}}\right) \quad (0 \leq t \leq 1)$ $= \frac{1}{2}\left(e^{4.3\left(\frac{12}{16}-1\right)} + e^{-4.3 \times \frac{12}{16}}\right) \approx 0.342$ $M = 11.7$ $\text{Timing}(t) = \frac{1}{2}\left(e^{11.7(t-1)} + \frac{1}{e^{11.7 \times t}}\right) \quad (0 \leq t \leq 1)$ $= \frac{1}{2}\left(e^{11.7\left(\frac{12}{14}-1\right)} + e^{-11.7 \times \frac{12}{14}}\right) \approx 0.094$

111 CONFIGURATION MANAGEMENT TABLE

| TENANT ID | SYSTEM PRODUCTION DATE/TIME | SYSTEM CONFIGURATION | | | | | | | ACCESS PATTERN (AVERAGE NUMBER OF REQUESTS) | | | ACCESS PATTERN (VARIANCE OF NUMBER OF REQUESTS) | | |
|---|---|---|---|---|---|---|---|---|---|---|---|---|---|---|
| | | LB | AP1 | AP2 | AP3 | DB | CACHE | | SMALL -150 | MEDIUM 150-300 | LARGE 300- | SMALL | MEDIUM | LARGE |
| TENANT1 | 2010/10/01 | 1 | 1 | 0 | 0 | 1 | 0 | | 0 | 1 | 0 | 0 | 1 | 0 |
| TENANT2 | 2010/12/01 | 1 | 1 | 1 | 0 | 1 | 1 | | 1 | 0 | 0 | 0 | 1 | 1 |
| TENANT3 | 2011/2/01 | 1 | 1 | 0 | 0 | 1 | 0 | | 0 | 0 | 1 | 0 | 0 | 1 |
| TENANT4 | 2011/4/01 | 1 | 1 | 0 | 0 | 1 | 0 | | 0 | 1 | 0 | 0 | 1 | 0 |
| TENANT5 | 2011/6/01 | 1 | 1 | 1 | 0 | 1 | 0 | | 1 | 0 | 0 | 0 | 1 | 0 |
| TENANT6 | 2011/8/01 | 1 | 1 | 1 | 0 | 1 | 0 | | 1 | 1 | 0 | 0 | 1 | 0 |
| NEW TENANT | 2012/02/01 | 1 | 1 | 0 | 0 | 1 | 1 | | 0 | 1 | 0 | 0 | 0 | 0 |

EVALUATION METHOD AND EVALUATION APPARATUS

CROSS-REFERENCE TO RELATED APPLICATIONS

This application is based upon and claims the benefit of priority of the prior Japanese Patent Application No. 2014-122314, filed on Jun. 13, 2014, and Japanese Patent Application No. 2014-206195, filed on Oct. 7, 2014, the entire contents of which are incorporated herein by reference.

FIELD

The embodiments discussed herein relate to an evaluation method and an evaluation apparatus.

BACKGROUND

Cloud computing is known which is able to use as many machine resources as necessary, whenever necessary. In cloud computing, resources may be shared among a plurality of persons.

In addition, cloud computing allows an operation form of an individual and automatic operation for each tenant (e.g., a system provided for each cloud user, or the like). For example, a variety of coping methods are preliminarily prepared so that the system is automatically operated, using the prepared coping methods. Here, coping methods, which are, for example, various rules for automatic operation, have described therein what type of countermeasure is supposed to be taken for what type of event such as occurrence of failures or errors.

As a technique of utilizing the result of countermeasure taken for failures, there is, for example, a technique that calculates the effect of trouble shooting as an evaluation value and also allows shared reference between similar devices.

In addition, there is a technique for sorting out effective rules by calculating an application evaluation value of a failure coping rule, and comparing the calculated application evaluation value with an application reference value of a self-failure recovery device.

Furthermore, as a policy refining scheme directed to autonomous operation management, there is a technique for determining whether or not the policy is divertible by determining the similarity of system configurations using a data model for managing the correlation between a policy and a system configuration.

When utilizing the result of countermeasure for a failure or the like, it is also important to correctly determine whether or not a failure has occurred in the system. Accordingly, there is conceived a technique for reducing the burden on the system administrator when providing determination criteria for detecting future failures, for example. In addition, there is also conceived an abnormal condition detecting device capable of predicting a various types of abnormality for which it is not necessarily clear how to identify the cause.
Japanese Laid-Open Patent Publication No. 2010-211597
Japanese Laid-Open Patent Publication No. 2006-53728
Japanese Laid-Open Patent Publication No. 2013-229064
Japanese Laid-Open Patent Publication No. 2013-011987
"Service-oriented policy refinement method on autonomous operation management", Mitsuhiro OONO, Kiyoshi KATO, Ryuichi HIRAIKE, IEICE (The Institute of Electronics, Information and Communication Engineers) technical report, Jul. 29, 2005, Vol. 105, No. 227, p. 13-18

When preparing a coping method for a particular system, it is efficient to prepare the method referring to the countermeasures that have been actually taken for many other systems. In such a case, it is possible to prepare a coping method which is useful for a particular system by evaluating whether or not each of the countermeasures taken many times in the past is useful for the particular system.

As one criterion for evaluating the countermeasures that have been taken in the past, there may be used a criterion related to the timing at which the countermeasure has been taken. For example, useful countermeasures for serious failures are often taken immediately after the start of operation (release) of the system, and the countermeasure taken most recently is often a useful countermeasure using the latest technology. Accordingly, it is possible to increase the reliability of evaluation by setting higher a value (usefulness) indicating availability of the countermeasure as a difference between the time at which the countermeasure has been taken and the start time of operation or the present time is smaller.

Here, regarding how much difference is provided depending on the difference of time of taking the countermeasure for the system, it is also possible to uniformly determine the difference of usefulness in advance, regardless for which system the countermeasure has been taken. However, such a uniform determination may not be appropriate in some cases.

For example, the period from when operation of a system is started to when the system enters stable operation (rate of maturing) differs between a system the operation of which is started after a sufficient time has been taken for development and testing, and a system the operation of which is started after only a short time has been taken for development and testing. With regard to a countermeasure taken after a predetermined time has elapsed from the start of system operation, therefore, the countermeasure will be taken after the stable operation if the system has quickly matured, but the countermeasure will be taken before the stable operation if the system has gradually matured. The importance of countermeasure is different between a countermeasure taken before the stabile operation and a countermeasure taken after the stable operation, and therefore evaluating the usefulnesses of both the countermeasures equally may deteriorate the reliability of evaluation.

SUMMARY

According to an aspect, there is provided a non-transitory computer-readable storage medium storing an evaluation program that causes a computer to perform a process including: calculating a maturity index for each of a plurality of systems, in which a specific countermeasure is respectively taken, based on a value related to a non-functional requirement of the each of the plurality of systems, the maturity index indicating a degree of operational stability of the each of the plurality of systems on timings of taking the specific countermeasure; and evaluating usefulness of the specific countermeasure for a first system based on similarity of configuration between the first system and the each of the plurality of systems, timimings that the specific countermeasure is taken, effects of the specific countermeasure, and the calculated maturity index.

The object and advantages of the invention will be realized and attained by means of the elements and combinations particularly pointed out in the claims.

BRIEF DESCRIPTION OF DRAWINGS

FIG. 9 illustrates an exemplary data structure of a system configuration information storage unit;

FIG. 17 illustrates an example of registering configuration information of a target system;

FIG. 18 illustrates an example of extracting a sample system;

FIG. 19 illustrates an exemplary accumulated failure frequency distribution.

FIG. 21 illustrates an example of calculating the timing evaluation value;

FIG. 22 illustrates an example of acquiring the effectiveness;

FIG. 25 illustrates an example of scaling out;

FIG. 29 illustrates an exemplary state vector;

FIG. 35 illustrates an example of calculating the length of a stable period;

FIG. 39 illustrates an example of calculating the timing evaluation value according to the third embodiment.

DESCRIPTION OF EMBODIMENTS

Figure 1:
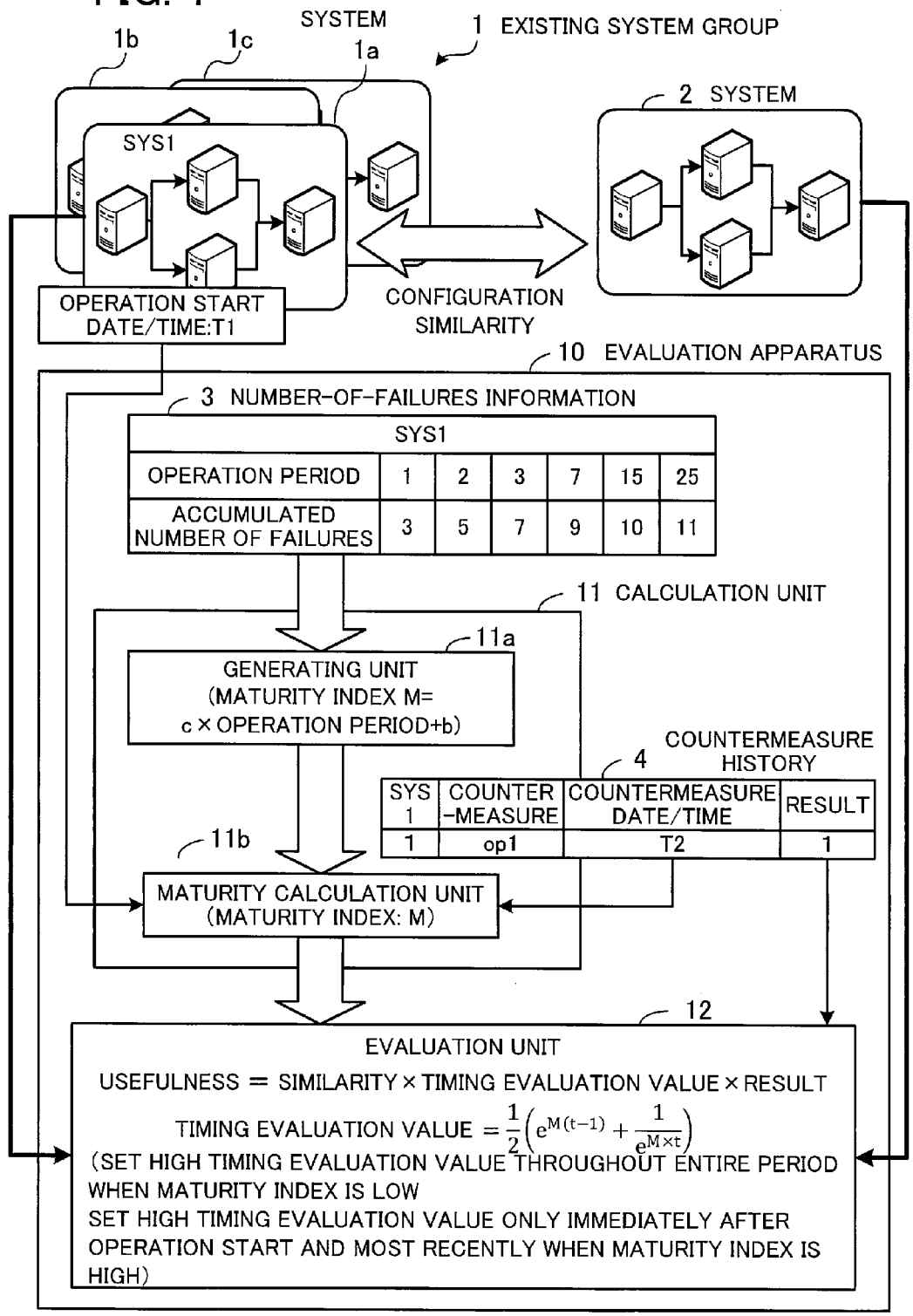
FIG. 1 illustrates an exemplary functional configuration of a device according to a first embodiment.

Several embodiments will be described below with reference to the accompanying drawings, wherein like reference numerals refer to like elements throughout.

First Embodiment

In the beginning, a first embodiment will be described. The first embodiment is intended to calculate, taking into account the maturity index of a system in which a countermeasure has been taken, the usefulness of taking the countermeasure in other systems so as to increase the reliability of the usefulness.

FIG. 1 illustrates an exemplary functional configuration of an apparatus according to a first embodiment. An evaluation apparatus 10 calculates a usefulness indicating whether or not a countermeasure taken in systems 1a, 1b and 1c included in an existing system group 1 is useful for another system 2 so as to evaluate whether or not the countermeasure is useful. The evaluation apparatus 10 has a calculation unit 11 and an evaluation unit 12.

The calculation unit 11 calculates a maturity index for each of the plurality of systems 1a, 1b, and 1c in which each countermeasure is taken, based on a value related to a non-functional requirement of the system 1a, 1b, 1c. The maturity index indicates a degree of operational stability of the system 1a, 1b, 1c. The non-functional requirement is a requirement other than the functional aspects desired for a system. For example, the non-functional requirement includes a requirement related to reliability, efficiency, or the like. The value related to the non-functional requirement includes, for example, a value related to the failure occurrence status, a value related to the system load, or the like. In addition, while monitoring a system in operation, it may be possible to acquire a value indicating a system operation state as the value related to the non-functional requirement.

The calculation unit 11 includes, for example, a generating unit 11a and a maturity calculation unit 11b.

The generating unit 11a generates, based on the accumulated failure occurrence status from the start of system operation for each of the plurality of systems 1a, 1b and 1c, relational information indicating a relation between an operation period of a system and the maturity index of the system. For example, the generating unit 11a generates relational information such that the longer the operation period of a system, the higher the maturity index is.

The relational information may be expressed as a function expression. In such a case, the generating unit 11a calculates, based on temporal variation of the failure occurrence status of the system, a maturity factor indicating a maturity degree (maturation rate) according to the length of the system operation period, and generates a function expression having set therein a maturity factor as a constant number. As to the maturity factor, for example, an accumulated value of the number of system failure occurrences is acquired at a predetermined interval, and a value indicating an increase degree of the accumulated value according to the length of operation period is used as the maturity factor.

For example, the generating unit 11a refers to number-of-failures information 3 indicating the failure occurrence status of each of the systems 1a, 1b and 1c included in the existing system group 1. The number-of-failures information 3 has set therein the number of failures having occurred so far (accumulated number of failures) in a system for each system operation period. The generating unit 11a determines the time when the system has entered a stable operation (the time when the system has sufficiently matured), based on the number-of-failures information 3. For example, it may be determined that the system has matured if the accumulated number of failures exhibits little increase. It is assumed in the example of FIG. 1 that the system matured in an operation period of 25 days. The generating unit 11a determines the accumulated number of failures when the system has matured as a predetermined maturity index, and expresses the relation between the operation period and the accumulated number of failures as a linear function, for example. When the relational information is expressed as a linear function, the generating unit 11a is supposed to calculate factors such as the slope of the linear function as the maturity factor, based on the number-of-failures information 3.

Based on the relational information acquired for the system in which the countermeasure has been taken, the maturity calculation unit 11b calculates, for each of the countermeasures taken in each of the plurality of systems 1a, 1b and 1c, the maturity index corresponding to the system operation period at the time of the countermeasure being taken. When a function expression indicating the relation between the operation period and the maturity index is generated by the generating unit 11a, for example, the maturity calculation unit 11b acquires the maturity index by substituting the operation period into the function expression.

The operation period may be calculated based on, for example, the operation start date/time of the system 1a in which the countermeasure has been taken and the countermeasure date/time included in the countermeasure history 4 related to the countermeasure. In other words, the maturity calculation unit 11b sets, as the operation period, the value acquired by subtracting the operation start date/time from the countermeasure date/time. The countermeasure history includes, in addition to the countermeasure date/time, the identifier of the system in which the countermesure has been taken, the identifier of the countermeasure, the result of countermesure, and the like. The result of countermesure has set therein "1" when the countermeasure has been effective or "0" when the countermeasure has not been effective, for example.

The evaluation unit 12 calculates the usefulness for a particular system 2, using the similarity between the configurations of the system 2 and the system 1a in which the countermeasure has been taken, the time of the taking of the countermeasure, the effects of the countermeasure, and the maturity index of the system 1a during the taking of the countermeasure. The evaluation unit 12 may also evaluate whether the countermeasure is useful, using the calculated usefulness. For example, the evaluation unit 12 evaluates the usefulness higher as the time of countermeasure is closer to either the operation start time or the present time. In doing so, the evaluation unit 12 sets larger the difference of usefulness in accordance with closeness of the time of countermeasure to either the operation start time or the present time, as the maturity index of the system in which the countermeasure has been taken is higher.

For example, the evaluation unit 12 calculates the timing evaluation value, using an expression having the maturity index and the time of the taking of the countermeasure as variables. In the expression for calculating the timing evaluation value, if the maturity index is low, the timing evaluation value is high throughout the entire period, with regard to the time of the taking of the countermeasure. Additionally, in the expression for calculating the timing evaluation value, if the maturity index is high, the timing evaluation value is high only during the periods when countermeasures have been taken immediately after the operation start and most recently, whereas the timing evaluation value is low if the period when countermeasures have been taken is other than the above periods.

The evaluation unit 12 calculates the usefulness, using the timing evaluation value acquired in this manner. For example, the evaluation unit 12 calculates the similarity between the configurations of the system 1a in which the countermeasure has been taken and the system 2 for which taking the countermeasure is being considered. The evaluation unit 12 then sets, as the usefulness, the value obtained by multiplying the similarity, the timing evaluation value, and the result of countermeasure. The evaluation unit 12 compares the usefulness calculated for the countermeasure with a predetermined threshold value, for example, and determines whether the countermeasure is useful.

The evaluation apparatus 10 described above starts evaluation according to the instruction of evaluating whether the countermeasure taken for the failure which has occurred in any of the systems in the existing system group 1, for example, is useful for the newly produced system 2. Upon starting evaluation, the generating unit 11a first generates relational information indicating a relation between an operation period and the maturity index for each of the systems 1a, 1b and 1c. Next, the maturity calculation unit 11b calculates, for each of the countermeasures respectively taken in each of the systems 1a, 1b and 1c, the maturity index of the system in which the countermeasure has been taken, at the time of the taking of the countermeasure. The evaluation unit 12 then calculates the usefulness of each countermeasure, taking into account the maturity index of the system, and evaluates whether the countermeasure is useful for the system 2, according to the usefulness.

According to the aforementioned evaluation apparatus 10, the maturity index of the system during the taking of the countermeasure is reflected to the calculation of the usefulness of the countermeasure, and therefore the reliability of evaluation using the usefulness increases.

For example, evaluating the usefulness higher as the maturity index of a system is lower allows an evaluation such that: the shorter the elapsed time from the operation start is, or the less frequently the system has been used, the more important the countermeasures taken over the period from development to post-operation are as a whole. In addition, it is possible to extract only prior countermeasures by evaluating higher countermeasures at a timing immediately after the operation start and at a most recent timing as the maturity index is higher, and by evaluating lower countermeasures at a timing other than the above. For example, even a system being stably operated tends to experience serious failures immediately after the operation start, and therefore the countermeasures taken at the time are considered to be important. In addition, countermeasures taken most recently in a system being stably operated are considered to include such an important countermeasure as overcoming serious vulnerability.

On the other hand, importance of a countermeasure taken in a stably operated system neither immediately after the operation start nor most recently is not high, because such a countermeasure turns out to be unnecessary by taking other subsequent countermeasures. For example, although a countermeasure against a failure of software of a certain version has been taken in the past, upgrading of the software version makes the countermeasure before the upgrading unnecessary.

In addition, an appropriate maturity index may be calculated taking into account the difference of development/operation periods for each system in order to generate relational information between the operation period and the maturity index from the occurrence status of failures of the system in the past.

In the example illustrated in FIG. 1, although the maturity index is calculated based on the accumulated number of failures, using the accumulated number of failures as the value related to the non-functional requirement, a value indicating the operation state of the system acquired by monitoring the system may be used as the value related to the non-functional requirement. CPU use rate, memory use rate, number of error logs, number of bug fixes, or the like may be used as the value indicating the operation state of the system.

The calculation unit 11 determines the stability of the operation of the system during a unit period (e.g., one day), for example, based on the value indicating the operation state of the system. The calculation unit 11 then calculates the maturity index of the system, based on the stability of the system during each unit period within a predetermined period until the countermeasure is taken. By calculating the maturity index based on the stability of the system for each unit period within a predetermined period until when a countermeasure is taken in this manner, it is possible to calculate a correct maturity index even when the correlation between the operation period and the maturity index of the system is low.

The generating unit 11a, the maturity calculation unit 11b, and the evaluation unit 12 may be realized by a processor provided in the evaluation apparatus 10, for example. In addition, the lines connecting respective components illustrated in FIG. 1 indicate a part of the communication path, and communication paths other than the illustrated communication path may be configured.

Second Embodiment

Next, a second embodiment will be described. The second embodiment is intended to extract a useful countermeasure for a system to be newly produced, from countermeasures taken in a system for each tenant constructed in a cloud computing system (cloud system, in the following).

Figure 2:
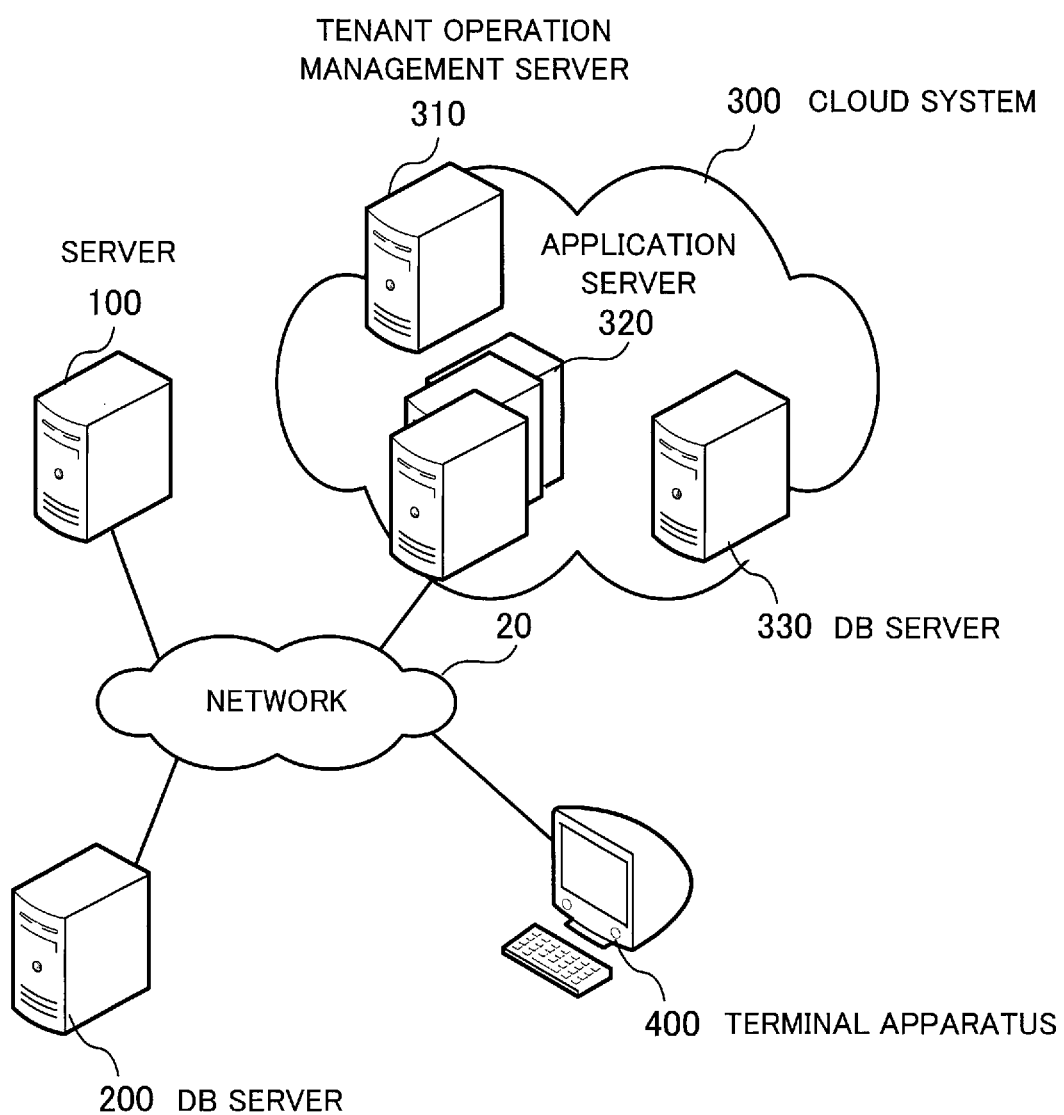
FIG. 2 illustrates an exemplary system configuration of a second embodiment.

FIG. 2 illustrates an exemplary system configuration of the second embodiment. A server 100, a database (DB) server 200, a cloud system 300, and a terminal apparatus 400 are connected via a network 20. The server 100 evaluates, with regard to the countermeasure having been taken in a system constructed in the cloud system 300, the usefulness for a system to be newly introduced. The DB server 200 stores and manages the history (countermeasure history) of countermeasures having been taken in the system constructed in the cloud system 300.

The cloud system 300 has constructed therein systems respectively corresponding to a plurality of tenants. In order to construct a system for each tenant, the cloud system 300 has tenant operation management server 310, a plurality of application servers 320, and a DB server 330.

The tenant operation management server 310 manages the operation form (tenant information), operation state, operation history, or the like, of an existing system for each user using the cloud system 300, for example. The tenant operation management server 310 may also determine the configuration of a new system, upon receiving a deployment request of a new system from the terminal apparatus 400. The application server 320 performs a corresponding procedure using predetermined application software, according to a request from the terminal apparatus 400, for example. The DB server 330 stores various kinds of data such as execution history, input data, results of processing performed on the cloud system 300.

The terminal apparatus 400 is a computer used by the administrator managing the entire system or each tenant. The terminal apparatus 400 transmits configuration information of a new system to the server 100 or the cloud system 300, using for example a browser function or a command line, and causes the server 100 or the cloud system 300 to prepare an operation coping method for the new system. An information communication terminal such as a tablet terminal or a smart phone may be used as the terminal apparatus 400.

Next, the hardware configuration of the server 100 will be described.

Figure 3:
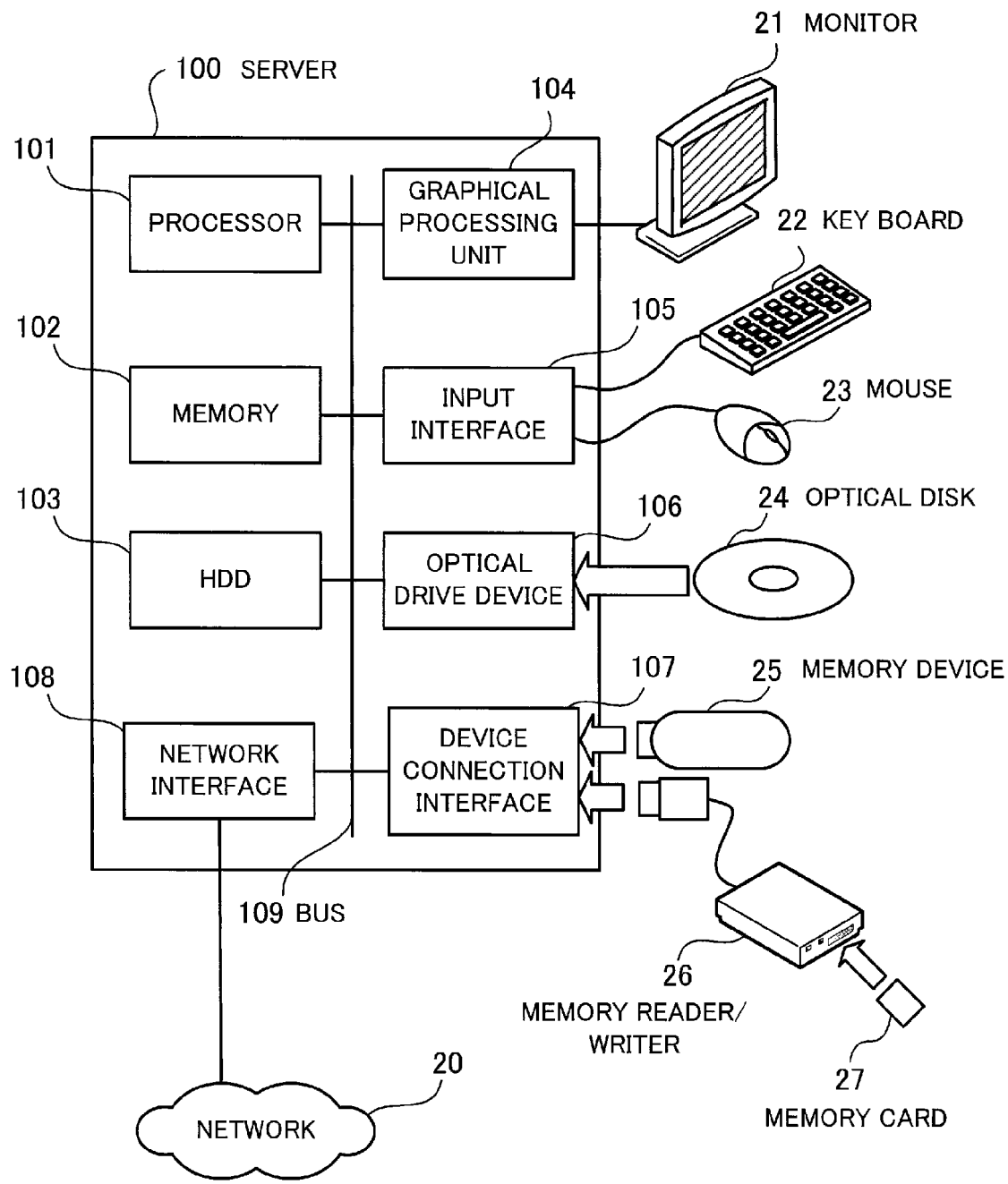
FIG. 3 illustrates an exemplary hardware configuration of a server to be used in the second embodiment.

FIG. 3 illustrates an exemplary hardware configuration of a server to be used in the second embodiment. The server 100 is controlled as a whole by a processor 101. A memory 102 and a plurality of peripheral devices are connected to the processor 101 via a bus 109. The processor 101 may be a multiprocessor. The processor 101 is for example, a CPU (Central Processing Unit), an MPU (Micro Processing Unit), or a DSP (Digital Signal Processor). At least a part of the functions to be realized by executing programs by the processor 101 may be realized by an electronic circuit such as an ASIC (Application Specific Integrated Circuit) or a PLD (Programmable Logic Device).

The memory 102 is used as the main storage device of the server 100. The memory 102 temporarily stores at least a part of the OS (Operating System) programs or application programs to be executed by the processor 101. In addition, the memory 102 stores various kinds of data necessary for processing by the processor 101. A volatile semiconductor storage device such as a RAM (Random Access Memory), for example, is used as the memory 102.

There are an HDD (Hard Disk Drive) 103, a graphical processing unit 104, an input interface 105, an optical drive device 106, a device connection interface 107, and a network interface 108 as peripheral devices connected to the bus 109.

The HDD 103 magnetically writes and reads data to and from a built-in disk. The HDD 103 is used as an auxiliary storage device of the server 100. The HDD 103 stores the OS programs, application programs, and various kinds of data. A nonvolatile semiconductor storage device such as a flash memory may also be used as an auxiliary memory.

The graphical processing unit 104 has a monitor 21 connected thereto. The graphical processing unit 104 displays images on the screen of the monitor 21, according to instructions from the processor 101. A display unit using a CRT (Cathode Ray Tube) or a liquid crystal display may be used as the monitor 21.

The input interface 105 has a keyboard 22 and a mouse 23 connected thereto. The input interface 105 transmits, to the processor 101, signals which have been sent from the keyboard 22 and the mouse 23. The mouse 23 is an exemplary pointing device and other pointing devices may also be used. A touch panel, a tablet, a touchpad, a track ball, or the like may be used as other pointing devices.

The optical drive device 106 reads data stored in an optical disk 24 using laser beam, or the like. The optical disk 24 is a portable storage medium storing data thereon to be readable by reflection of light. A DVD (Digital Versatile Disc), a DVD-RAM, a CD-ROM (Compact Disc Read Only Memory), a CD-R (Recordable)/RW (ReWritable), or the like, may be used as the optical disk 24.

The device connection interface 107 is a communication interface for connecting peripheral devices to the server 100. For example, a memory device 25 or a memory reader/writer 26 may be connected to the device connection interface 107. The memory device 25 is a storage medium having a communication function with the device connection interface 107. The memory reader/writer 26 is a device configured to write or read data to or from a memory card 27. The memory card 27 is a card-type storage medium.

The network interface 108 is connected to the network 20. The network interface 108 transmits and receives data to and from other computers or communication devices via the network 20.

According to the aforementioned hardware configuration, the processing function of the second embodiment may be realized. Although an exemplary hardware configuration of the server 100 is illustrated in FIG. 3 as a representative, the DB server 200, the tenant operation management server 310, the application server 320, the DB server 330, and the terminal apparatus 400 may also be realized by a hardware configuration similar to that of the server 100. In addition, the evaluation apparatus 10 described in the first embodiment may also be realized by a hardware configuration similar to that of the server 100 illustrated in FIG. 3.

The server 100 realizes the processing function of the second embodiment by executing a program stored on a computer-readable storage medium, for example. The program having described therein the content of processing to be performed by the server 100 may be stored on a variety of storage media. For example, the program to be executed by the server 100 may be stored in the HDD 103. The processor 101 loads at least a part of the program in the HDD 103 to the memory 102 and executes the program. In addition, program to be executed by the server 100 may be stored on a portable storage medium such as the optical disk 24, the memory device 25, or the memory card 27. The program stored on a portable storage medium is installed in the HDD 103 through control by the processor 101, for example, and becomes executable thereafter. Alternatively, the processor 101 may read and execute the program directly from the portable storage medium.

In a system with such a configuration, a system for each tenant operates in the cloud system 300. The system for each tenant constructed in the cloud system 300 is operated automatically as much as possible. In order to realize automatic operation of the system, there is preliminarily prepared a coping method for occurrence of a failure. Preparing a coping method may facilitate automatic operation of the system. The coping method may be expressed as a countermeasure graph, for example.

Figure 4:
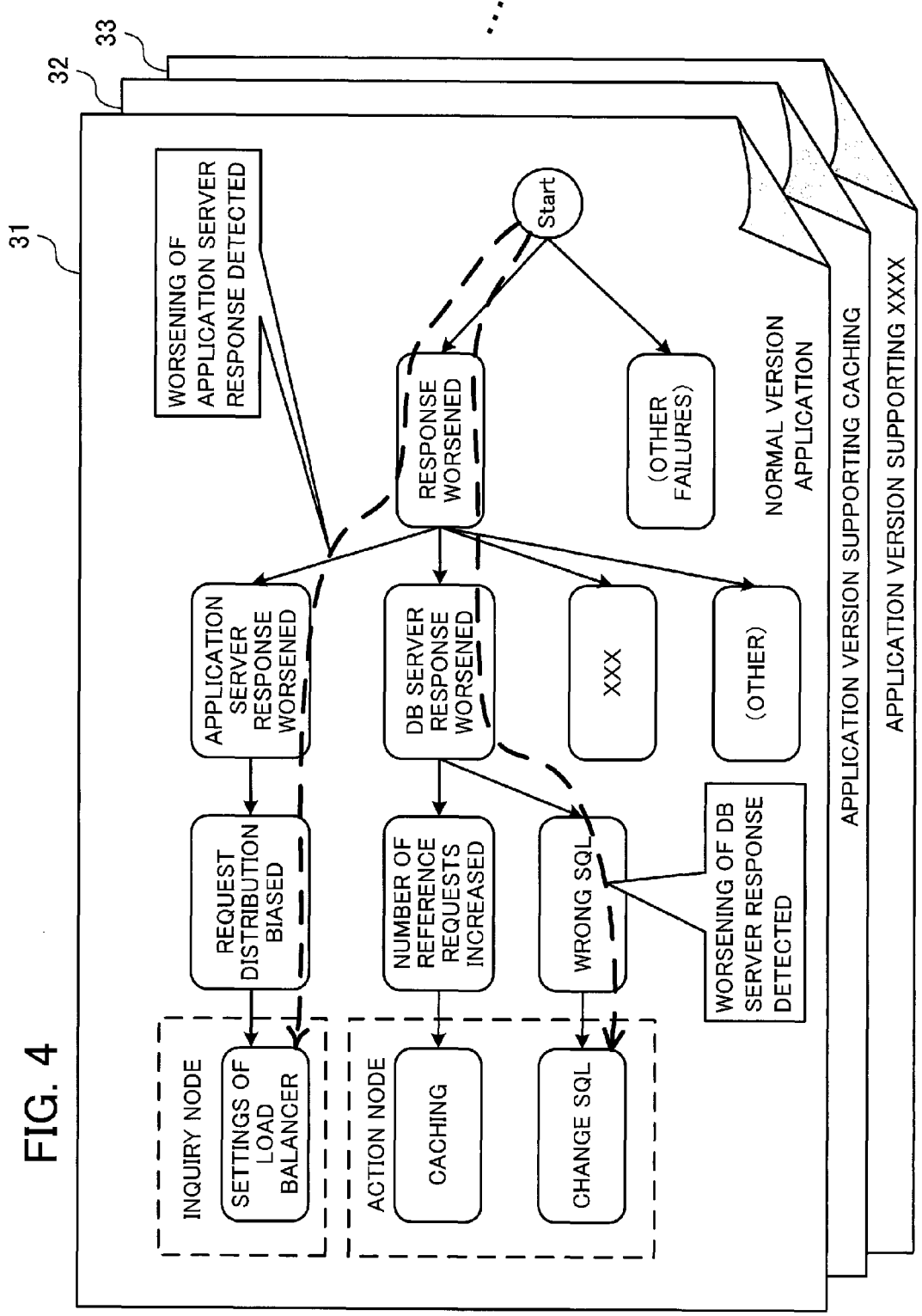
FIG. 4 illustrates an example of a countermeasure graph.

FIG. 4 illustrates an example of a countermeasure graph. Countermeasure graphs 31, 32, 33, . . . are generated for each application software executed by an application server, for example.

The countermeasure graphs 31, 32, 33, . . . include nodes (rectangular or circular marks) and edges (arrows connecting nodes). A node indicated by a circle is a start node. The start node is connected to a node indicating a failure. Beyond the node of failure, a node indicating the state of the system at the time of failure occurrence is connected by an edge. To the tail end, a node indicating a countermeasure at the time of failure occurrence is connected. A node indicating a countermeasure is categorized into an action node and a question node. The action node directly indicates a countermeasure for eliminating the failure. The question node indicates matters to be inquired to the administrator for identifying the cause of failure.

Upon occurrence of a failure during operation of a system in the cloud system 300, the tenant operation management server 310, for example, traces nodes from the start node according to the event being observed, referring to a countermeasure graph for the application in which the failure has occurred. The tenant operation management server 310 then takes the countermeasure indicated by the termination node. In the example of FIG. 4, the tenant operation management server 310, upon detecting degradation of response of the application server 320, transmits a message inquiring the setting of the load balancer to the system administrator. In addition, when degradation of response of the DB server 330 is detected and existence of a wrong SQL (Structured Query Language) is confirmed, the tenant operation management server 310 performs a procedure of changing the SQL.

A system being operated in the cloud system 300 may be subject to change of configuration which may influence an operation system. In addition, a new system may be constructed in the cloud system 300 for a new tenant. In such a case, a coping method adapted to the new system is supposed to be prepared.

When preparing a coping method for a new system, it becomes easy to prepare a countermeasure graph by diverting a coping method included in an existing countermeasure graph. When diverting an existing coping method, a countermeasure which will be never used or very rarely used may also be included by diverting a coping method which is useless for the new system. For example, an outdated coping method which may be replaced by a substitute plan, or a legacy coping method in a system being stably operated for a long period will never, or very rarely, be used in the future. Inclusion of such an unnecessary coping method in the countermeasure graph may be a cause of deriving an erroneous result when searching a coping method suited to the failure.

Accordingly, it is important to prepare a countermeasure graph including only countermeasures which may be effectively used for the new system, among the countermeasures indicated in the existing coping method. For example, it is conceivable to calculate the usefulness for the new system of the countermeasures having been taken in the existing system in the past, and adopt a countermeasure with a high usefulness. Calculation of the usefulness uses the following evaluation criteria, for example.

Evaluation Criterion 1: the usefulness of a countermeasure is set higher as the system in which the countermeasure has been taken is more similar to a system for which an operation system is to be newly generated.

Evaluation Criterion 2: the usefulness of a countermeasure is set higher as the timing of taking the countermeasure is closer to either most recently or immediately after release of the system.

Evaluation Criterion 3: the usefulness of a countermeasure (for solving problems) is set higher as the countermeasure has more effects as the result of taking the countermeasure.

Using such an evaluation criterion makes it possible to narrow down the countermeasures to those which are useful to some extent. However, the aforementioned evaluation criteria are not necessarily sufficient. In other words, the aforementioned evaluation criteria, which assume a constant degree of weighting of the countermeasures immediately after releasing and those performed most recently regardless of the maturity index of the system, fail to perform evaluation according to the maturity index of the system and overlook the countermeasures with a high usefulness. Here, the term "maturity index" of a system refers to the stability of the system such as whether or not the system is bug-prone. For example, when a system has just been released or is running an unstable application, the maturity index of the system is low. Alternatively, when a system is being operated in a proven environment, or a sufficient time has elapsed since its release, the maturity index of the system is high.

Generally, modifications such as bug fixing are performed also after system release and therefore the maturity index increases with time from development to post-operation also. For example, a growth curve is used as a software reliability evaluation model. Specifically, a Gompertz curve or a logistic curve is used. It is considered that the maturity index also increases similarly to such a growth curve.

The reliability of evaluating the availability of countermeasure may further increase, using the maturity index as described above. For example, it is conceivable to generally set a high usefulness to countermeasures taken in a system with a low maturity index, and, for a system with a high maturity index, set a high usefulness to only the countermeasures taken most recently and immediately after the release of the system. In other words, since any countermeasure is important at the stage with a low maturity index, it is possible to prevent overlooking useful countermeasures by skipping the aforementioned evaluation criteria 1 and 2, or reducing the importance of the evaluation criteria.

However, the rate of maturing varies depending on the characteristics of the system.

Figure 5:
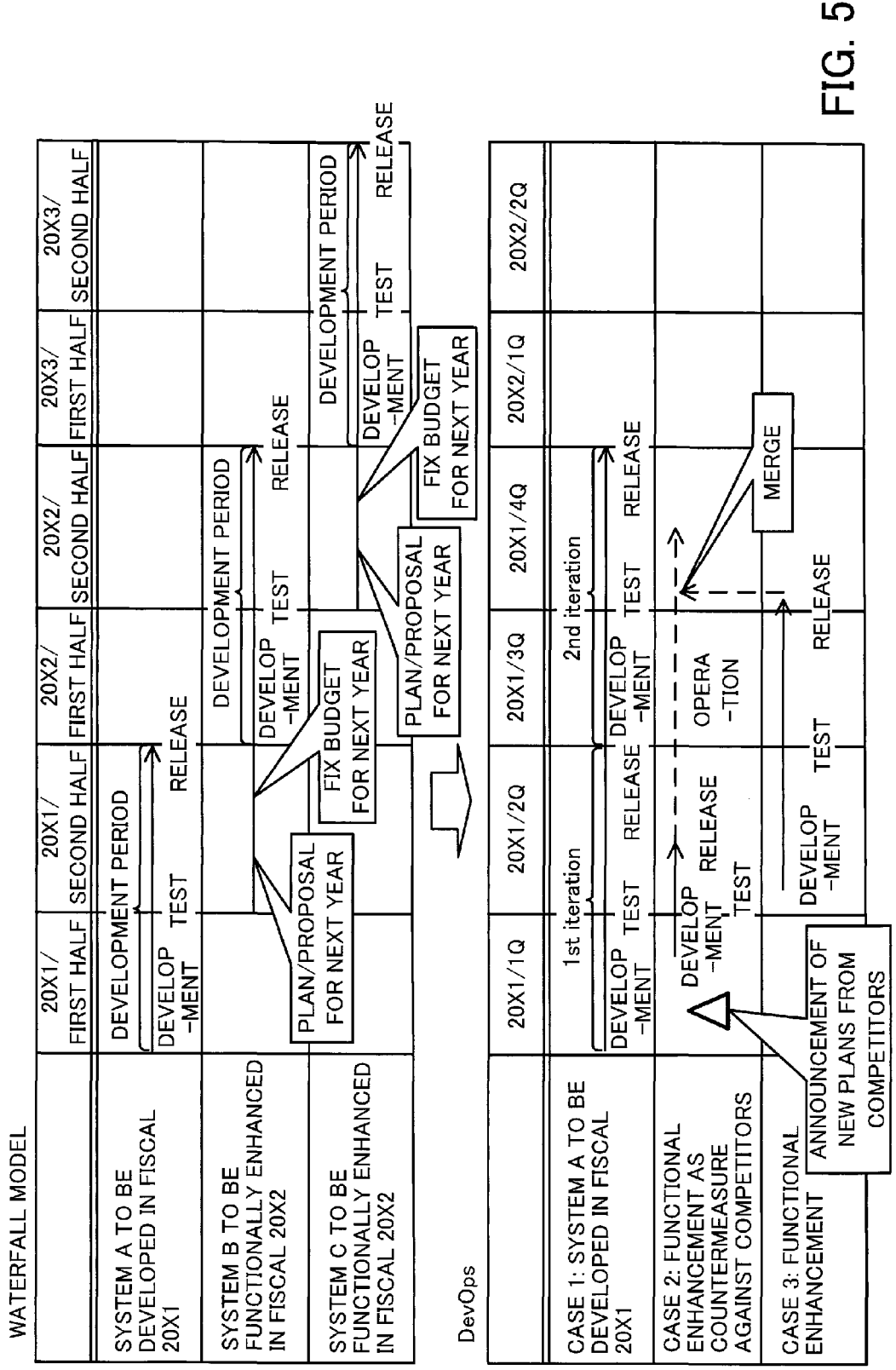
FIG. 5 illustrates a difference in system maturity index according to the development method.

FIG. 5 illustrates a difference between maturities of systems depending on the development method. The upper part of FIG. 5 illustrates a development schedule of a system developed according to a software development method called the waterfall model. In addition, the lower part illustrates a development schedule of a system developed according to a software development method called DevOps. DevOps is a system release form of combining Development and Operations.

The waterfall type development is the mainstream of the conventional system development. According to the development method, requirements are fixed at the early stage of development and therefore the schedule is subject to little change. For example, as illustrated in FIG. 5, the budget is fixed quarterly, semi-annually, or annually according to the business custom, and the development proceeds keeping to a preliminarily assumed development period. Accordingly, it is possible to estimate the maturation process of a system, regardless of the characteristics of the system, and determine the maturity index with the maturation rate of the system being fixed.

On the other hand, there is increasing the number of companies that adopt the DevOps-type development-style for developing cloud-based systems. With the DevOps-type development, there are development cases that suddenly arise with various development periods. In the example of FIG. 5, for example, the maturation period is semi-annual for "case 1", whereas the maturation period is approximately quarter for "case 2". Accordingly, maturation rates of systems are different for different development periods. Moreover, a function of "case 3" is added to "case 2" after a while from releasing "case 2". A system which has gone through such a complicated development process has a different rate of maturing from that of "case 1". For example, determining the maturity index of "case 2" with a criterion similar to that of "case 1" and evaluating countermeasures based on the maturity index may result in evaluating the countermeasures as a whole to be higher than in reality. In other words, there is a risk that the maturity index of "case 2" is determined to be low, although the maturity index is high. As a result, a countermeasure taken neither most recently nor immediately after release of the system may also be adopted for inclusion in the newly prepared coping method, among the countermeasures taken after maturation.

In these days when cloud systems have become common, it is important to prepare an appropriate criterion for determining the maturity index for each system. Accordingly, the second embodiment analyzes the progress of maturation individually for each system, and generates calculation expression of a maturity index. Accordingly, the maturity index of the system during the taking of the countermeasure is appropriately determined, and whereby the reliability of evaluating the availability increases.

For example, the following criteria are added, which use a maturity index as an evaluation criterion of the usefulness.

<Maturity-Based Evaluation Criterion 1>

The lower the maturity index of a system is, the higher the usefulness of a countermeasure is evaluated, throughout the entire period related to the time of taking the countermeasure. Accordingly, the shorter the elapsed time from release of a system, or the less used the system is, the more important the taken countermeasures become as a whole, throughout the entire operation period.

<Maturity-Based Evaluation Criterion 2>

The higher the maturity index is, the higher the countermeasures taken immediately after the operation start or taken most recently are evaluated and the lower the countermeasures taken at other timings are evaluated. Accordingly, it is determined that the countermeasures taken immediately after the operation start or taken most recently become more important for a system with a sufficient elapsed time from the start of operation, or more frequently used, whereas other countermeasures are useless.

In the second embodiment, the maturity factor is calculated for each of the characteristics of the system, referring to the past performance of the system, and a maturity index according to the maturity factor is used.

Next, a calculation method of the usefulness taking into account the maturity index will be described. When a certain countermeasure has been taken for N sets of systems (N being an integer equal to or larger than 1) in the past, the usefulness of the countermeasure may be calculated using the following expression.

$$\text{Usefulness} = \sum_{n=1}^{N} \text{Similarity}(S_0, S_n) \times \text{Timing}(t) \times \text{Result} \quad (1)$$

Here, the term Similarity $(S_0, S_n)$ is the similarity between the configurations of a system $(S_0)$ for which a coping method is to be prepared and the n-th (n is an integer of 1 or more and N or less) system $(S_n)$. The similarity between systems may be calculated by methods such as, for example, Cosine-based similarity, Correlation-based similarity, or Adjusted cosine-based similarity.

Timing (t) is an evaluation value related to the time of taking the countermeasure (timing evaluation value). t is a real number indicating the time at which the countermeasure has been taken ($0 \leq t \leq 1$). The value of t indicating the time of the countermeasure start is "0", and the value of t indicating the present time is "1". Result is a value indicating effectiveness of a countermeasure. Result is "1" when a countermeasure is effective; otherwise Result is "0".

The timing evaluation value may be calculated using the following expression, for example.

$$\text{Timing}(t) = \frac{1}{2}\left(e^{M(t-1)} + \frac{1}{e^{M \times t}}\right) \quad (2)$$

The left term in the parenthesis of the right side of the expression (2) is a formula of evaluating a countermeasure taken closer to most recently to be more important. The right term in the parenthesis is a formula of evaluating a countermeasure taken closer to immediately after the start of system operation to be more important. M is the maturity index of the system in which the countermeasure has been taken, during the taking of the countermeasure. The maturity index M is expressed by the following expression, for example.

$$M = c \times t_0 + b \quad (3)$$

Here, c and b are maturity factors. A maturity factor is a constant number for adjusting, based on the transition of the accumulated number of failures from the past failure history with time, variation characteristics of the maturity index so as to match the variation characteristics of the accumulated number of failures. $t_0$ is the elapsed time (e.g., days elapsed) from the start of system operation to the time of taking the countermeasure. The smaller the value of the maturity index M of a system in which a countermeasure has been taken is, the more the maturation of the system has progressed and the more stably the system is being operated.

An appropriate timing evaluation value according to the maturity index of a system when a countermeasure has been taken may be acquired by calculating the timing evaluation value using the expression (2).

Figure 6:
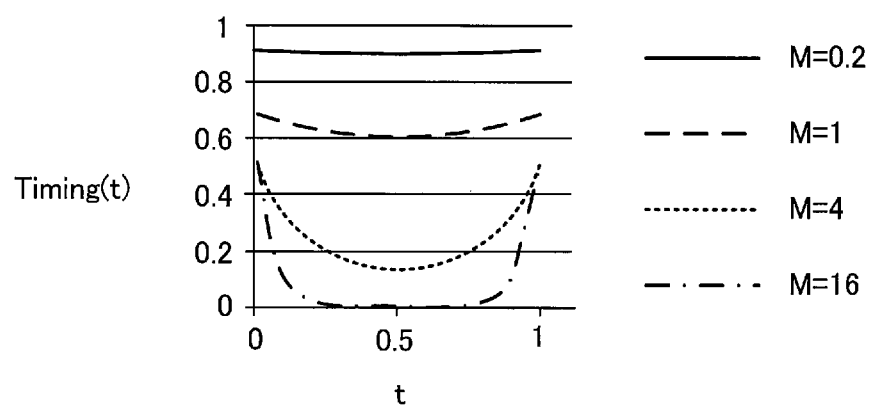
FIG. 6 illustrates variation of relation between the time of taking a countermeasure and the timing evaluation value due to a difference in the maturity index.

FIG. 6 illustrates the variation of the relation between the time of taking a countermeasure and the timing evaluation value due to a difference in maturity index. In the example of FIG. 6, a graph is illustrated with the horizontal axis indicating t, and the vertical axis indicating the timing evaluation value (Timing (t)). The graph indicates the relation with the time of taking a countermeasure for a plurality of timing evaluation values with different maturities.

As illustrated in FIG. 6, the larger the maturity index M is, the more significantly important the countermeasure having been taken immediately after the start of operation or having been taken most recently is evaluated, by calculating the timing evaluation value using the expression (2). In an immature system (whose maturity index M is low), on the other hand, there is less difference of timing evaluation values due to the difference of times of taking countermeasures than in a mature system. In an immature system, timing evaluation values are high throughout the entire period of taking countermeasures.

The foregoing means that there are few negligible countermeasures from the start of system operation to the most recent time in an immature system. On the contrary, it means that a countermeasure taken in the course of maturation need not be considered when preparing a coping method in a mature system.

The calculation formula of the timing evaluation value may be other than the expression (3). For example, although the expression (3) is a linear function, the timing evaluation value may be calculated using an exponential function as follows.

$$M = K/(1 + be^{-ct}) \quad (4)$$

Here, K is a real number indicating the maximum maturity index (K>0), and e is the base of natural logarithm (Napierian number). Using an exponential function makes it possible to precisely express how the maturity index rises rapidly immediately after the operation start, for example, and the growth rate of maturing gradually slows down while operation is continued.

In the following, functions of respective devices in the second embodiment will be described.

Figure 7:
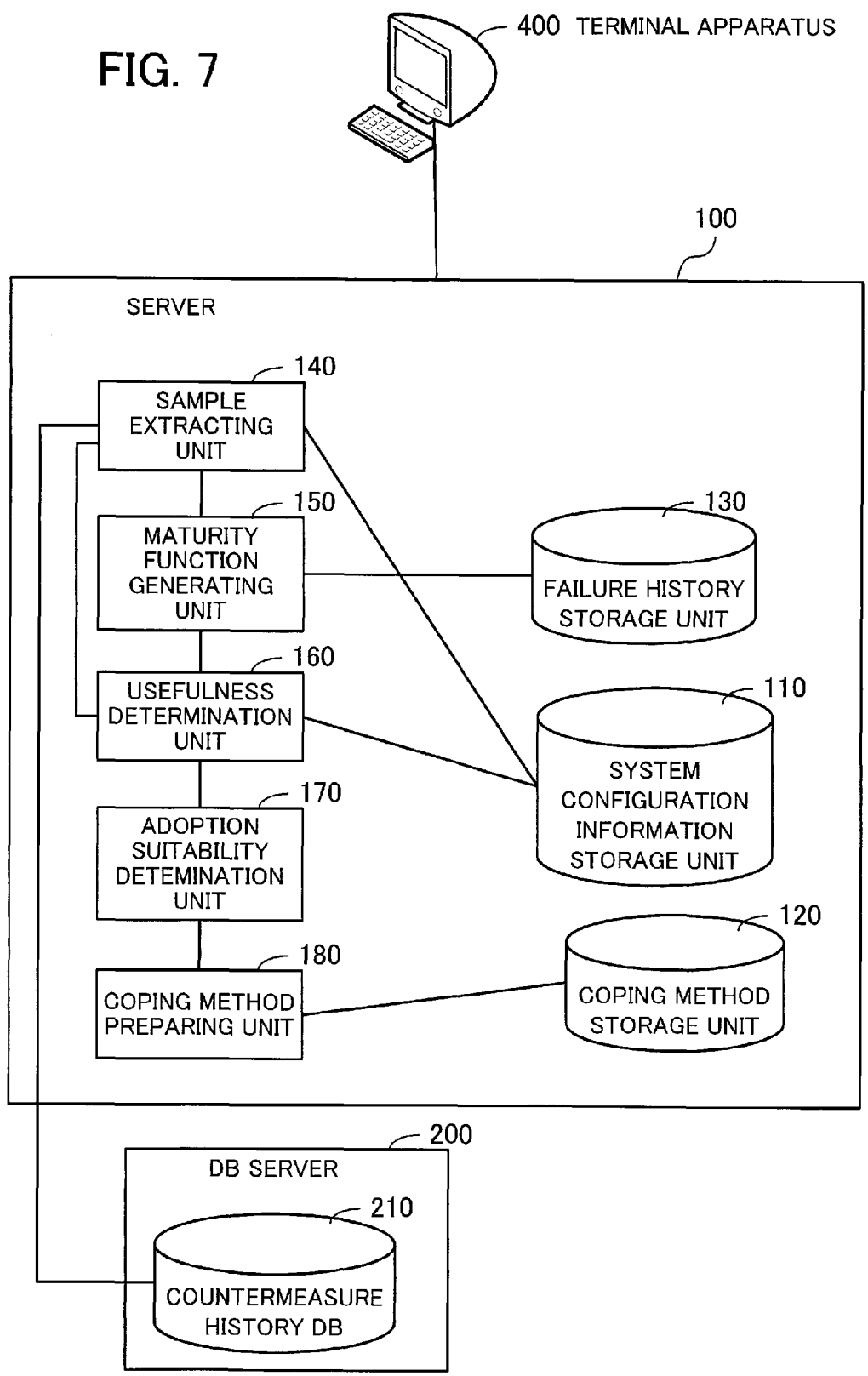
FIG. 7 is a block diagram illustrating the functions for realizing the second embodiment.

FIG. 7 is a block diagram illustrating the functions for realizing the second embodiment. The DB server 200 has a countermeasure history DB 210. The countermeasure history DB 210 has stored therein a history of countermeasures for failures having occurred in any of systems constructed in the cloud system 300.

The server 100 has a system configuration information storage unit 110, a coping method storage unit 120, a failure history storage unit 130, a sample extracting unit 140, a maturity function generating unit 150, a usefulness determination unit 160, an adoption suitability determination unit 170, and a coping method preparing unit 180.

The system configuration information storage unit 110 stores configuration information indicating the configuration of each of the systems constructed in the cloud system 300. The configuration information indicates, for example, the type of server included in a system. In addition, the configuration information may include an operation state such as the amount of requests being processed by the system.

The coping method storage unit 120 stores a coping method list for failures of systems constructed in the cloud system 300. The coping methods indicate, for example, determination criteria as to whether or not to take a countermeasure.

The failure history storage unit 130 stores history information (failure history) of failures having occurred in systems constructed in the cloud system 300. The failure history includes, for example, dates and times when countermeasures were taken against failures.

The sample extracting unit 140 extracts, from the countermeasure histories held in the DB server 200, a countermeasure history to be diverted to the coping method to be prepared. For example, the sample extracting unit 140 extracts a countermeasure history randomly. In addition, the sample extracting unit 140 may extract a part of systems of the systems constructed in the cloud system 300 as a sample, and extract a countermeasure history for the system. For example, the sample extracting unit 140 extracts a history of countermeasures taken on systems having similar configurations, among systems for which coping methods are to be prepared. The sample extracting unit 140 transmits the identification information (tenant ID) of a system extracted as a sample and the countermeasure history of the system to the usefulness determination unit 160. In addition, the sample extracting unit 140 transmits the identification information (tenant ID) of the system extracted as a sample to the maturity function generating unit 150.

The maturity function generating unit 150 generates a function expression for calculating the maturity index (maturity function) for each system, based on the failure history of a sample system. The maturity function is, for example, a function having the operation period of the system as a variable.

The maturity function generating unit 150 calculates a parameter (maturity factor) indicating the rate of maturing of the system, based on, for example, variation of the accumulated value of the number of failures having occurred in the system (accumulated number of failures having occurred), and generates a function expression including the parameter as a constant number. The maturity function generating unit 150 transmits the generated maturity function to the usefulness determination unit 160.

The usefulness determination unit 160 determines the usefulness of a countermeasure indicated in the countermeasure history extracted by the sample extracting unit 140. When determining the usefulness, the usefulness determination unit 160 refers to a system configuration information storage unit 110, calculates the similarity between the configuration of a system for which a coping flag is to be generated and the configuration of a system in which a countermeasure has been taken, and takes the similarity into account. In addition, when determining the usefulness, the usefulness determination unit 160 takes into account the maturity index of the system in which the countermeasure has been taken. The maturity function generating unit 150 may calculate the maturity index using the generated maturity function. The usefulness determination unit 160 transmits the determined usefulness to the adoption suitability determination unit 170.

The adoption suitability determination unit 170 determines, based on the usefulness of each countermeasure, whether or not to adopt the countermeasure as the one to be diverted to the coping method to be prepared. For example, the adoption suitability determination unit 170 adopts a countermeasure whose usefulness is equal to or higher than a predetermined threshold value. The adoption suitability determination unit 170 transmits, to the coping method preparing unit 180, the information related to the countermeasure determined to be adopted.

The coping method preparing unit 180 prepares a new coping method, using the information related to the countermeasure determined to be adopted. The coping method is expressed by a countermeasure graph, for example. For example, the coping method preparing unit 180 connects, by edges, nodes indicating events (events such as failures or the like, or an observed state of a system) having causal relations. In addition, the coping method preparing unit 180 generates a countermeasure graph by connecting, by edges, nodes indicating countermeasures and nodes indicating events having direct causal relations with the countermeasures. The coping method preparing unit 180 transmits the prepared coping method to the terminal apparatus 400, for example.

With such a configuration, it is possible to appropriately evaluate countermeasures taken in the past and prepare a coping method for taking a useful countermeasure.

Here, the lines connecting respective components illustrated in FIG. 7 indicate a part of a communication path, and a communication path other than that illustrated may be set. The maturity function generating unit 150 illustrated in FIG. 7 is an example of the generating unit 11*a* of the first embodiment illustrated in FIG. 1. The usefulness determination unit 160 illustrated in FIG. 7 is an example of the maturity calculation unit 11*b* of the first embodiment illustrated in FIG. 1. The adoption suitability determination unit 170 illustrated in FIG. 7 is an example of the evaluation unit 12 of the first embodiment illustrated in FIG. 1. In addition, the functions of respective components illustrated in FIG. 7 may be, for example, realized by causing a computer to execute a program module corresponding to the components.

Next, information used for evaluating a countermeasure and preparing a coping method will be specifically described.

Figure 8:
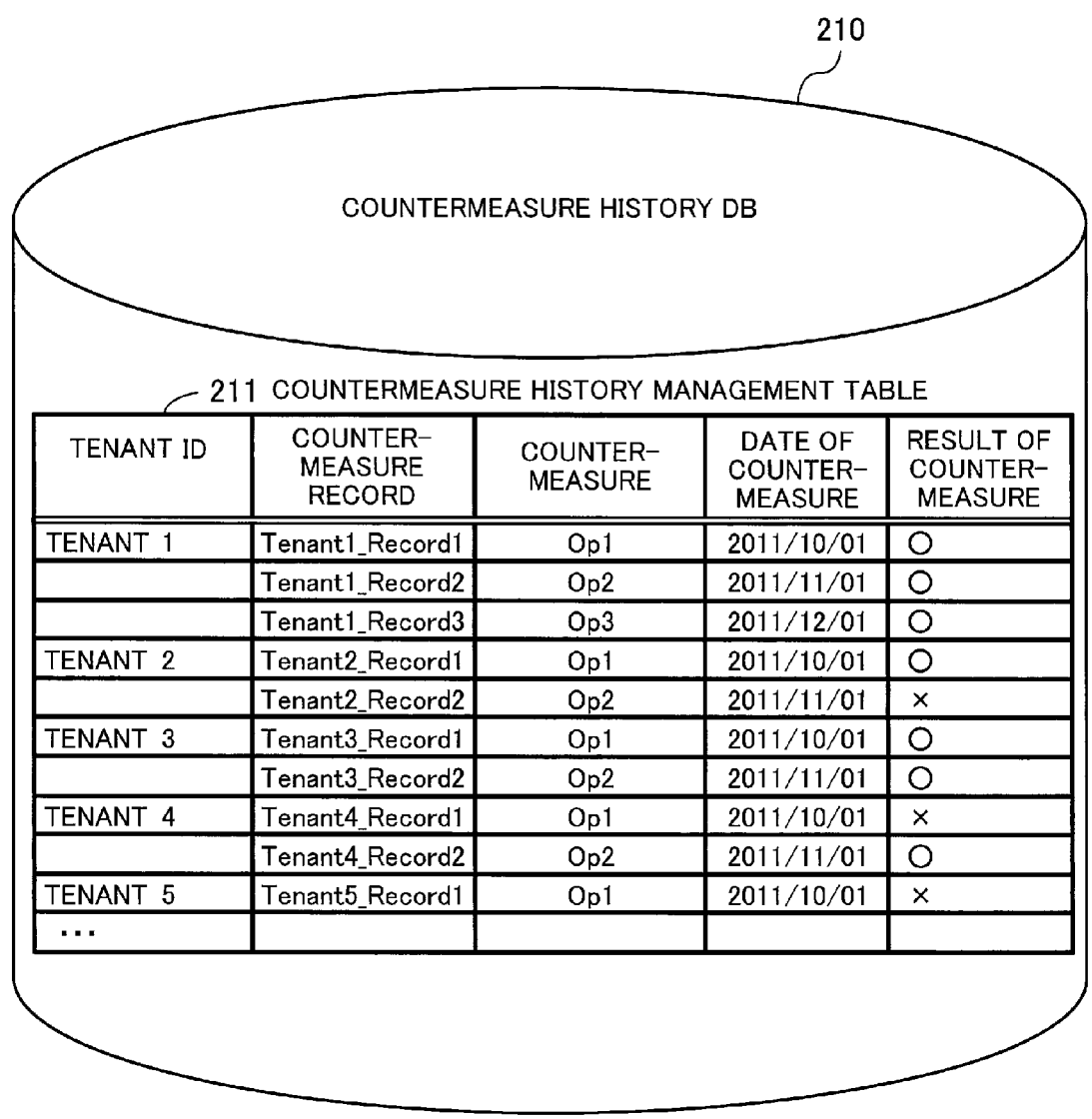
FIG. 8 illustrates an exemplary data structure of a countermeasure history DB.

FIG. 8 illustrates an exemplary data structure of a countermeasure history DB. The countermeasure history DB 210 is stored in a countermeasure history management table 211, for example. The countermeasure history management table 211 has registered therein records for each of the countermeasures having been taken in the systems constructed in the cloud system 300 as countermeasure histories. The countermeasure history management table 211 has columns for tenant ID, countermeasure record, countermeasure, date of countermeasure, and result of countermeasure.

The tenant ID column has set therein an identifier of a tenant (tenant ID) uniquely set to a system. The tenant ID is also an identifier of a system. The countermeasure record column has set therein an identification number of a countermeasure history. The countermeasure column has set therein an identifier of a countermeasure taken in a system indicated by the tenant ID. The date-of-countermeasure column has set therein a date of the taking of a countermeasure. The result-of-countermeasure column has set therein a flag indicating whether or not a purpose has been achieved as a result of countermeasure. In the example of FIG. 8, a circle is marked in the result-of-countermeasure column when the purpose has been achieved. When, on the other hand, the purpose has not been achieved, a cross is marked in the result-of-countermeasure column. The purpose of countermeasure is, for example, to eliminate the failure to be coped with, or mitigate the adverse influence due to the failure.

FIG. 9 illustrates an exemplary data structure of a system configuration information storage unit. The system configuration information storage unit 110 stores, for example, a configuration management table 111. The configuration management table 111 stores the configuration or operation state of a system corresponding to a tenant. The configuration management table 111 has columns for tenant ID, system production date and time, system configuration, access pattern (average number of requests), and access pattern (variance of number of requests).

The tenant ID column has set therein a tenant ID of a tenant corresponding to a system configured in the cloud system 300. The system-production-date-and-time column has set therein a date and time when a system is produced.

The system configuration column has set therein a function included in a system. In the example of FIG. 9, presence or absence of each of a load balancer (LB), application servers (AP1, AP2, AP3), a database server (DB), and a Cache server is set to the system configuration column. "1" is set when there exists a corresponding function, whereas "0" is set when there does not exist a corresponding function.

The access pattern (average number of requests) column has set therein a per-unit-time average number of requests to a system from the outside. In the example of FIG. 9, magnitude of the average number of requests is classified into three levels: "small", "medium", and "large". A system with the per-unit-time average number of requests being smaller than "150" is classified as having a "small" average number of requests. A system with the per-unit-time average number of requests being equal to or larger than "150" and smaller than "300" is classified as having a "medium" average number of requests. A system with the per-unit-time average number of requests being equal to or larger than "300" is classified as having a "large" average number of requests.

The access pattern (variance of number of requests) column has set therein a degree of variance of the number of requests to a system from the outside. In the example of FIG. 9, the degree of variance of number of requests is classified into three levels: "small", "medium", and "large". A system with the value of the variance of number of requests being smaller than a first threshold value is classified as having a "small" variance of number of requests. A system with the value of the variance of number of requests being equal to or larger than the first threshold value and smaller than a second threshold value (the first threshold value<the second threshold value) is classified as having a "medium" variance of number of requests. A system with the value of the variance of number of requests being equal to or larger than the second threshold value is classified as having a "large" variance of number of requests.

Figure 10:
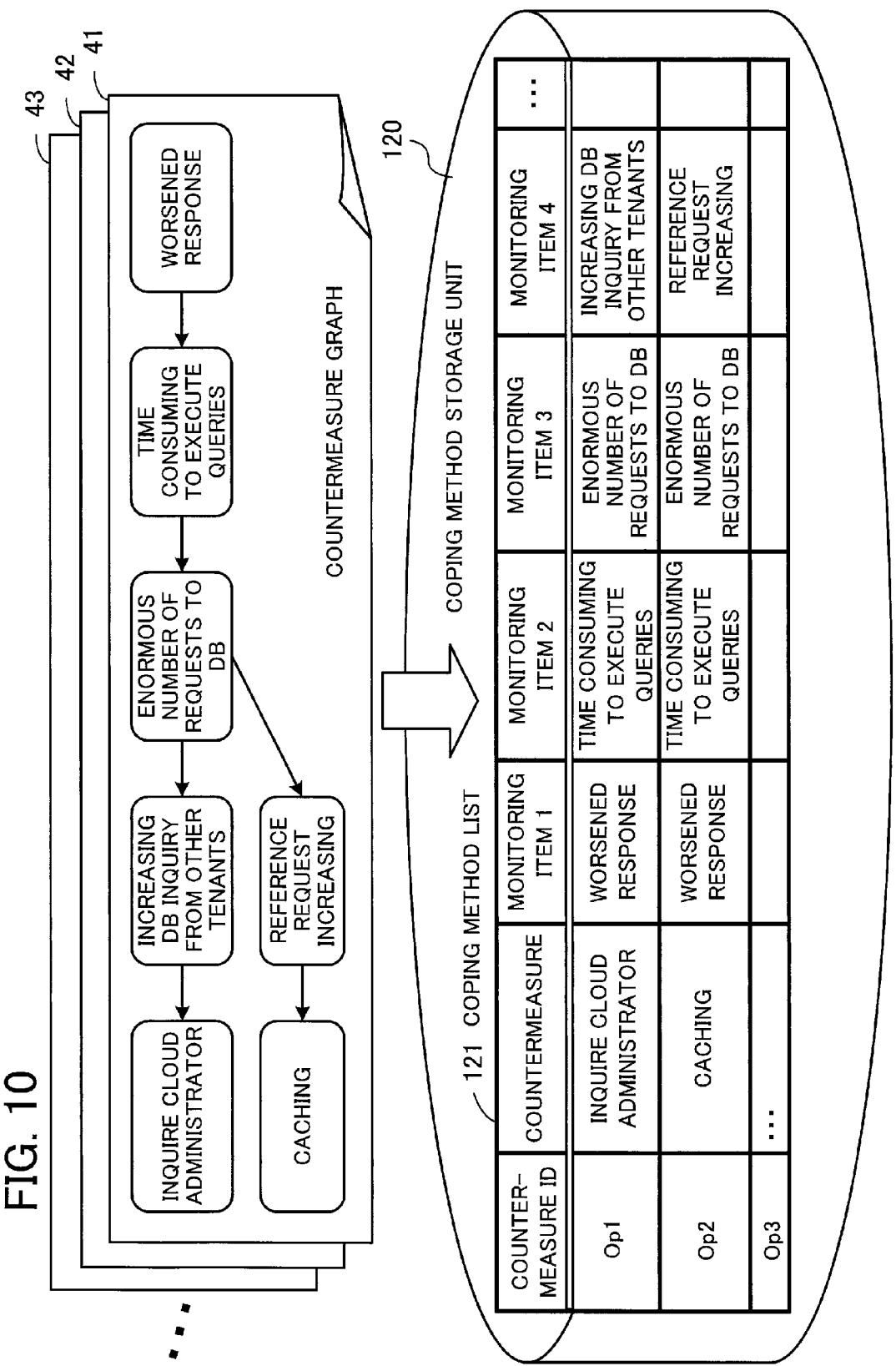
FIG. 10 illustrates an exemplary data structure of a coping method storage unit.

FIG. 10 illustrates an exemplary data structure of a coping method storage unit. The coping method storage unit 120 stores a coping method list 121. The coping method list 121 stores information related to a feasible coping method. The coping method list 121 may be generated based on, for example, countermeasure graphs 41, 42, 43, . . . which have been generated for existing systems.

The coping method list 121 has columns for countermeasure ID, countermeasure, and a plurality of monitoring items. The countermeasure ID column has set therein an identifier of a countermeasure (countermeasure ID). The countermeasure column has set therein content of a countermeasure. The plurality of monitoring-item columns have set therein monitor items, each of which being a criterion when determining execution of the countermeasure. Each record of the coping method list 121 indicates that the system being operated takes the countermeasure described in the countermeasure column when a phenomenon (event) described in any of the monitoring-item columns has occurred.

For example, the countermeasure graph 41 includes two coping methods, namely, a coping method for taking a countermeasure "inquire the cloud administrator" and a coping method for taking a countermeasure "Caching". Accordingly, records respectively indicating the two coping methods are set in the coping method list 121, based on the countermeasure graph 41.

Figure 11:
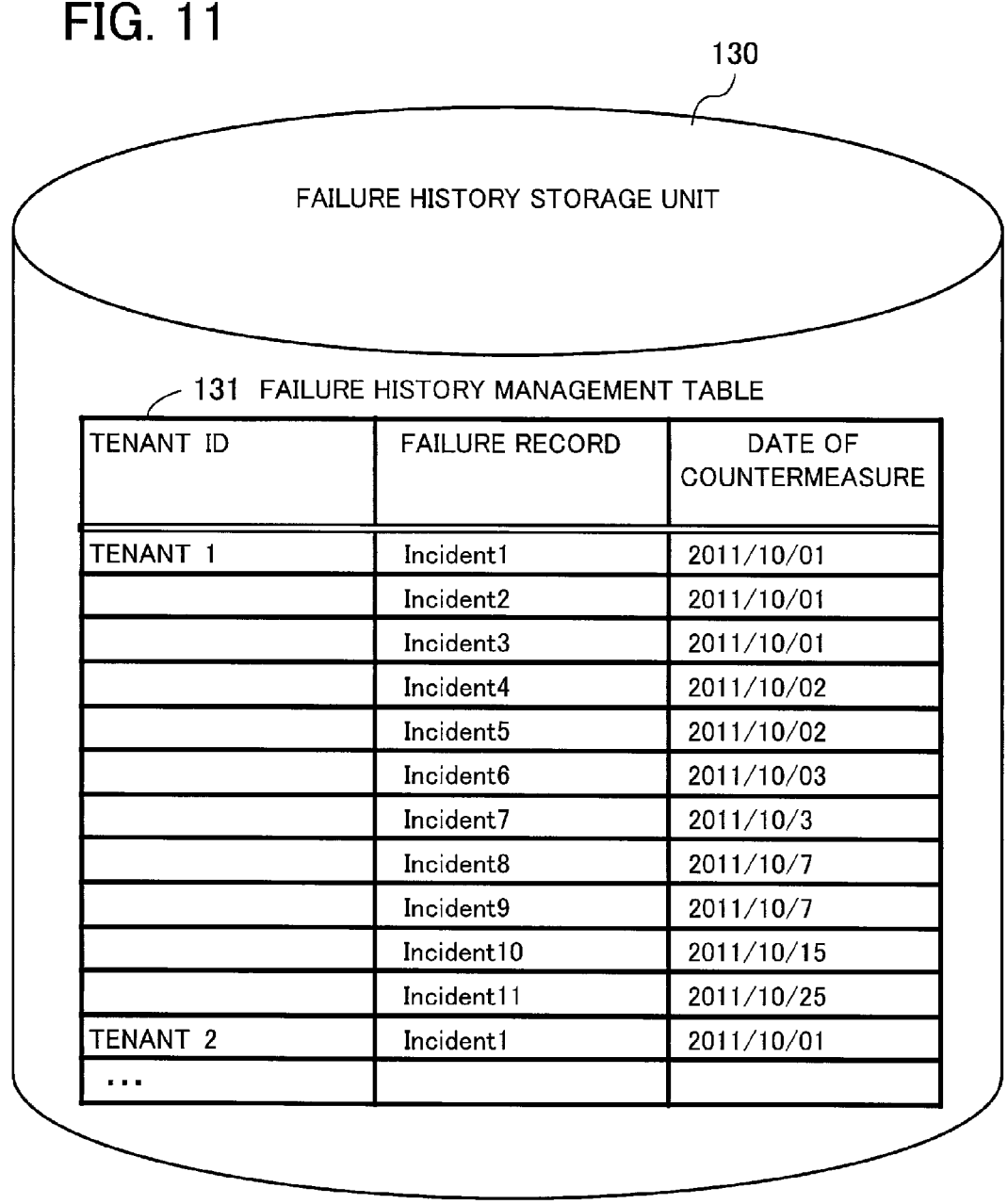
FIG. 11 illustrates an exemplary data structure of a failure history storage unit.

FIG. 11 illustrates an exemplary data structure of a failure history storage unit. The failure history storage unit 130 stores a failure history management table 131. The failure history management table 131 has columns for tenant ID, failure record, and date of countermeasure. The tenant ID column has set therein a tenant ID of a tenant corresponding to a system constructed in the cloud system 300. The failure record column has set therein identification information of a failure having occurred. The date-of-countermeasure column has set therein a date of countermeasure for a failure.

Using the aforementioned information, the server 100 prepares a coping method corresponding to any of the systems in the cloud system 300. For example, when adding a new system in the cloud system 300, a coping method corresponding to the system is prepared.

In the following, a procedure of preparing a coping method will be described.

Figure 12:
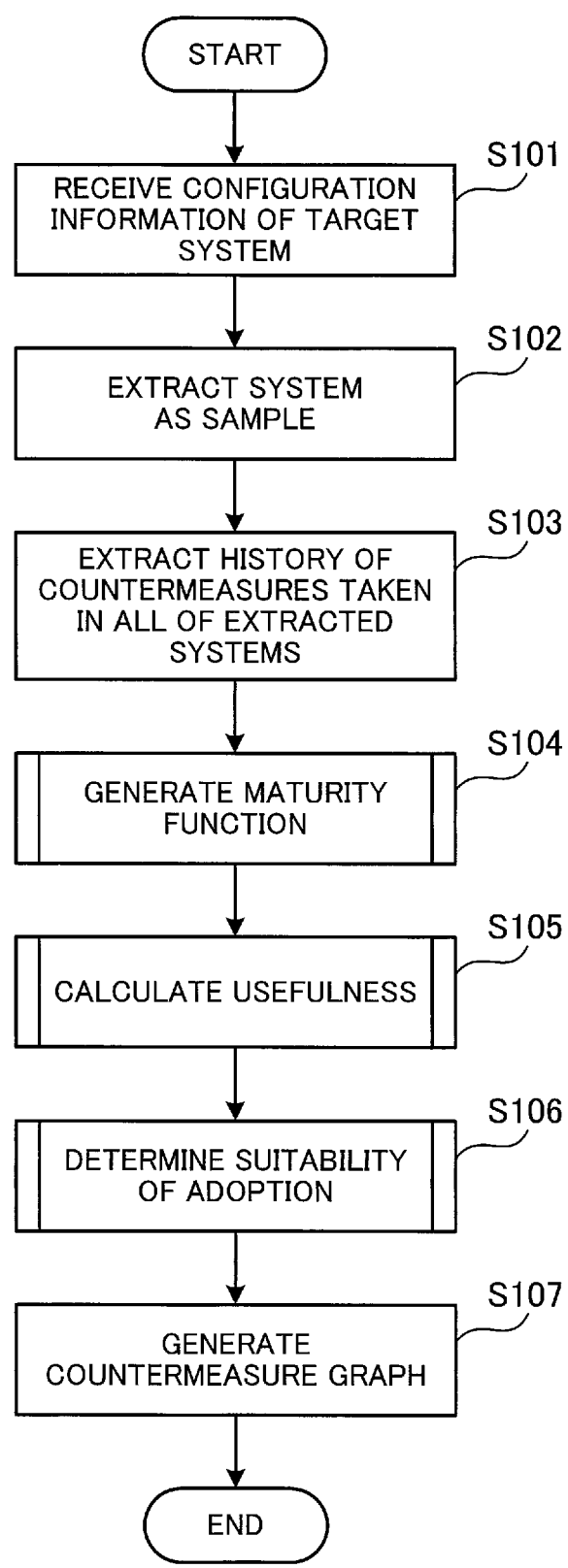
FIG. 12 is a flowchart illustrating a procedure of preparing a coping method.

FIG. 12 is a flowchart illustrating a procedure of preparing a coping method.

Figure 16:
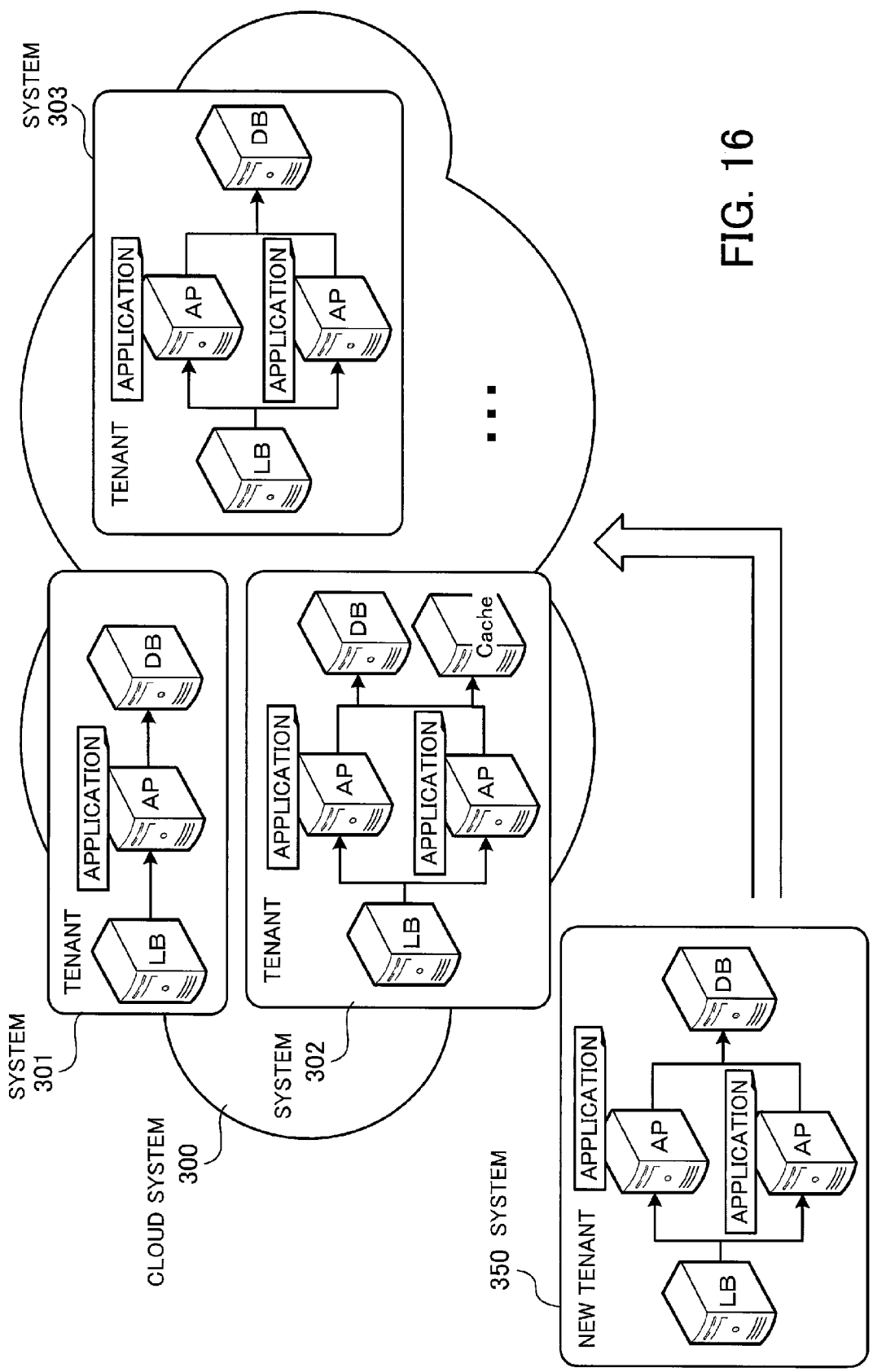
FIG. 16 illustrates an example of adding a system.

(Step S101) The server 100 receives, from the terminal apparatus 400 for example, configuration information of a system (target system) for which a coping method is to be prepared. In the example of FIG. 16 described below, configuration information of a system 350 is input from the terminal apparatus 400.

(Step S102) The sample extracting unit 140 of the server 100 extracts systems as samples from among the systems whose configuration information has been registered in the system configuration information storage unit 110. The systems to be extracted may be, for example, all the existing system being managed in the cloud system 300, or systems satisfying a predetermined condition. For example, the sample extracting unit 140 calculates the similarity between the systems already constructed in the cloud system 300 and the target system, and extracts a system whose similarity with the target system is equal to or higher than a predetermined value. In addition, the sample extracting unit 140 may extract, as a sample, a system newly added within a predetermined period or a system whose configuration has been changed.

(Step S103) The sample extracting unit 140 extracts, from the countermeasure history DB 210 of the DB server 200, a history of countermeasures having been taken in each of the systems extracted as samples. The sample extracting unit 140 transmits, for example, the tenant ID and the countermeasure history of each of the systems extracted as samples to the usefulness determination unit 160. In addition, the sample extracting unit 140 transmits, for example, the tenant ID of each of the systems extracted as samples to the maturity function generating unit 150.

(Step S104) The maturity function generating unit 150 generates a maturity function, based on the countermeasure history of the sample system. For example, the maturity function generating unit 150 calculates a maturity factor indicating characteristics such as the rate of system maturation. The maturity function generating unit 150 then generates, as the maturity function, a function expression including the calculated maturity factor as a constant number. The maturity function generating unit 150 transmits the generated maturity function to the usefulness determination unit 160. Details of the maturity function generating procedure will be described below (see FIG. 13).

(Step S105) The usefulness determination unit 160 calculates a usefulness for the target system, for each countermeasure indicated in the countermeasure history of the sample system. The configuration information of the sample system and the target system, and the maturity function of the sample system are used for calculating the usefulness. The usefulness determination unit 160 transmits the usefulness of each countermeasure to the adoption suitability determination unit 170. Details of the usefulness calculation procedure will be described below (see FIG. 14).

(Step S106) The adoption suitability determination unit 170 determines whether or not each countermeasure is suitable to be adopted for diversion when preparing a coping method. For example, the adoption suitability determination unit 170 adopts a countermeasure whose usefulness is equal to or higher than a predetermined value. The adoption suitability determination unit 170 notifies the coping method preparing unit 180 of the countermeasure to be adopted.

Details of the adoption suitability determination procedure will be described below (see FIG. 15).

(Step S107) The coping method preparing unit 180 generates a countermeasure graph indicating the coping method to be used in the operation management of the target system, based on the coping method to be adopted.

Figure 13:
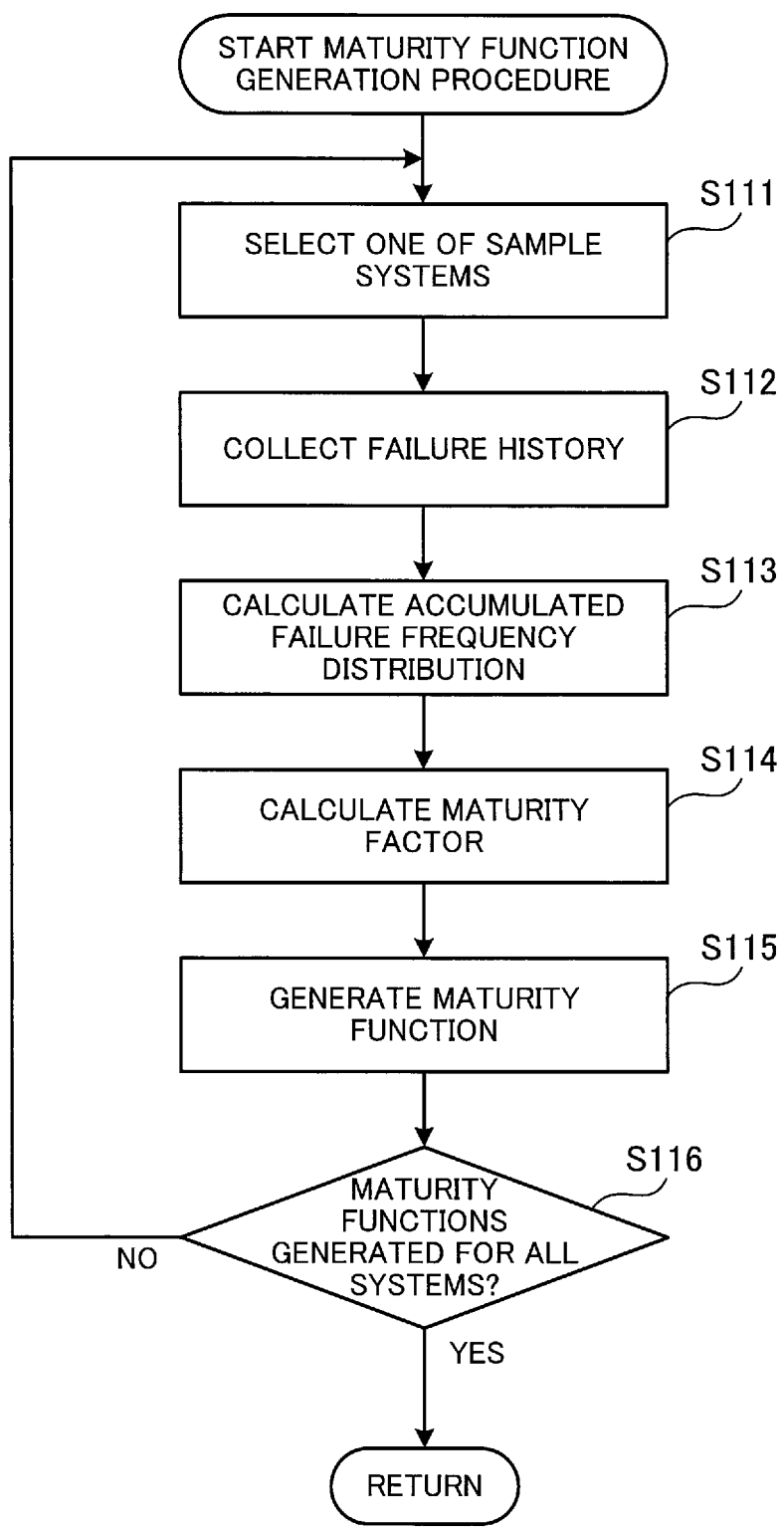
FIG. 13 is a flowchart illustrating an exemplary procedure of a maturity function calculation process.

FIG. 13 is a flowchart illustrating an exemplary procedure of maturity function calculation process.

(Step S111) The maturity function generating unit 150 selects one of yet-to-be-selected systems from the systems which have been extracted as samples. A sample system is, for example, a system whose configuration is similar to that of the target system.

(Step S112) The maturity function generating unit 150 collects, from the failure history storage unit 130, a past failure history of the selected system.

(Step S113) The maturity function generating unit 150 calculates an accumulated failure frequency distribution from the collected failure history. The accumulated failure frequency distribution is a result of aggregating the accumulated values of the number of failures having occurred from the operation start of the sample system in terms of a predetermined period (see FIG. 19).

(Step S114) The maturity function generating unit 150 calculates a maturity factor based on the accumulated failure frequency distribution. For example, the maturity function generating unit 150 selects, as the maturity factor, the amount of increase of the accumulated value of the number of failures having occurred per unit period.

Figure 20:
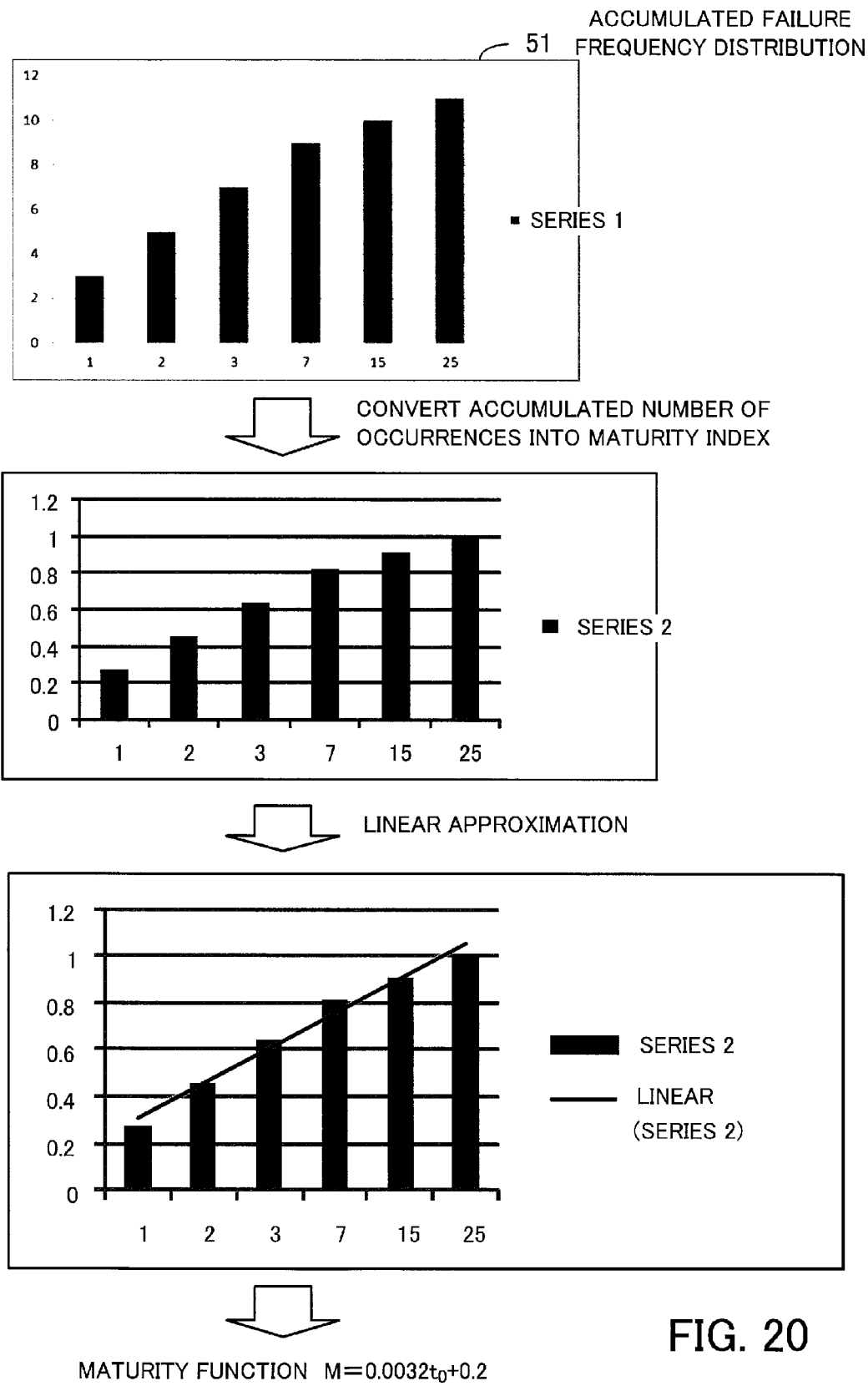
FIG. 20 illustrates an example of generating a maturity function.

(Step S115) The maturity function generating unit 150 sets the maturity factor to the constant number of the function expression taking a predetermined form such as a linear function or an exponential function, and generates the maturity function (see FIG. 20).

(Step S116) The maturity function generating unit 150 determines whether or not maturity functions have been generated for all the systems extracted as samples. The maturity function generating procedure is completed when maturity functions have been generated for all the systems. When there exists a system for which a maturity function has not been generated, the process flow proceeds to step S111.

According to the aforementioned procedure, a maturity function is generated for each of the systems extracted as samples. It is possible, when a countermeasure has been taken in each system, to calculate the maturity index of the system using the generated maturity function. Subsequently, the usefulness of each of the countermeasures is calculated using the maturity index.

Figure 14:
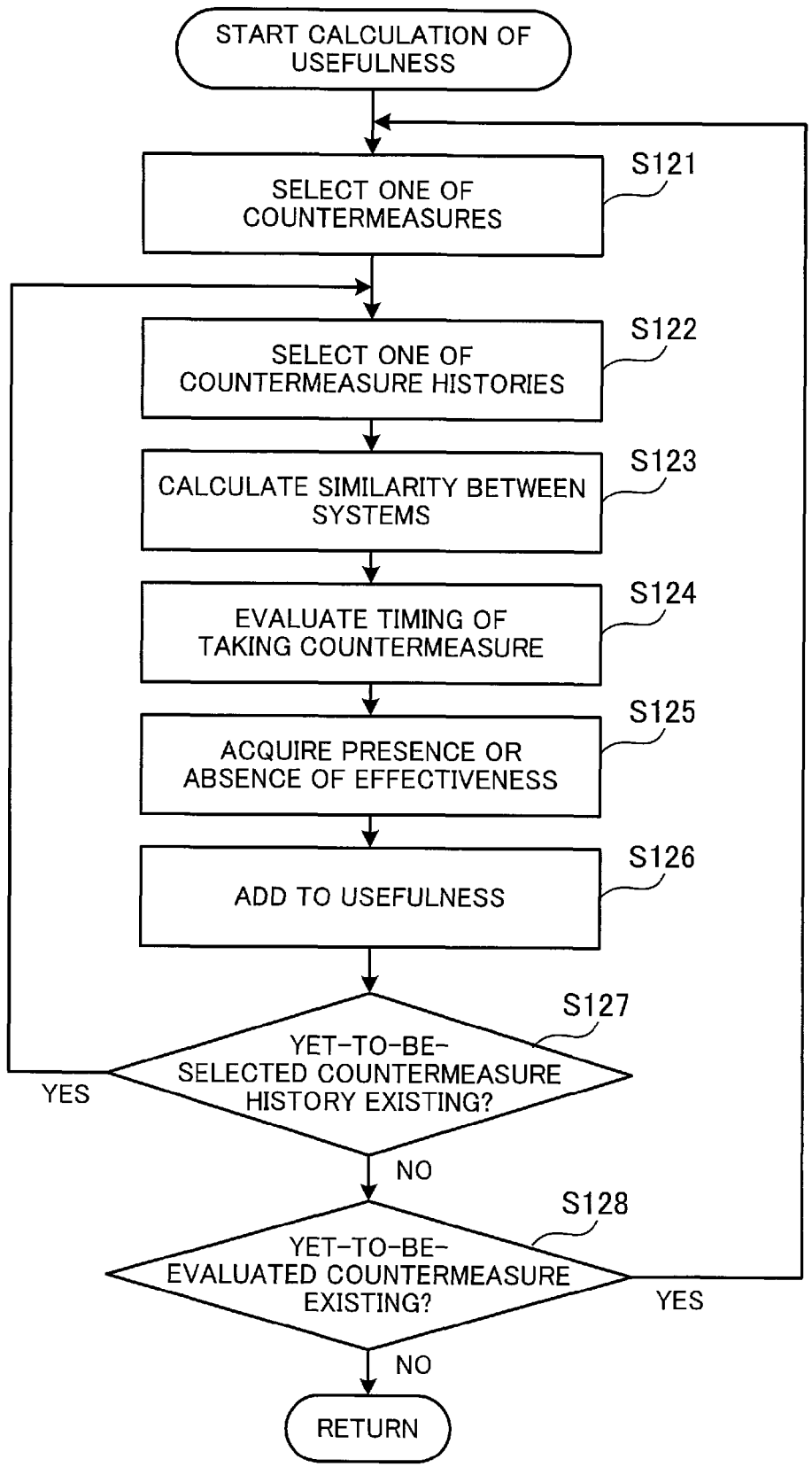
FIG. 14 is a flowchart illustrating an exemplary procedure of a usefulness calculation process.

FIG. 14 is a flowchart illustrating an exemplary procedure of a usefulness calculation process.

(Step S121) The usefulness determination unit 160 selects one of yet-to-be-selected countermeasures from the countermeasures indicated in any of the plurality of countermeasure histories extracted as a sample.

(Step S122) The usefulness determination unit 160 selects, from among the plurality of countermeasure histories extracted as samples, one of the yet-to-be-selected countermeasure histories from the countermeasure histories in which the selected countermeasure has been taken.

(Step S123) The usefulness determination unit 160 calculates the similarity in configuration between the system in which a countermeasure included in the selected countermeasure history has been taken, and the target system.

(Step S124) The usefulness determination unit 160 evaluates the timing when the countermeasure indicated in the selected countermeasure history has been taken. The evaluation of the timing uses the maturity index of the system in which the countermeasure indicated in the selected countermeasure history has been taken. For example, the usefulness determination unit 160 substitutes a value t indicating the time of taking the countermeasure or the elapsed time $t_0$ from the operation start into the maturity function (expression (3) or expression (4)) of the system in which the countermeasure has been taken, and calculates the maturity index at that time. The usefulness determination unit 160 then substitutes the calculated maturity index and the value t indicating the time of taking the countermeasure into the calculation formula of the timing evaluation value (expression (2)), and calculates the timing evaluation value.

(Step S125) The usefulness determination unit 160 acquires the effectiveness of the countermeasure indicated in the selected countermeasure history. "1" is acquired when the countermeasure is effective, whereas "0" is acquired when the countermeasure is ineffective.

(Step S126) The usefulness determination unit 160 multiplies the similarity calculated at step S123, the timing evaluation value calculated at step S124, and the effectiveness acquired at step S125, and adds the result of multiplication to the value of usefulness of the selected countermeasure.

(Step S127) The usefulness determination unit 160 determines whether or not there exists a yet-to-be-selected countermeasure history, among the countermeasure histories related to the selected countermeasure. The process flow proceeds to step S122 when there exists a yet-to-be-selected countermeasure history. When values corresponding to all the countermeasure histories have been calculated and added to the usefulness, calculation of the usefulness related to the currently selected countermeasure is completed, and the process flow proceeds to step S128.

(Step S128) The usefulness determination unit 160 determines whether or not there exists a yet-to-be-evaluated countermeasure. The usefulness calculation procedure is terminated when the calculation of the usefulness has been completed for all the countermeasures indicated in any of the plurality of countermeasure histories extracted as samples. The process flow proceeds to step S121 when there exists a yet-to-be-evaluated countermeasure. The usefulness determination unit 160 transmits the usefulness for each of the countermeasures to the adoption suitability determination unit 170 when terminating the usefulness calculation procedure.

The usefulness of each countermeasure is calculated by the procedure as described above. Subsequently, the suitability of adoption of each countermeasure is determined, based on the calculated usefulness.

Figure 15:
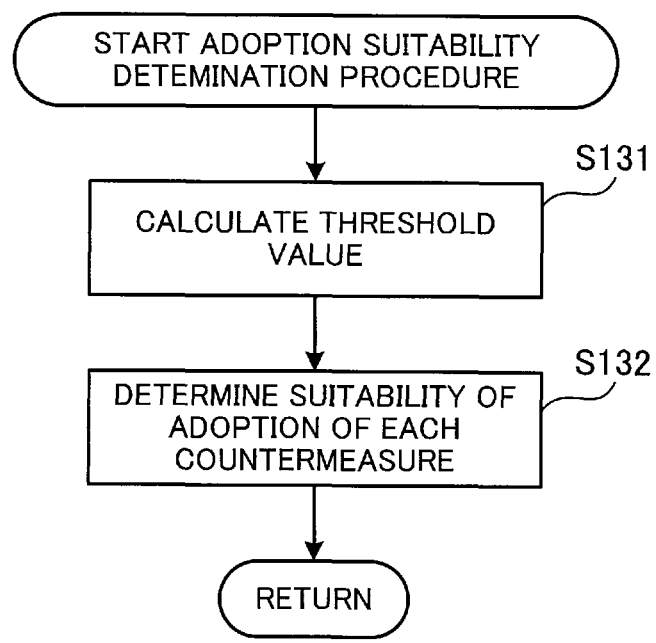
FIG. 15 is a flowchart illustrating an exemplary procedure of an adoption suitability determination process.

FIG. 15 is a flowchart illustrating an exemplary procedure of the adoption suitability determination process.

(Step S131) The adoption suitability determination unit 170 calculates a threshold value to be used for determining the suitability of adoption. For example, the adoption suitability determination unit 170 selects the average value of the usefulness of respective countermeasures as the threshold value.

(Step S132) The adoption suitability determination unit 170 compares the usefulness of each countermeasure and a threshold value, and determines the suitability of adoption of the countermeasure. For example, the adoption suitability determination unit 170 determines to adopt a countermeasure when the usefulness of the countermeasure is equal to or higher than the threshold value.

When a countermeasure to be adopted is determined as described above, a coping method for the target system is prepared, based on the coping methods related to the adopted countermeasure.

In the following, an example of preparing a coping method will be described, referring to a specific example. The coping method preparation procedure illustrated in FIG. 12 is started when the configuration information of a system for a tenant to be newly added is input to the server 100.

FIG. 16 illustrates an example of adding a system. The cloud system 300 is provided with systems 301, 302, 303, . . . for respective tenants. The systems 301, 302, 303, . . . have configurations in accordance with requirements of the tenants. For example, the system 301 includes one load balancer (LB), one application (AP) server, and one database (DB) server. The system 302 has a configuration similar to that of the system 301 with an application (AP) server and a Cache added thereto. The system 303 has a configuration similar to that of the system 301 with an application (AP) server added thereto.

Respective servers constituting the systems 301, 302, 303, . . . for respective tenants in the cloud system 300 as described above are physical or virtual machines. For example, setting up many virtual machines in the cloud system 300 makes it easier to construct systems with configurations satisfying the requirements of the tenants.

Here, let us consider a case of newly constructing an additional system 350 for a new tenant in the cloud system 300. For example, a new system is added in the cloud system 300, following an instruction from the terminal apparatus 400 to the cloud system 300 according to the administrator's operation.

On this occasion, the server 100 prepares a coping method for the system 350 in order to automatically operate the newly added system 350. Although respective device configurations of the systems 301, 302 and 303 are illustrated, in the example of FIG. 16, the number of systems and the device configurations are not limited thereto. In addition, information related to each system is stored in the DB server 330, for example, and managed by the tenant operation management server 310.

Configuration information of the target system is also input to the server 100 (Step S101). When the configuration information of the target system is input, the input configuration information is registered in the system configuration information storage unit 110 by the sample extracting unit 140, for example.

FIG. 17 illustrates an example of registering the configuration information of the target system. For example, a record related to the configuration information related to the system 350 for a new tenant as illustrated in FIG. 16 is additionally registered in the configuration management table 111.

When the configuration information of the target system is input, a sample system is extracted (Step S102).

FIG. 18 illustrates an example of extracting a sample system. In the example of FIG. 18, a system whose configuration is similar to that of the target system (tenant ID: new tenant) is extracted as a sample. The method of determining the similarity may use "Similarity $(S_0, S_n)$" which is used for calculating the usefulness. In addition, calculation of the similarity may take into account the similarity of access patterns without being limited to the similarity of system configurations.

When the similarity is calculated on the basis of a cosine function, the similarity between respective systems of "new tenant" and "tenant 1" is given as follows.

$$\text{Similarity(New Tenant, Tenant 1)} = \qquad (5)$$

$$\cos\alpha = \frac{\overrightarrow{\text{New Tenant}} \cdot \overrightarrow{\text{Tenant 1}}}{|\overrightarrow{\text{New Tenant}}| \cdot |\overrightarrow{\text{Tenant 1}}|} = \frac{5}{\sqrt{5}\sqrt{8}} = \sqrt{\frac{5}{8}}$$

In addition, the similarity between respective systems of "new tenant" and "tenant 2" is given as follows.

$$\text{Similarity(New Tenant, Tenant 2)} = \qquad (6)$$

$$\cos\alpha = \frac{\overrightarrow{\text{New Tenant}} \cdot \overrightarrow{\text{Tenant 2}}}{|\overrightarrow{\text{New Tenant}}| \cdot |\overrightarrow{\text{Tenant 2}}|} = \frac{8}{\sqrt{9}\sqrt{8}} = \sqrt{\frac{8}{9}}$$

Here, $\alpha$ in the expressions (5) and (6) is the angle between vectors indicating configuration information of the systems to be compared. The smaller the angle $\alpha$ is, the larger the similarity becomes. The vectors indicating configuration information include, as components, respective values set in the columns for system configuration and access pattern. In the example of FIG. 18, the similarity of the system of "tenant 1" and the similarity of "tenant 2" are equal to or larger than a predetermined value and therefore the systems of "tenant 1" and "tenant 2" are extracted as samples.

When sample systems are extracted, the countermeasure histories of the systems are extracted from the countermeasure history DB 210 (Step S103), and maturity functions for respective systems are generated (Step S104). When generating a maturity function, an accumulated failure frequency distribution is generated first, based on the failure history.

FIG. 19 illustrates an exemplary accumulated failure frequency distribution. In FIG. 19, the accumulated failure frequency distribution of "tenant 1" is illustrated. For example, the relation between the number of days elapsed from the operation start to occurrence of a failure and the accumulated value of the number of failures having occurred up to the time (accumulated number) is aggregated, based on the date of countermeasure for each failure described in the failure history. Based on the result of aggregation, an accumulated failure frequency distribution 51 is generated. The accumulated failure frequency distribution 51 is expressed by a graph indicating, for example, the number of days elapsed on the horizontal axis and the accumulated value of the number of failures occurred on the vertical axis. Subsequently, the maturity function is calculated, based on the accumulated failure frequency distribution 51.

When generating the maturity function, the maturity index corresponding to the accumulated number is calculated first. On this occasion, the maturity index when the failure occurrence status of the system satisfies a predetermined condition is set to a predetermined value. For example, the maturity index when the number of failures occurred per day is equal to or smaller than a predetermined value is set to "1". Alternatively, the maturity index when the period during which no failure has been detected is equal to or larger than a predetermined period may be set to "1". Furthermore, the system administrator may specify a period during which the system has matured to a certain extent, and the maturity index during the specified period may be set to a predetermined value ("1", for example).

Subsequently, the maturity index according to the accumulated number is calculated, based on the ratio of the accumulated number for each number of days elapsed to the accumulated number when the failure occurrence status of the system has satisfied a predetermined condition. In the example of FIG. 19, the maturity index is set to "1" when the number of days elapsed is "25" with the accumulated number at that time being "11". Since the accumulated number is "3" when the number of days elapsed is "1", the maturity index at that time turns out to be "1×3/11=0.272727". Similarly, maturities according to accumulated numbers are calculated for other numbers of days elapsed.

Subsequently, maturity function may be generated by converting the accumulated number in the accumulated failure frequency distribution 51 into the maturity index, and applying linear approximation thereto.

FIG. 20 illustrates an example of generating a maturity function. A graph is generated, with the vertical axis of the graph indicating the accumulated failure frequency distribution 51 replaced with maturity index, and having converted the accumulated number for each number of days elapsed into a maturity index. An approximation curve indicating the maturity index for each number of days elapsed of the graph is calculated. For example, a formula indicated in the expression (3) is taken as a model function, and maturity factors c and b are calculated according to the least-square method so as to minimize the square sum of the residual. It is assumed in the example of FIG. 20 that c=0.0032 and b=0.2. In such a case, the maturity function turns out to be "M=0.0032$t_0$+0.2".

When a maturity function for each system is generated, the usefulness of a countermeasure taken in each system is calculated (Step S105). In the calculation of the usefulness, a similarity is calculated between the target system and a system in which a countermeasure has been taken. When using a similarity for extracting a sample system, the similarity calculated at that time (see FIG. 18) may be used.

Additionally, in the calculation of the usefulness, a timing evaluation value is calculated for each countermeasure history. As an example, let us assume a case of calculating the timing evaluation value of the countermeasure history of having taken a countermeasure "Op1".

FIG. 21 illustrates an example of calculating the timing evaluation value. Referring to the countermeasure history management table 211, the countermeasure histories of having taken the countermeasure "Op1" are: "Tenant1_Record1", "Tenant2_Record1", "Tenant3_Record1", "Tenant4_Record1" and "Tenant5_Record1". However, the countermeasure history of a system which has not been extracted as a sample is not used for the calculation of the usefulness. Accordingly, the usefulness of the countermeasure "Op1" is calculated, based on two countermeasure histories "Tenant1_Record1" and "Tenant2_Record1". When calculating the usefulness of the countermeasure "Op1", respective timing evaluation values of the countermeasure histories "Tenant1_Record1" and "Tenant2_Record1" are calculated.

First, an example of calculating the timing evaluation value of the countermeasure history "Tenant1_Record1" will be described. In the case of the countermeasure history "Tenant1_Record1", the elapsed period from the date of the operation start of the system of "tenant 1" to the date on which the countermeasure has been taken is 12 months. In addition, the system of "tenant 1" has been in operation for 16 months up to the present day (2012/02/01). Accordingly, the time of the countermeasure, included in the countermeasure history "Tenant1_Record1", turns out to be "t=12/16". Assuming that $t_0$ is expressed in terms of days and deeming that a month has 30 days, the elapsed period from the operation start to taking the countermeasure turns out to be "$t_0$=12×30". Substituting the values into the expression (3) for calculating the maturity index M and the expression (2) for calculating the timing evaluation value gives a timing evaluation value as follows.

$$t = 12/16 \quad (7)$$

$$M = 0.032 \times 12 \times 30 + 0.2 = 11.72$$

$$\text{Timing}(t) =$$

$$\frac{1}{2}\left(e^{11.72(t-1)} + \frac{1}{e^{11.72 \times t}}\right) = \frac{1}{2}\left(e^{11.72\left(\frac{12}{16}-1\right)} + \frac{1}{e^{11.72 \times \frac{12}{16}}}\right) \approx 0.05430892$$

Next, an example of calculating the timing evaluation value of the countermeasure history "Tenant2_Record1" will be described. The maturity function of the system of "tenant 2" is assumed to be "M=0.0032$t_0$+0.2", similarly to the system of "tenant 1".

In the case of the countermeasure history "Tenant2_Record1", the elapsed period from the date of the operation start of the system of "tenant 2" to the date on which the countermeasure has been taken is 10 months. In addition, the system of "tenant 2" has been in operation for 14 months up to the present day (2012/02/01). Accordingly, the date of the countermeasure, included in the countermeasure history "Tenant2_Record1", turns out to be "t=10/14". Deeming that a month has 30 days, the elapsed period from the operation start to taking the countermeasure turns out to be "$t_0$=10×30". Substituting the values into the expression (3) for calculating the maturity index M and the expression (2) for calculating the timing evaluation value gives a timing evaluation value as follows.

$$t = 10/14 \quad (8)$$

$$M = 0.032 \times 10 \times 30 + 0.2 = 9.8$$

$$\text{Timing}(t) =$$

$$\frac{1}{2}\left(e^{9.8(t-1)} + \frac{1}{e^{9.8 \times t}}\right) = \frac{1}{2}\left(e^{9.8\left(\frac{10}{14}-1\right)} + \frac{1}{e^{9.8 \times \frac{10}{14}}}\right) \approx 0.030860972$$

In addition, effectiveness of the countermeasure is acquired for each of the countermeasure histories.

FIG. 22 illustrates an example of acquiring the effectiveness. The countermeasure history management table 211 indicates that both the countermeasure histories "Tenant1_Record1" and "Tenant2_Record1" turn out to be effective. When effective, "Result=1" is set. When ineffective, "Result=0" is set.

The similarity (Similarity ($S_0$, $S_n$)), the timing evaluation value (Timing (t)), and the effectiveness are acquired respectively for the countermeasure histories "Tenant1_Record1" and "Tenant2_Record1" in the manner described above. The usefulness of the countermeasure "Op1" is acquired by calculating the expression (1) using the acquired value. The calculation result is given as follows.

$$\text{Usefulness of } Op1 = \quad (9)$$

$$\text{Tenant1}_{Evaluation\ of\ Record\ 1} + \text{Tenant2}_{Evaluation\ of\ Record\ 1} =$$

$$\sqrt{\frac{5}{8}} \times 0.05430892 \times 1 = \sqrt{\frac{8}{9}} \times 0.030860972 \times 1 = 0.072030972$$

Whether or not to adopt the countermeasure "Op1" as the origin of diversion when preparing a coping method is determined by comparing the usefulness acquired in the above manner with a predetermined threshold value. The threshold value may be a value preliminarily set by the administrator, or a value acquired by calculation. For example, the average of values of usefulness calculated for each of the countermeasures may be used as the threshold value.

Subsequent to determination of countermeasures to be adopted, a coping method for the target system is prepared, based on the coping methods related to the countermeasures. The coping method is expressed in the countermeasure graph, for example.

Figure 23:
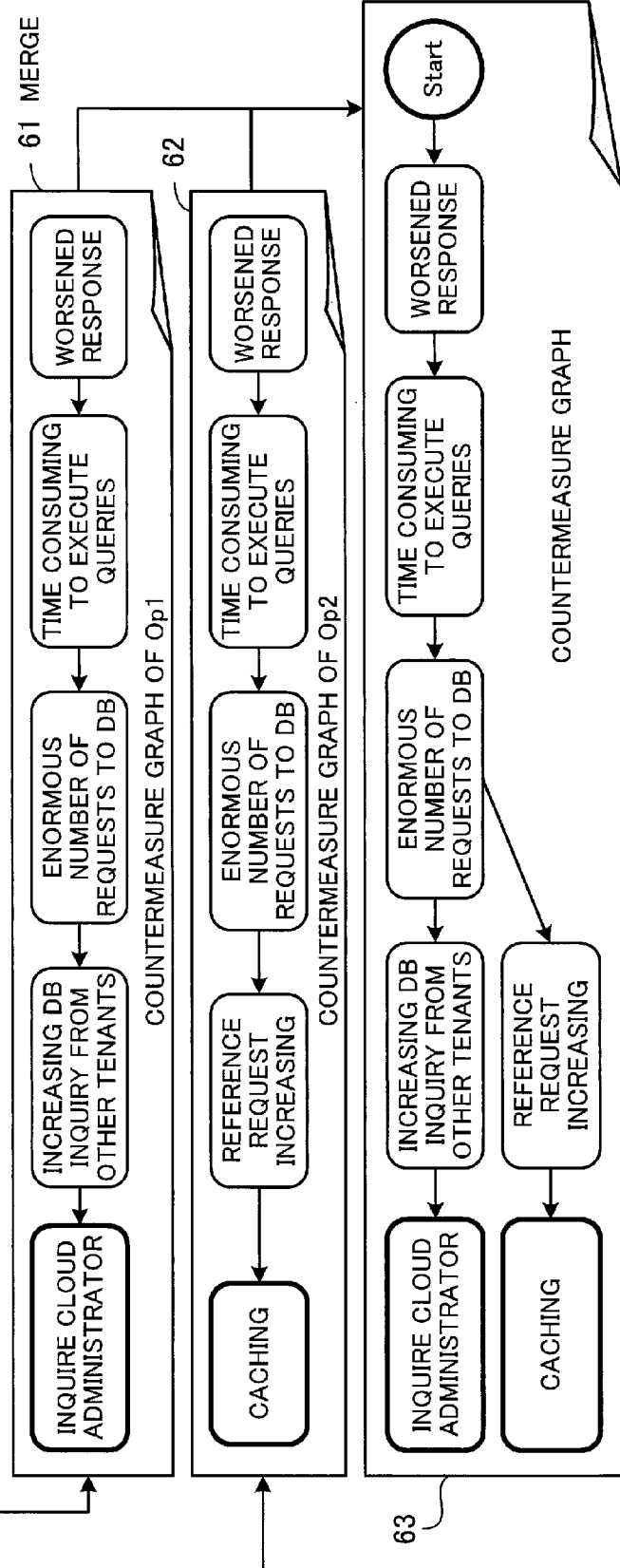
FIG. 23 illustrates an example of preparing a countermeasure graph.

FIG. 23 illustrates an example of generating a countermeasure graph. Coping methods of countermeasures determined to be adopted are extracted from the coping method list 121, for example. It is assumed in the example of FIG. 23 that the countermeasures "Op1" and "Op2" are determined to be adopted. Countermeasure graphs 61 and 62 are generated based on the extracted coping method, respectively. Subsequently, the plurality of countermeasure graphs 61 and 62 is merged (unified) by sharing common nodes of the generated countermeasure graphs 61 and 62. A start node is added to the merged countermeasure graph, which turns out to be a countermeasure graph 63 for the target systems.

Evaluating the usefulness taking into account the maturity index as described above increases the reliability of evaluation of the usefulness. It then becomes possible to prepare highly precise coping methods by preparing the coping methods based on highly reliable evaluation results.

Third Embodiment

Next, a third embodiment will be described. The third embodiment is intended to calculate the maturity index according not to the elapsed time from the start of operation of a system, but to the degree of how stable the system is actually being operated for a predetermined period.

In the third embodiment, the maturity index of a system is calculated, based on the elapsed time from the operation start of the system. When there is any change to the system, for example, the elapsed time from the operation start is reset and the maturity index is also reset to zero.

Figure 24:
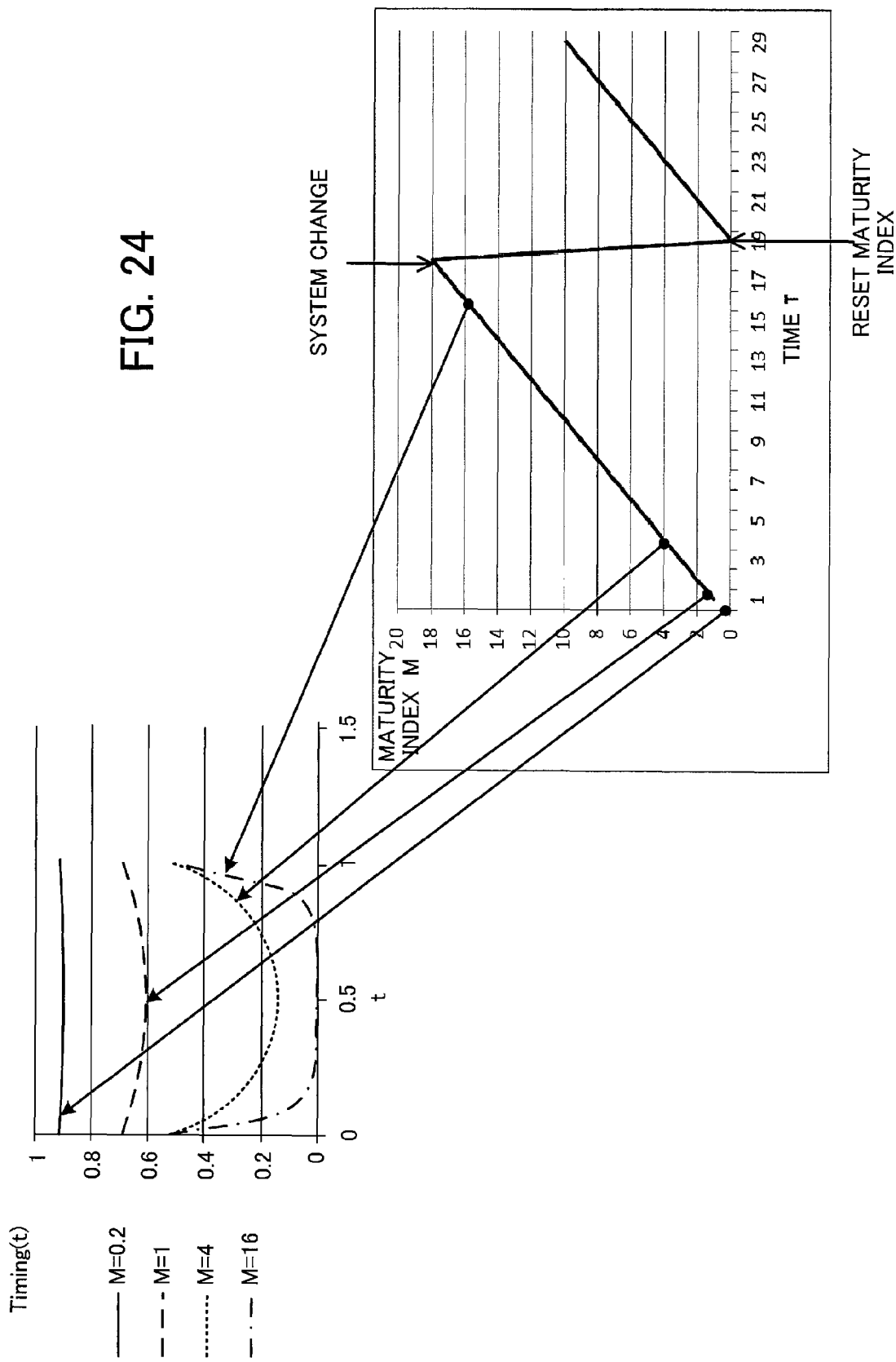
FIG. 24 illustrates an example of calculating the maturity index according to elapsed time from the start of operation.

FIG. 24 illustrates an example of calculating the maturity index according to the elapsed time from the operation start. In the example of FIG. 24, the maturity index increases monotonically along with the elapsed time. In other words, it is estimated that the longer the elapsed time from the operation start is, the more stable the system becomes. The shorter the elapsed time is, the lower the maturity index is, resulting in that the evaluation value of the timing (Timing (t)) is high, regardless of the time of taking the countermeasure. On the other hand, the longer the elapsed time is, the higher the maturity index is, resulting in that the evaluation value of timing (Timing (t)) is evaluated to be significantly high immediately after the operation start and in the most recent period. Subsequently, the maturity index is reset due to a change to the system.

However, some of the changes to the system may not affect the stability of the system. For example, it often happens that the stability of the system is maintained when non-functional requirements are changed. Non-functional requirements are requirements related to performance, reliability, expansibility, operability, security or the like, out of the requirements desired for the system. Non-functional requirements do not change the functions of the system. With no change made to functions of a computer system, there is no addition of new programs and thus there are few causes that may destabilize the system. For example, let us consider a case of scaling out a system.

FIG. 25 illustrates an example of scaling out. A system 304 before a change is made the tenant is a cache-less three-tier Web system including two application servers. A system 305 after the change has an application server added thereto.

The purpose of such scaling out is to disperse the load, so that the system stabilizes after the scaling out. Resetting the maturity index to "0" when a change is made to stabilize the system may cause the subsequently calculated maturity index to be incorrect. As thus described, resetting the maturity index even when a change is made to non-functional requirements may degrade the accuracy of the maturity index of the system. As a result, the accuracy of the determination of the usefulness of a countermeasure taken in the system also degrades.

Therefore, the third embodiment evaluates the maturity index of a system in accordance with a time length during which the system has been in a stable operation within a certain period in the past. For example, a system which has been in a stable operation in a long period of time within a certain period in the past is determined to be highly mature. On the other hand, a system which has been in a stable operation in a short period of time within the certain period in the past is determined to be immature.

The following three methods are conceivable for determining whether a system is in a stable operation.

The first determination method is based on the state observed from the outside. For example, whether a system is stable may be determined based on whether a service provided by the system has reached a predetermined service level. The service level may be measured by the response time to a request, for example.

The second determination method is based on how large the difference is between an observable state inside the system and an extremely unstable state. For example, the normal operation state for each of a plurality of servers in a system is preliminarily acquired, and a server whose operation state has turned out to be different from the normal operation state is determined to be in an unstable state. Given a definition of a system in an extremely unstable state such that all the servers in the system are unstable, it is determined whether or not a system is being stably operated according to how large the difference is between the state of the system and the extremely unstable state.

The third determination method is based on combination of the results of internal observations and external observations of a system. For example, a stable state is learned from the results of internal and external observations of the past, and whether a system is stable is determined according to whether the observation results belong to the learned stable state.

In the following, each of the three methods will be described in detail.

Figure 26:
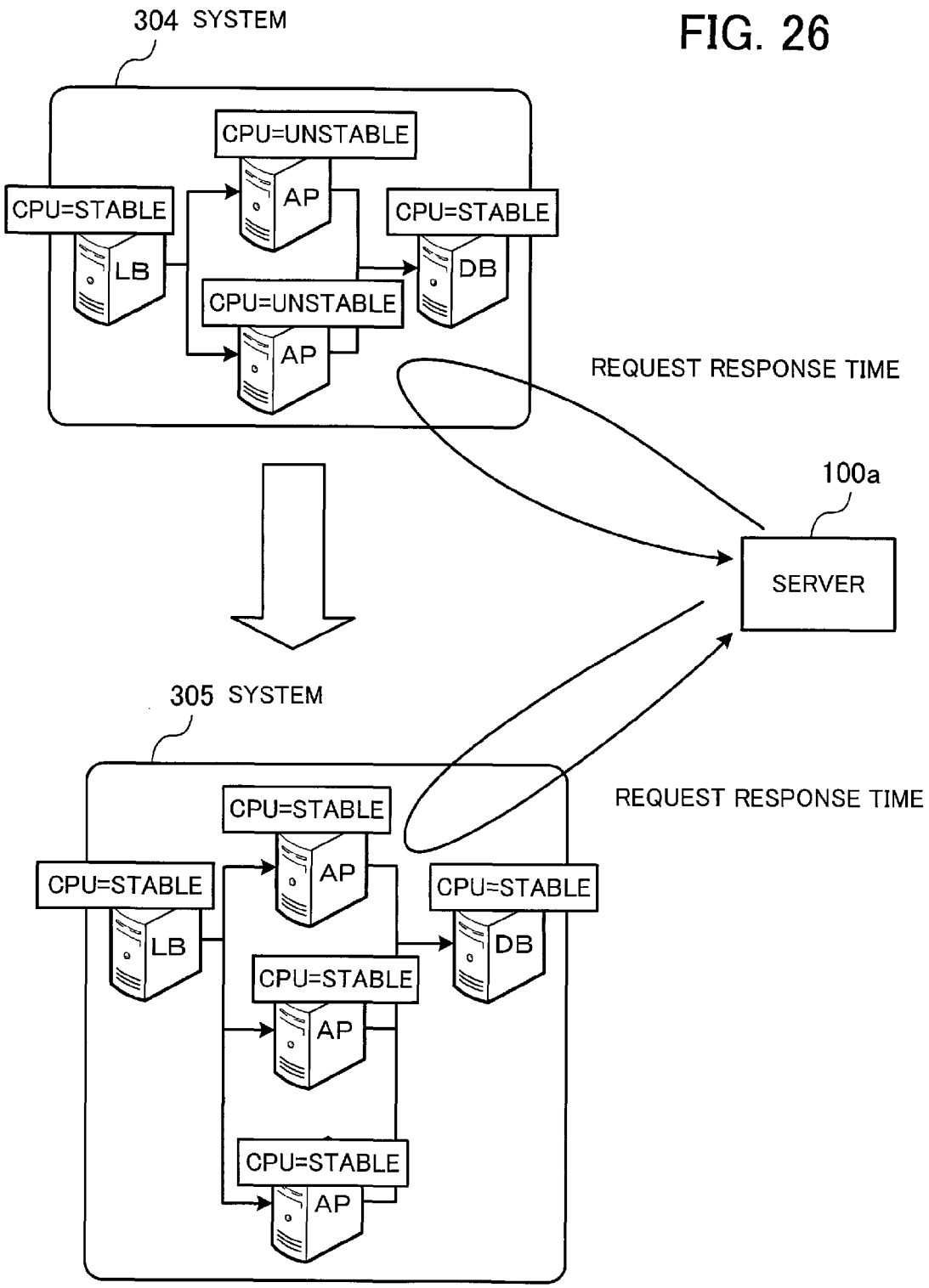
FIG. 26 illustrates a first determination method on whether a system is stable.

FIG. 26 illustrates the first method of determining whether a system is stable. For example, the server 100a transmits a request to the system 304 before the server 100a changes the configuration of the system 304, and measures the response time to the request. In addition, the server 100a also transmits a request to the system 305 after the change, and measures the response time to the request. The server 100a determines that the system is unstable, when the response time exceeds a predetermined time.

The response time is an exemplary observation point which is observable from the outside. In the first method, a boundary value $\epsilon_0$ is preliminarily set to identify the stability or instability according to a value of the observation point. Given an observation state c (e.g., response time) at a time point t, the stability $S_t$ of the system at the time point t may be determined by the following expression.

$$S_t = \begin{cases} 1 & \text{if } (c \leq \varepsilon_0)\text{: STABLE STATE} \\ -1 & \text{if } (\varepsilon_0 < c)\text{: UNSTABLE STATE} \end{cases} \quad (10)$$

According to the expression (10), the result of determination of the stability $S_t$ turns out to be "1", when the system is stable. When the system is unstable, result of determination of the stability $S_t$ turns out to be "−1".

Next, the second method of determining whether or not a system is stable will be described.

Figure 27:
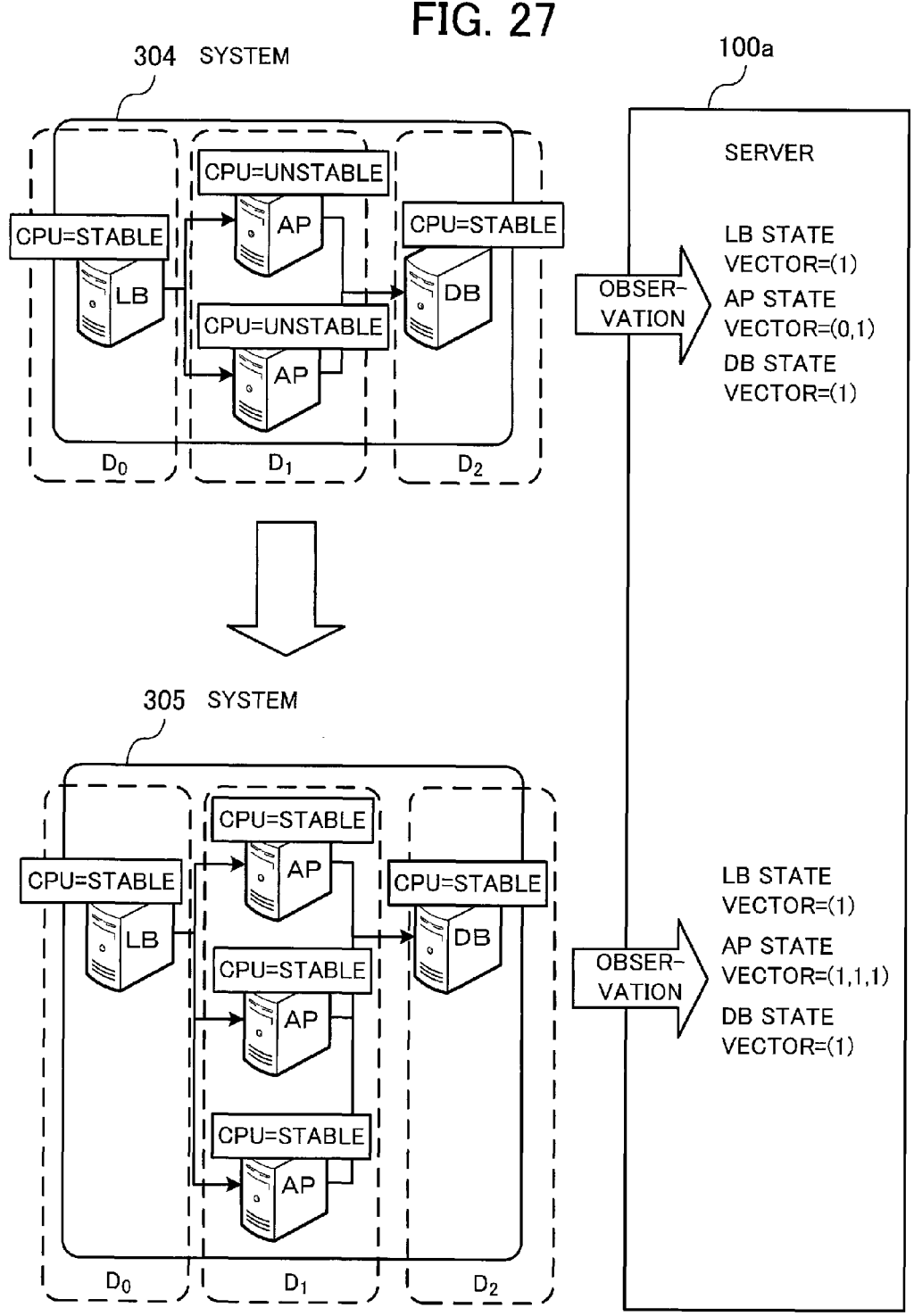
FIG. 27 illustrates a second determination method on whether a system is stable.

FIG. 27 illustrates the second method of determining whether a system is stable. For example, the server 100a acquires information indicating the state of the CPU from servers included in each of the systems 304 and 305. For example, the CPU use rate is acquired. The server 100a then determines whether respective servers are stable or unstable, based on the CPU use rate.

In addition, the server 100a divides each of the systems 304 and 305 into a plurality of layers, each layer being a monitoring division and each server in each layer being the target of monitoring. The server 100a then generates a state vector indicating the stability, for each layer of the systems 304 and 305 before and after a change. Each vector includes, as a component, a value indicating the state of each of the servers to which a corresponding layer belongs. For example, there is one load balancer in the system 304 and thus one component is included in the state vector of the layer of load balancer (LB state vector). In addition, there are two application servers in the system 304 and thus two components are included in the state vector of application layer (AP state vector). There is one DB server in the system 304 and thus one component is included in the state vector of the DB layer (DB state vector). Since an application server is added to the system 305 after the change, three components are included in the AP state vector.

Furthermore, the server 100a defines a vector indicating an extremely unstable state for each layer. The server 100a then expresses, for each layer, the difference between the state of the system and the extremely unstable state as a distance in the space in which the vector is located, by calculating the difference between the state vector and the vector indicating the extremely unstable state. For example, a distance $D_0$ of the state of the load balancer from the extremely unstable state, a distance $D_1$ of the state of the application server from the extremely unstable state, and a distance $D_2$ of the state of the DB server from the extremely unstable state are calculated. Based on the distances, the stability or instability of the system as a whole is determined.

Determination of whether each server is stable or unstable in the second determination method is performed using the difference from the performance during normal operation, for example.

Figure 28:
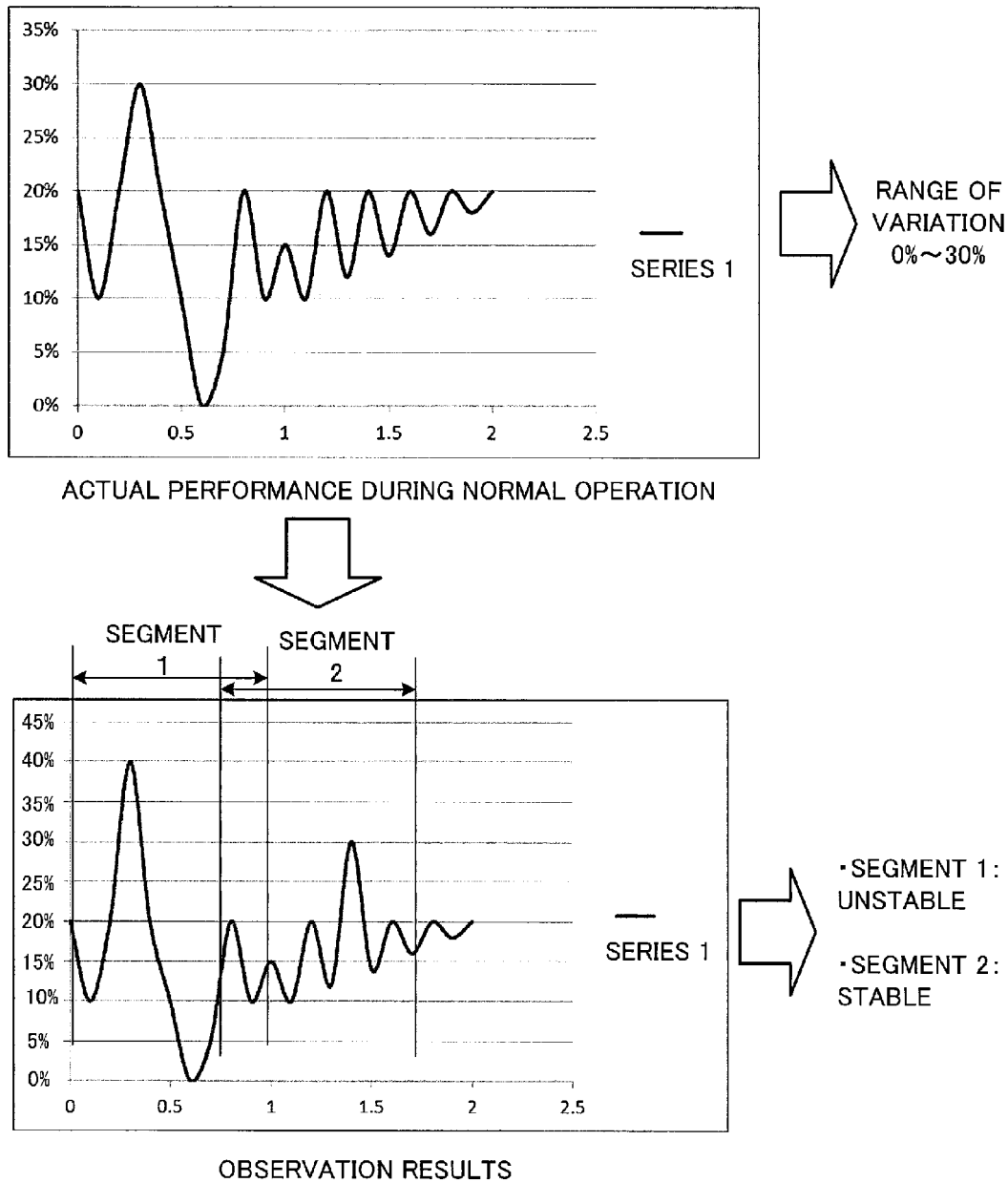
FIG. 28 illustrates an example of determining whether each server is stable or not according to the second determination method.

FIG. 28 illustrates an example of determining the stability or instability of each server according to the second determination method. For example, the server 100a observes, for a certain period, the CPU use rate of the server while operation of the server to be monitored is normal. The server 100a then determines the range of the CPU use rate observed during normal operation. In the example of FIG. 28, for example, the CPU use rate during normal operation is 0% to 30%.

Next, the server 100a observes the CPU use rate of a server in operation, and determines a range of the CPU use rate observed within a predetermined period. In the example of FIG. 28, the CPU use rate has reached 40% in the period "section 1". Therefore it is determined that the server is unstable during "section 1". In addition, the CPU use rate falls within a range of 0% to 30% in "section 2". Therefore it is determined that the server is stable during "section 2".

When the stability or instability of each server is determined, a state vector of a server belonging to the layer is generated for each layer.

FIG. 29 illustrates an exemplary state vector. In the example of FIG. 29, a state vector $F_{asis}$ including three components, namely, "component A", "component B" and "component C" is generated. "Component A", "component B", and "component C", each corresponding to a server, indicate whether the corresponding server is stable or unstable. For example, when the server is stable, the value of the corresponding component turns out to be "1". When, alternatively, the server is unstable, the value of the corresponding component turns out to be "0".

An extremely stable vector $F_{tobe}$ indicating an extremely stable point and an extremely unstable vector $F_{not\_tobe}$ indicating an extremely unstable point are defined in an orthogonal coordinate system with respective components of the vector being the axes, as illustrated in FIG. 29. Here, placing the extremely unstable point at the origin (0, 0, 0) results in that the extremely unstable vector $F_{not\_tobe}$ turns out to be a zero vector. In addition, the values of respective components of the stable vector $F_{tobe}$ turn out to be (1, 1, 1). On this occasion, the result of dividing the length of the state vector $F_{asis}$ toward an observation point acquired by observing the server for each component by the length of the extremely stable vector $F_{tobe}$ is a distance D. The distance D is represented by the following expression.

$$D = \frac{|\overrightarrow{F_{asis}} - \overrightarrow{F_{not\_tobe}}|}{|\overrightarrow{F_{tobe}}|} \quad (11)$$

After calculating the distances ($D_0$, $D_1$, $D_2$) for each layer of the system, it is determined whether the system as a whole is stable or unstable by comparing the boundary value $\epsilon_1$ with the product of all the distances. For example, the stability $S_t$ of the system at the time point t is expressed by the following expression.

$$S_t = \begin{cases} 1 & \text{if } (\varepsilon_1 < \Pi D_n)\text{: STABLE STATE} \\ -1 & \text{if } (\Pi D_n \leq \varepsilon_1)\text{: UNSTABLE STATE} \end{cases} \quad (12)$$

By determining the stability or instability based on the product of the distances for each monitoring division (layer) in the above manner, the determined stability $S_t$ turns out to be "0", and thus the system is determined to be unstable, when there exists at least one out of all the monitoring divisions matches the extremely unstable point (distance is zero).

Figure 30:
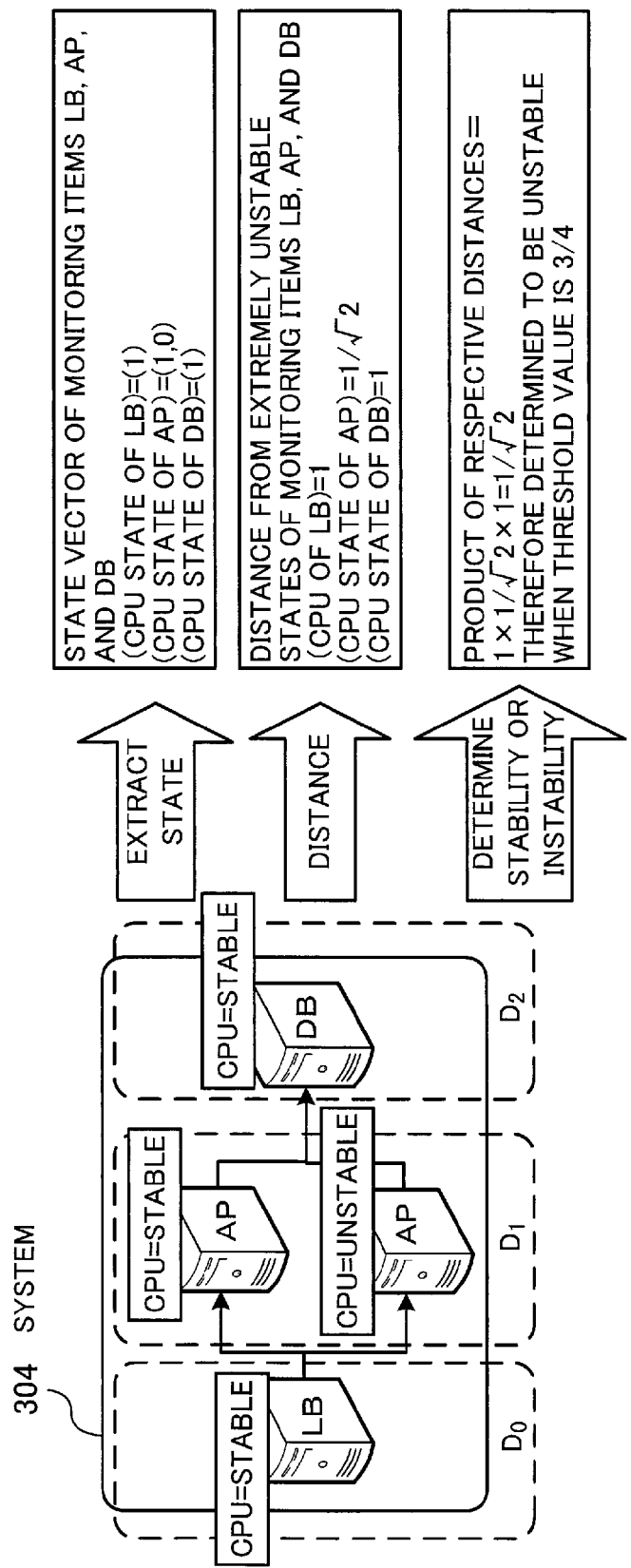
FIG. 30 illustrates an example of determining whether a system is stable or not.

FIG. 30 illustrates an example of determining the stability or instability of a system. In the example of FIG. 30, the CPU use rate of the load balancer is stable. In addition, although the CPU use rate of one of the two application servers is stable, the CPU use rate of the other one is unstable. Furthermore, the CPU use rate of the DB server is stable.

Extracting the state of the system 304 results in that the state vector of the load balancer layer turns out to be (1) (one-dimensional vector). The state vector of the application server layer of turns out to be (1,0) (two-dimensional vector). The state vector of the DB server layer turns out to be (1) (one-dimensional vector).

Based on each state vector, the distance from the extremely unstable state is calculated for each monitoring division. The distance $D_0$ of the load balancer is "1". The distance $D_1$ of the application server is "$1/2^{1/2}$". The distance $D_2$ of the DB server is "1".

The product of the distances for each monitoring division turns out to be "$1/2^{1/2}$". Here, assuming that the threshold value is 3/4, the product of distances turns out to be smaller than the threshold value. In other words, it is determined that the system 304 is unstable.

Next, the third method of determining whether a system is stable will be described in detail.

Figure 31:
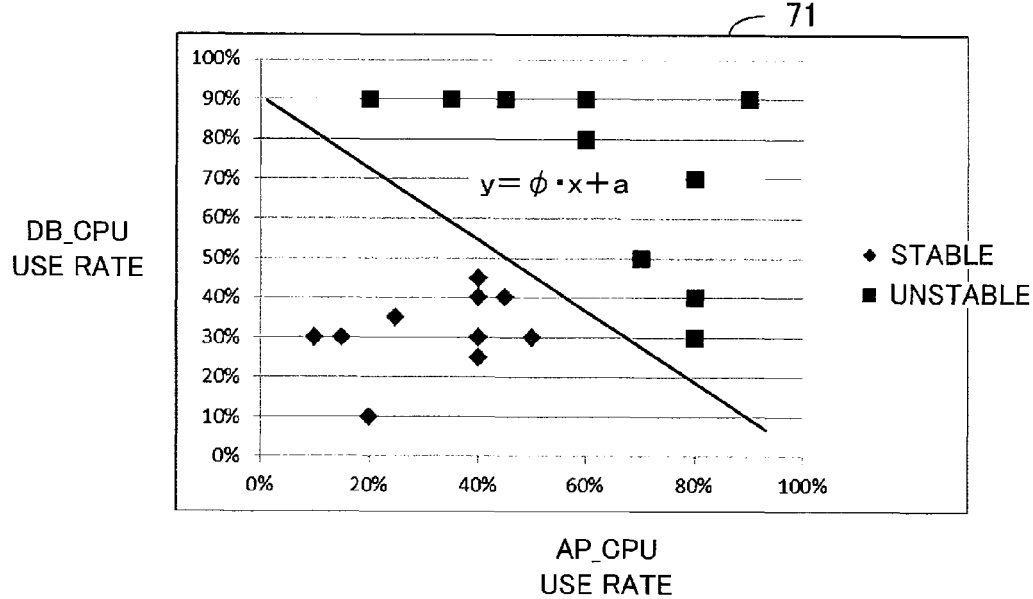
FIG. 31 illustrates a third determination method on whether a system is stable or not.

FIG. 31 illustrates the third determination method of determining whether a system is stable. In the third method, the server 100a learns stable states and unstable states from performances of the past, using internally and externally observed states. Based on the learning, a model is constructed for determining the stability or instability. It is then determined whether a subsequently observed state is stable or unstable, using the constructed model.

In the example of FIG. 31, internal states and external states of a system are observed every hour. As internal states, CPU use rates of an application server and a DB server are observed. As an external state, the response time to a request is observed, for example, and the stability or instability is determined according to whether the response time exceeds a predetermined value. The server 100a then plots the internal state for each history on a graph 71, distinguishing internal states determined to be stable by external observations from internal states determined to be unstable by external observations. In the graph 71, a formula "$y=\phi \cdot x+a$" of a line which turns out to be the border between a region having a collection of stable internal states and a region having a collection of unstable internal states is given as a model for the determination. Here, x is the CPU use rate of the application server, and y is the CPU use rate of the DB server, and $\phi$ and a are constant numbers.

The stability of the system at the point of time may be determined according to whether the internal state observed from the system in operation is located above or below the line indicated in the model. In the example illustrated in the graph 71 of FIG. 31, the system is stable when the observed internal state is located below the line, whereas it is unstable when the observed internal state is located above the line. Letting $x_0$ be the CPU use rate of the application server accelerated during operations and $y_0$ be the CPU use rate of the DB server, the determined stability $S_t$ is given by the following expression.

$$S_t = \begin{cases} 1 & \text{if } (\phi \cdot x_0 + a < y_0): \text{STABLE STATE} \\ -1 & \text{if } (y_0 \leq \phi \cdot x_0 + a): \text{UNSTABLE STATE} \end{cases} \quad (13)$$

Whether the system is stable or unstable may be determined by combining internal states and external states in the above manner.

By determining the stability of a system at individual points of time using any of the first to third methods as described above, it is possible to comprehensively determine the determination results within a certain period before taking a countermeasure in the system and grasp the maturity index of the system at the time of taking the countermeasure. For example, the server 100a calculates the length of the period (length of a stable period p) during which the system matured within a certain period of the past ($T_0$ to $T_n$), using the next expression.

$$p = \sum_{t=T_0}^{T_n} S_t \quad (14)$$

In the following, the third embodiment will be described in detail, taking a case of determining whether a system is stable based on the second determination method as an example. The system configuration in the third embodiment is similar to that of the system of the second embodiment illustrated in FIG. 2. However, the server 100a is used to realize the third embodiment, in place of the server 100 of the second embodiment. The server 100a of the third embodiment may be realized by a hardware configuration similar to that of the server 100 of the second embodiment illustrated in FIG. 3.

Figure 32:
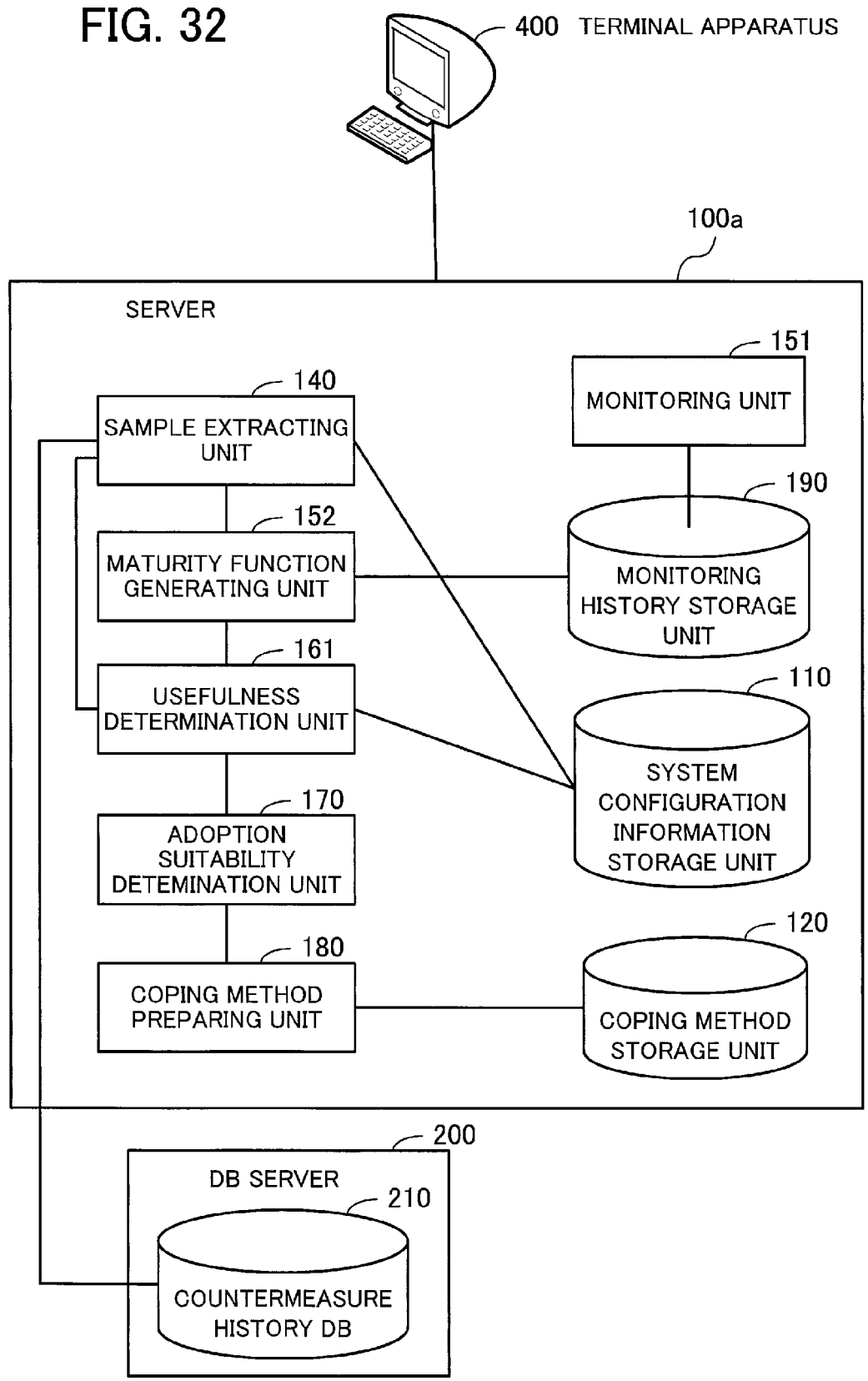
FIG. 32 is a block diagram illustrating the functions of a server of a third embodiment.

FIG. 32 is a block diagram illustrating the functions of the server of the third embodiment. In FIG. 32, a component having the same function as the component in the server 100 of the second embodiment illustrated in FIG. 7 is provided with the same symbols, with explanation thereof being omitted.

The server 100a has a monitoring unit 151, a monitoring history storage unit 190, a maturity function generating unit 152, and a usefulness determination unit 161, as components having different functions from the second embodiment.

The monitoring unit 151 monitors the operation states of the servers belonging to the systems of respective tenants in the cloud system. For example, the monitoring unit 151 acquires the CPU use rates of the application server 320 and the DB server 330, regularly from the respective servers.

The monitoring history storage unit 190 stores histories of monitoring by the monitoring unit 151. For example, a part of the storage area of the memory 102 or the HDD 103 is used as the monitoring history storage unit 190.

The maturity function generating unit 152 determines whether the system is stable according to the second determination method described above, and calculates the length of the stable period p using the expression (14) for each predetermined period (e.g., one day). The maturity function generating unit 152 then generates, using the length of the maturation period p, a maturity function to be applied to countermeasures taken within the period for each predetermined period (e.g., one day).

The usefulness determination unit 161 performs processing in a similar manner to the usefulness determination unit 160 of the second embodiment. However, when calculating the usefulness of a countermeasure, the usefulness determination unit 161 of the third embodiment uses a maturity function corresponding to the period including the time of taking the countermeasure.

Figure 33:
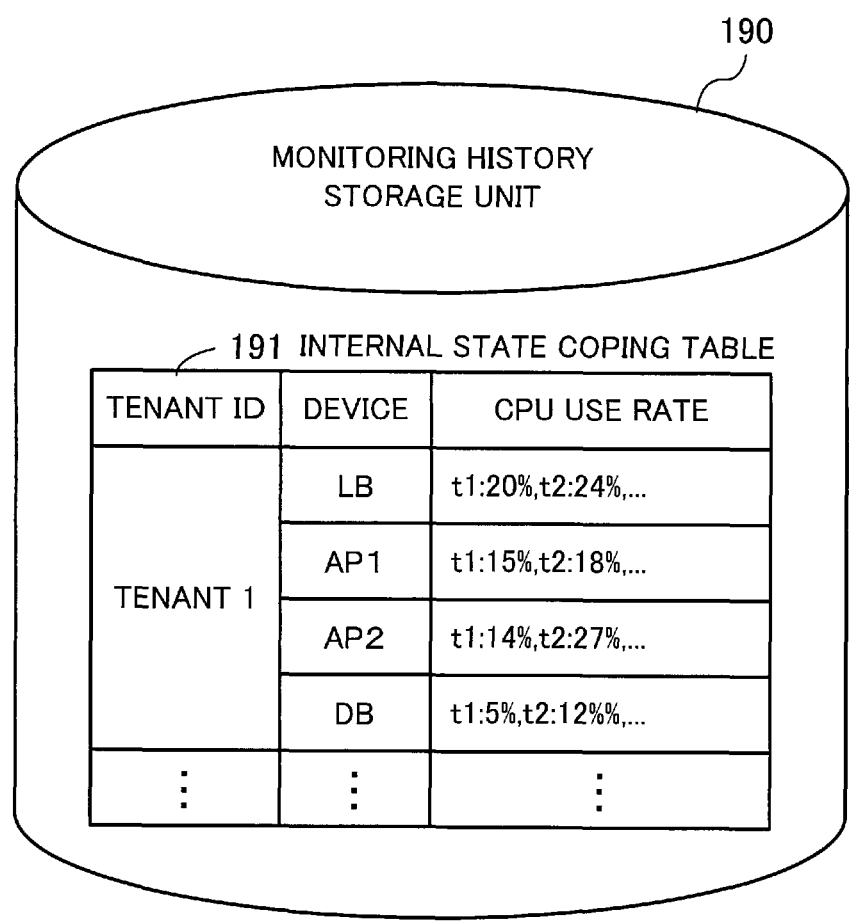
FIG. 33 illustrates an exemplary data structure of a monitoring history storage unit.

FIG. 33 illustrates an exemplary data structure of the monitoring history storage unit. The monitoring history storage unit 190 stores an internal state management table 191. The internal state management table 191 has columns for tenant ID, device, and CPU use rate. The tenant ID column has set therein identification information (tenant ID) of the system to be monitored. The device column has set therein a name of a device included in a corresponding system. The CPU use rate column has set therein the CPU use rate measured from a corresponding device at a predetermined interval.

The third embodiment is realized by a system as described above. In the third embodiment, the maturity function generating procedure is different from that of the second embodiment.

Figure 34:
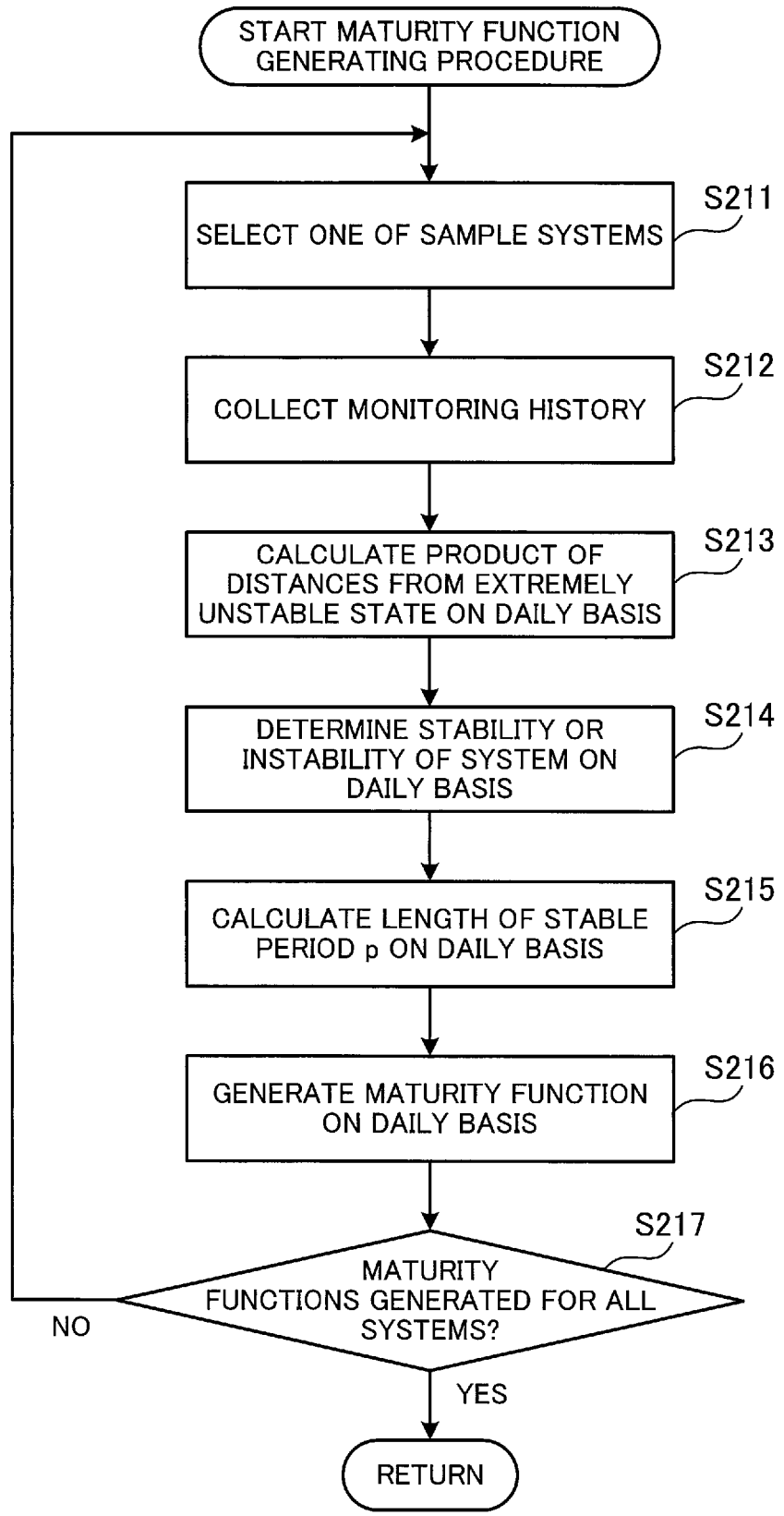
FIG. 34 is a flowchart illustrating an exemplary procedure of a maturity function generating process.

FIG. 34 is a flowchart illustrating an exemplary procedure of a maturity function generating procedure.

(Step S211) The maturity function generating unit 152 selects one of the yet-to-be-selected systems from the systems extracted as samples. A sample system is a system whose configuration is similar to that of the target system, for example. Any system having a monitorable state, for example, may be extracted as a sample. In addition, a system whose value of Similarity has exceeded the threshold value may be selected as a sample. A system having a similar variation of changes made to the configuration as well as a value of Similarity exceeding the threshold value may also be selected as a sample.

(Step S212) The maturity function generating unit 152 collects the past monitoring history of the selected system from the monitoring history storage unit 190.

(Step S213) The maturity function generating unit 152 calculates the distance of the state for each monitoring division of the selected system from the extremely unstable state, based on the collected monitoring history. The maturity function generating unit 152 then calculates the product of distances for respective monitoring divisions for each unit period (e.g., day).

(Step S214) The maturity function generating unit 152 determines whether the selected system is stable or unstable on a daily basis, based on a daily product of distances. For example, the maturity function generating unit 152 determines that the system is in a stable state when the daily product is larger than a threshold value, or in an unstable state when it is equal to or smaller than the threshold value.

(Step S215) The maturity function generating unit 152 calculates the length of the stable period p on a daily basis, based on the daily determination result of the stability or instability. For example, the maturity function generating unit 152 specifies a certain day, sums the determination result of the stability ("1" for a stable state or "0" for an unstable state) for several days in the past from the day of interest, and sets the summed results to be the length of the stable period p of the specified day.

(Step S216) The maturity function generating unit 152 generates a maturity function on a daily basis, based on the daily length of the stable period p. For example, the maturity function generating unit 152 has preliminarily prepared therein a function expression including the value of the length of the stable period p as one of the variables. The maturity function generating unit 152 then generates the daily maturity function by substituting the daily value acquired at step S215 as the length of the stable period p of the preliminarily prepared function expression.

(Step S217) The maturity function generating unit 152 determines whether or not maturity functions have been generated for all the systems extracted as samples. The maturity function generating procedure is terminated when maturity functions have been generated for all the systems. The process flow proceeds to step S211 when there exists a system for which no maturity function has been generated.

In the third embodiment, as thus described, multiplication of distances, determination of stability or instability, and calculation of length of a stable period are performed for each date, and there are generated, for each date, maturity functions to be used for calculating the usefulness of the countermeasures taken on the day. In the following, a procedure of generating the maturity function on a daily basis will be specifically described, referring to FIGS. 35 to 38.

FIG. 35 illustrates an example of calculating the length of a stable period. In the example of FIG. 35, the product of distances ($IID_n$) for each observation item is calculated on a daily basis. When the product of distances is equal to or larger than a threshold value $\epsilon_0$ on a daily basis, it is determined that the system is stable on the day. In addition, when the product of distances is smaller than the threshold value $\epsilon_0$, it is determined that the system is unstable on the day. In the example of FIG. 35, the threshold value $\epsilon_0$ is set to be "¾". The stability of a stable system is "1", whereas the stability of an unstable system is "−1". In the example of FIG. 35, a change has been made to the system function on December 9, and thus the information related to the maturity index including the stability has been reset.

In the example of FIG. 35, let us consider a case of calculating the length of the stable period p as of December 5 (12/5). In the example, it is assumed that the length of the stable period p is calculated based on the stability during past five days. In other words, the total value "−1" of the stability $S_t$ from December 1 to December 5 turns out to be the length of the stable period p as of December 5.

Using the length of the stable period p, the maturity index M is given by the next expression, for example.

$$M = \frac{K}{(1 + e^{-cp})} \quad (15)$$

K in the expression (15) is the maximum maturity index, and c is the maturity factor. Here, the expression (15) is the maturity function in the third embodiment.

Figure 36:
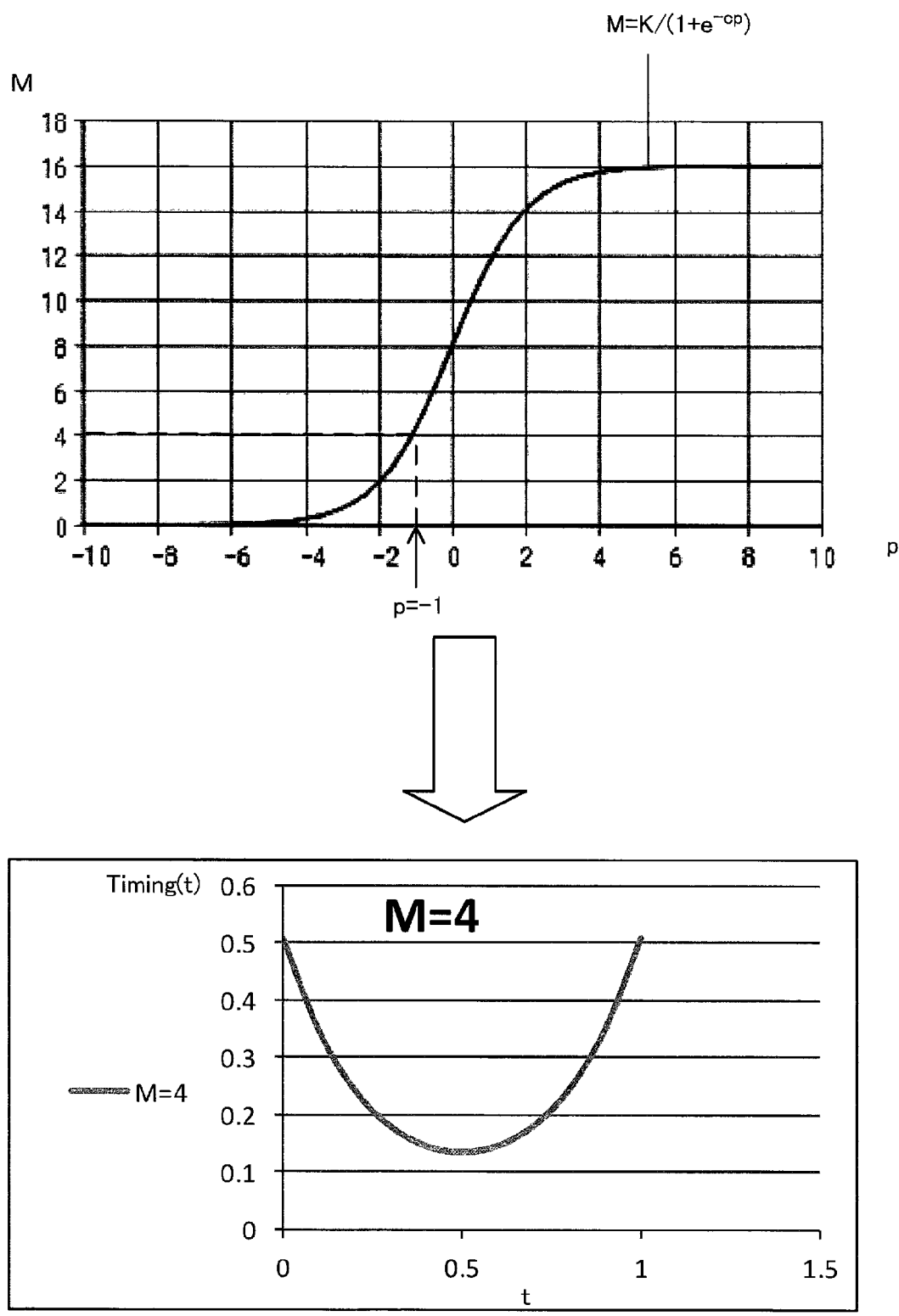
FIG. 36 illustrates a relation between the length of a stable period and the maturity index.

FIG. 36 illustrates the relation between the length of the stable period and the maturity index. The upper part of FIG. 36 illustrates a graph illustrating the relation between the length of the stable period and the maturity index, and the lower part illustrates a graph of the timing evaluation values for a predetermined maturity index. In the example of FIG. 36, the maximum maturity index K is set to "16". In this case, when, for example, the length of the stable period is "−1", the maturity index M turns out to be approximately "4". With the maturity index M determined, the timing evaluation value (Timing (t)) at the time of taking the countermeasure is determined by the expression (2) described above.

The length of the stable period p and the maturity index M as such are calculated for each predetermined period (e.g., on a daily basis).

Figure 37:
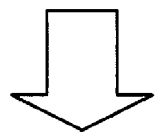
FIG. 37 illustrates an example of calculating the maturity index on a daily basis.

FIG. 37 illustrates an example of calculating the maturity index on a daily basis. Based on the daily stability, the length of the stable period p is calculated on a daily basis, and the maturity index M is calculated on a daily basis, based on the expression (15). According to a calculation based on the stability within a period from December 1 to December 5, for example, the length of the stable period p on December 5 turns out to be "−1" and the maturity index M turns out to be "4.30". In addition, according to a calculation based on the stability within a period from December 2 to December 6, for example, the length of the stable period p on December 6 turns out to be "−3" and the maturity index M turns out to be "0.76". The maturity index is calculated for each date, based on the stability within the past five days from the day.

By calculating the maturity index in the above manner, the maturity index increases or decreases according to the variation of the stability. In other words, the maturity index no longer exhibits a monotonic increase.

Figure 38:
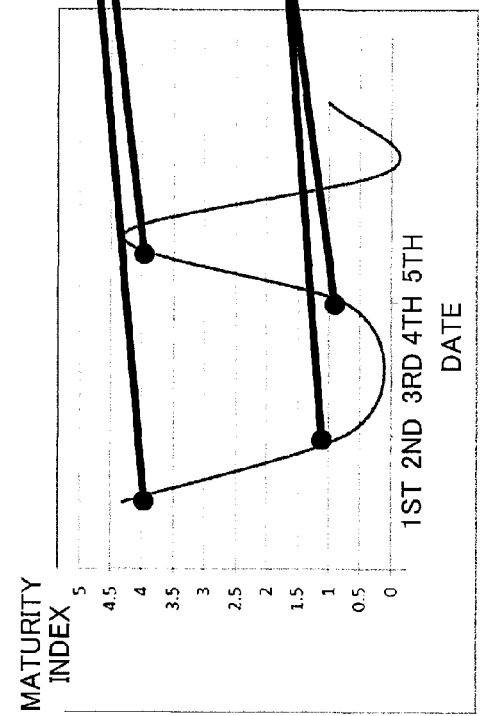
FIG. 38 illustrates an exemplary variation of the maturity index.

FIG. 38 illustrates an exemplary variation of the maturity index. In the example of FIG. 38, although the maturity index on the 1st of a certain month is "4", the maturity index has fallen down to "1" the next day (the 2nd). Subsequently the maturity index falls furthermore, but the maturity index has recovered to "1" on the 4th. The next day (5th), the maturity index has recovered to "4". In this case, the maturity index when calculating the timing evaluation value of a countermeasure taken on the 1st and the 5th of the month is "4", and the maturity index when calculating the timing evaluation value of a countermeasure taken on the 2nd and the 4th of the month is "1".

As thus described, the maturity function to be applied to the calculation of the usefulness of a countermeasure taken on the day is generated, for each date. When evaluating a countermeasure, the maturity index is calculated using the maturity function of the date on which the countermeasure has been taken. Subsequently, the timing evaluation value is calculated using the calculated maturity index.

FIG. 39 illustrates an example of calculating the timing evaluation value in the third embodiment. In FIG. 39, a case is assumed where the timing evaluation values are calculated respectively for the countermeasure histories "Tenant1_Record1" and "Tenant2_Record1" when calculating the usefulness of the countermeasure "Op1", similarly to the example illustrated in FIG. 21.

First, an example of calculating the timing evaluation value of the countermeasure history "Tenant1_Record1" will be described. In the case of the countermeasure history "Tenant1_Record1", the elapsed period from the date of the operation start of the system of "tenant 1" to the date on which the countermeasure has been taken is 12 months. In addition, the system of "tenant 1" has been in operation for 16 months up to the present day (2012/02/01). Accordingly, the time of the countermeasure, included in the countermeasure history "Tenant1_Record1", turns out to be "t=12/16". It is assumed that the maturity index on the date "2011/10/05" of the countermeasure is "4.30". Substituting the values into the expression (2) for calculating the timing evaluation value, the timing evaluation value is given as follows.

$$t = 12/16 \quad (16)$$

$$M = 4.3$$

$$\text{Timing}(t) = \frac{1}{2}\left(e^{4.3(t-1)} + \frac{1}{e^{4.3 \times t}}\right) = \frac{1}{2}\left(e^{4.3\left(\frac{12}{16}-1\right)} + \frac{1}{e^{4.3 \times \frac{12}{16}}}\right) \approx 0.342$$

Next, an example of calculating the timing evaluation value of the countermeasure history "Tenant2_Record1" will be described. For the countermeasure history "Tenant2_Record1", the elapsed period from the date of the operation start to the date of taking a countermeasure of a system of "tenant 2" are 12 months. In addition, the system of "tenant 2" has been in operation for 14 months up to the present day (2012/02/01). Accordingly, the time of the countermeasure, included in the countermeasure history "Tenant2_Record1", turns out to be "t=12/14". It is assumed that the maturity index on the date of the countermeasure "2011/12/10" is "11.7". Substituting the values into the expression (2) for calculating a timing evaluation value, the timing evaluation value is given as follows.

$$t = 12/14 \quad (17)$$

$$M = 11.7$$

$$\text{Timing}(t) =$$

$$\frac{1}{2}\left(e^{11.7(t-1)} + \frac{1}{e^{11.7 \times t}}\right) = \frac{1}{2}\left(e^{11.7\left(\frac{12}{14}-1\right)} + \frac{1}{e^{11.7 \times \frac{12}{14}}}\right) \approx 0.094$$

Subsequent to calculating the timing evaluation value, the usefulness of the countermeasure is calculated based on the expression (1), similarly to the second embodiment. A countermeasure graph for the newly produced system is then generated (see FIG. 23), based on the history of countermeasures whose usefulness is higher than a predetermined value.

In the third embodiment, as thus described, the accuracy of a maturity index increases because the maturity index of the system is calculated based on the result of monitoring the actual operation state of the system. By accurately calculating the maturity index of the system at the time when the countermeasure has been taken, the accuracy of the usefulness of the countermeasure also increases. As a result, it becomes possible to generate a more appropriate countermeasure graph.

According to an aspect, it is possible to increase the reliability of evaluating countermeasures taken in the past.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing an evaluation program that causes a computer to perform a process comprising:
   calculating a maturity index corresponding to an operation period of each of a plurality of systems, in which a specific countermeasure is respectively taken, based on a value related to a non-functional requirement of the each of the plurality of systems, the maturity index indicating a degree of operational stability of the each of the plurality of systems on timings of taking the specific countermeasure; and
   evaluating usefulness of the specific countermeasure for a first system based on similarity of configuration between the first system and the each of the plurality of systems, timings that the specific countermeasure is taken, effects of the specific countermeasure, and the calculated maturity index.

2. The non-transitory computer-readable storage medium according to claim 1, wherein the calculating includes:
  generating relational information indicating a relation between the operation period and maturity index of the each of the plurality of systems, based on the value related to the non-functional requirement of the each of the plurality of systems; and
  calculating the maturity index corresponding to the operation period of the each of the plurality of systems in which the specific countermeasure is taken, based on the relational information.

3. The non-transitory computer-readable storage medium according to claim 1, wherein the evaluating includes setting the usefulness of the specific countermeasure higher as the timing of taking the specific countermeasure is closer to either a start time of operation or a present time, and setting larger a difference of usefulness in accordance with a difference of closeness to either the start time of operation or the present time, as the maturity index of the each of the plurality of systems is higher.

4. The non-transitory computer-readable storage medium according to claim 1, wherein the calculating includes setting the maturity index higher as an operation period of the each of the plurality of systems is longer.

5. The non-transitory computer-readable storage medium according to claim 1, wherein the value related to the non-functional requirement indicates an accumulated failure occurrence status from start of operation of the each of the plurality of systems.

6. The non-transitory computer-readable storage medium according to claim 5, wherein the calculating includes calculating, based on a temporal variation of the failure occurrence status of the each of the plurality of systems, a maturity factor indicating a maturity degree according to a length of an operation period of the each of the plurality of systems, generating a function expression having set therein the maturity factor as a constant number, and calculating the maturity index corresponding to the operation period of the each of the plurality of systems in which the specific countermeasure is taken, based on the function expression.

7. The non-transitory computer-readable storage medium according to claim 6, wherein the calculating includes calculating a temporal variation of an accumulated number of system failure occurrences, and using an increase degree of the accumulated number according to the length of operation period as the maturity factor.

8. The non-transitory computer-readable storage medium according to claim 1, wherein the calculating includes determining stability of the operation of the each of the plurality of systems for each unit period, based on the value related to the non-functional requirement of the each of the plurality of systems in which the specific countermeasure to be evaluated is taken, and calculating the maturity index based on the stability of the each of the plurality of systems during the each unit period within a predetermined period before the specific countermeasure is taken.

9. The non-transitory computer-readable storage medium according to claim 1, wherein the value related to the non-functional requirement indicates an operation state of the each of the plurality of systems and is acquired by monitoring the each of the plurality of systems.

10. An evaluation method comprising:
  calculating, by a processor, a maturity index corresponding to an operation period of each of a plurality of systems, in which a specific countermeasure is respectively taken, based on a value related to a non-functional requirement of the each of the plurality of systems, the maturity index indicating a degree of operational stability of the each of the plurality of systems on timings of taking the specific countermeasure; and
  evaluating, by the processor, usefulness of the specific countermeasure for a first system based on similarity of configuration between the first system and the each of the plurality of the systems, timings that the specific countermeasure is taken, effects of the specific countermeasure, and the calculated maturity index.

11. An evaluation apparatus comprising a processor configured to perform a process including:
  calculating a maturity index corresponding to an operation period of each of a plurality of systems, in which a specific countermeasure is respectively taken, based on a value related to a non-functional requirement of the each of the plurality of systems, the maturity index indicating a degree of operational stability of the each of the plurality of systems on timings of taking the specific countermeasure; and
  evaluating usefulness of the specific countermeasure for a first system based on similarity of configuration between the first system and the each of the plurality of systems, timings that the specific countermeasure is taken, effects of the specific countermeasure, and the calculated maturity index.

* * * * *